US008163075B2

(12) United States Patent
Kennedy et al.

(10) Patent No.: US 8,163,075 B2
(45) Date of Patent: *Apr. 24, 2012

(54) INKS COMPRISING MODIFIED PIGMENTS AND METHODS FOR MAKING AND USING THE SAME

(75) Inventors: Jeff Kennedy, Carlsbad, CA (US); Diane V. Graff, Escondido, CA (US); Daniel F. Gloster, San Diego, CA (US); Michael Bogomolny, San Diego, CA (US); Puthalath K. Sujeeth, Ballwin, MO (US); Ryan Cross, San Diego, CA (US)

(73) Assignee: Sensient Colors LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/933,192

(22) Filed: Oct. 31, 2007

(65) Prior Publication Data

US 2008/0121138 A1 May 29, 2008

Related U.S. Application Data

(60) Provisional application No. 60/855,573, filed on Oct. 31, 2006.

(51) Int. Cl.
*C09D 11/02* (2006.01)
(52) U.S. Cl. .................. 106/31.6; 106/31.65; 106/31.86
(58) Field of Classification Search .................. 106/31.6, 106/31.65, 31.86
See application file for complete search history.

(56) References Cited

U.S. PATENT DOCUMENTS

| 630,868 A | 8/1899 | Dorman |
| 1,901,861 A | 3/1933 | Baker |
| 2,034,508 A | 3/1936 | Boer et al. |
| 2,178,383 A | 10/1939 | Wiegand |
| 2,281,261 A | 4/1942 | Bjorksten et al. |
| 2,439,442 A | 4/1948 | Amon et al. |
| 2,439,443 A | 4/1948 | Aske |
| 2,641,533 A | 6/1953 | Cines |
| 2,811,501 A | 10/1957 | Stedry |
| 2,816,046 A | 12/1957 | Damusis |
| 2,867,540 A | 1/1959 | Melvin |
| 2,993,903 A | 7/1961 | Kraus |

(Continued)

FOREIGN PATENT DOCUMENTS

AU 768805 1/2004

(Continued)

OTHER PUBLICATIONS

United States Patent Office Action for U.S. Appl. No. 11/933,116 dated Jun. 18, 2010 (5 pages).

(Continued)

*Primary Examiner* — J. A. Lorengo
*Assistant Examiner* — Veronica F Faison
(74) *Attorney, Agent, or Firm* — Michael Best & Friedrich LLP

(57) ABSTRACT

An ink composition that includes a self-dispersing pigment that has about 0.02 to about 1.0 mMoles of S and about 0.2 to about 2.0 mMoles of active hydrogen per gram of pigment, water, and an organic solvent. A method of making an ink composition that includes sulfonating a pigment, subsequently oxidizing the pigment to produce a modified pigment, and incorporating the modified pigment into an ink.

27 Claims, 9 Drawing Sheets

U.S. PATENT DOCUMENTS

| | | |
|---|---|---|
| 3,023,118 A | 2/1962 | Donnet |
| 3,025,259 A | 3/1962 | Watson et al. |
| 3,043,708 A | 7/1962 | Edwin et al. |
| 3,243,752 A | 3/1966 | Lawrence |
| 3,271,383 A | 9/1966 | Yamaya et al. |
| 3,291,788 A | 12/1966 | Yamaya et al. |
| 3,306,761 A | 2/1967 | Johnson |
| 3,323,932 A | 6/1967 | Aboytes et al. |
| 3,347,632 A | 10/1967 | Parker |
| 3,368,990 A | 2/1968 | Goulston |
| 3,412,054 A | 11/1968 | Milligan et al. |
| 3,442,679 A | 5/1969 | Rivin et al. |
| 3,519,452 A | 7/1970 | Rivin et al. |
| 3,528,840 A | 9/1970 | Aboytes |
| 3,565,657 A | 2/1971 | Dannenberg et al. |
| 3,623,899 A | 11/1971 | Lagally |
| 3,697,425 A | 10/1972 | Lagally |
| 3,755,287 A | 8/1973 | Hegar et al. |
| 3,895,004 A | 7/1975 | de Montmollin et al. |
| 3,901,818 A | 8/1975 | Durand et al. |
| 3,971,849 A | 7/1976 | Prasad et al. |
| 3,992,218 A | 11/1976 | Suetsugu et al. |
| 4,003,981 A | 1/1977 | Turk |
| 4,069,218 A | 1/1978 | Hegar |
| 4,156,616 A | 5/1979 | Dietz et al. |
| 4,197,221 A | 4/1980 | Eisenmenger et al. |
| 4,201,647 A | 5/1980 | Spaziante et al. |
| 4,243,772 A | 1/1981 | Paul et al. |
| 4,298,526 A | 11/1981 | Sappok et al. |
| 4,343,767 A | 8/1982 | Long et al. |
| 4,386,851 A | 6/1983 | Eidorff |
| 4,388,115 A | 6/1983 | Sugiyama et al. |
| 4,406,662 A | 9/1983 | Beran et al. |
| 4,425,162 A | 1/1984 | Sugiyama et al. |
| 4,435,717 A | 3/1984 | Eida et al. |
| 4,477,621 A | 10/1984 | Sato et al. |
| 4,485,041 A | 11/1984 | Hoyer et al. |
| 4,500,672 A | 2/1985 | Suzuki et al. |
| 4,507,236 A | 3/1985 | Seiler et al. |
| 4,508,570 A | 4/1985 | Fujii et al. |
| 4,530,961 A | 7/1985 | Nguyen et al. |
| 4,532,296 A | 7/1985 | Gardner |
| 4,533,776 A | 8/1985 | Baasner et al. |
| 4,581,445 A | 4/1986 | Ramanathan |
| 4,597,794 A | 7/1986 | Ohta et al. |
| 4,609,404 A | 9/1986 | Marraccini et al. |
| 4,624,709 A | 11/1986 | Otsuka |
| 4,624,773 A | 11/1986 | Hettinger |
| 4,627,875 A | 12/1986 | Kobayashi et al. |
| 4,631,085 A | 12/1986 | Kawanishi et al. |
| 4,647,310 A | 3/1987 | Shimada et al. |
| 4,666,519 A | 5/1987 | Akiyama et al. |
| 4,666,993 A | 5/1987 | Urano et al. |
| 4,670,059 A | 6/1987 | Hackleman et al. |
| 4,680,332 A | 7/1987 | Hair et al. |
| 4,683,002 A | 7/1987 | Mirua et al. |
| 4,685,968 A | 8/1987 | Palmer |
| 4,689,078 A | 8/1987 | Koike |
| 4,694,302 A | 9/1987 | Hackleman |
| 4,695,824 A | 9/1987 | Tazaki |
| 4,711,668 A | 12/1987 | Shimada et al. |
| 4,713,081 A | 12/1987 | Becker |
| 4,713,113 A | 12/1987 | Shimada et al. |
| 4,732,613 A | 3/1988 | Shioya et al. |
| 4,737,190 A | 4/1988 | Shimada et al. |
| 4,761,180 A | 8/1988 | Askeland et al. |
| 4,765,838 A | 8/1988 | Ohata et al. |
| 4,786,327 A | 11/1988 | Wenzel et al. |
| 4,790,880 A | 12/1988 | Miller |
| 4,793,860 A | 12/1988 | Murakami et al. |
| 4,798,856 A | 1/1989 | Ayala et al. |
| 4,810,292 A | 3/1989 | Palmer |
| 4,836,851 A | 6/1989 | Pawlowski et al. |
| 4,836,852 A | 6/1989 | Knirsch et al. |
| 4,838,938 A | 6/1989 | Tomida |
| 4,844,569 A | 7/1989 | Wada et al. |
| 4,846,851 A | 7/1989 | Guro et al. |
| 4,853,036 A | 8/1989 | Koike et al. |
| 4,853,037 A | 8/1989 | Johnson et al. |
| 4,855,762 A | 8/1989 | Suzuki |
| 4,914,562 A | 4/1990 | Abe et al. |
| 4,931,950 A | 6/1990 | Isle et al. |
| 4,952,551 A | 8/1990 | Buehler |
| 4,952,617 A | 8/1990 | Ayala et al. |
| 4,957,553 A | 9/1990 | Koike |
| 4,959,661 A | 9/1990 | Buxton |
| 4,973,499 A | 11/1990 | Iwata et al. |
| 4,978,969 A | 12/1990 | Chieng |
| 4,994,110 A | 2/1991 | Stoffel et al. |
| 5,013,361 A | 5/1991 | Case et al. |
| 5,017,224 A | 5/1991 | Tomita |
| 5,017,227 A | 5/1991 | Koike et al. |
| 5,017,644 A | 5/1991 | Fuller et al. |
| 5,026,425 A | 6/1991 | Hindagolla et al. |
| 5,026,426 A | 6/1991 | Russell |
| 5,026,427 A | 6/1991 | Mitchell et al. |
| 5,053,078 A | 10/1991 | Koike |
| 5,059,248 A | 10/1991 | Signorino et al. |
| 5,061,316 A | 10/1991 | Moffatt |
| 5,062,892 A | 11/1991 | Halko |
| 5,067,980 A | 11/1991 | Koike |
| 5,075,699 A | 12/1991 | Koike |
| 5,082,496 A | 1/1992 | Yamamoto et al. |
| 5,085,698 A | 2/1992 | Ma et al. |
| 5,102,459 A | 4/1992 | Ritter et al. |
| 5,103,361 A | 4/1992 | Nagatsuka |
| 5,106,417 A | 4/1992 | Hauser |
| 5,108,501 A | 4/1992 | Moffatt |
| 5,108,503 A | 4/1992 | Hindagolla et al. |
| 5,108,504 A | 4/1992 | Johnson |
| 5,110,355 A | 5/1992 | Pendleton |
| 5,114,479 A | 5/1992 | Keaveney |
| 5,116,409 A | 5/1992 | Moffatt |
| 5,118,351 A | 6/1992 | Shirota et al. |
| 5,124,201 A | 6/1992 | Kurabayashi et al. |
| 5,125,969 A | 6/1992 | Nishiwaki et al. |
| 5,133,803 A | 7/1992 | Moffatt |
| 5,142,393 A | 8/1992 | Okumura et al. |
| 5,145,518 A | 9/1992 | Winnik et al. |
| 5,156,470 A | 10/1992 | Suzuki et al. |
| 5,156,472 A | 10/1992 | Suzuki et al. |
| 5,156,473 A | 10/1992 | Suzuki et al. |
| 5,156,675 A | 10/1992 | Breton et al. |
| 5,158,377 A | 10/1992 | Suzuki et al. |
| 5,159,009 A | 10/1992 | Wolff |
| 5,160,372 A | 11/1992 | Matrick |
| 5,165,968 A | 11/1992 | Johnson et al. |
| 5,172,133 A | 12/1992 | Suga et al. |
| 5,176,745 A | 1/1993 | Moore et al. |
| 5,181,045 A | 1/1993 | Shields |
| 5,183,502 A | 2/1993 | Meichsner |
| 5,184,148 A | 2/1993 | Suga |
| 5,190,582 A | 3/1993 | Shinozuka et al. |
| 5,196,057 A | 3/1993 | Escano et al. |
| 5,207,824 A | 5/1993 | Moffatt |
| 5,211,747 A | 5/1993 | Breton et al. |
| 5,212,819 A | 5/1993 | Wada |
| 5,215,577 A | 6/1993 | Eida et al. |
| 5,220,346 A | 6/1993 | Carreira et al. |
| 5,221,148 A | 6/1993 | Suzuki et al. |
| 5,221,332 A | 6/1993 | Kohlmeier |
| 5,221,334 A | 6/1993 | Ma et al. |
| 5,246,518 A | 9/1993 | Hale |
| 5,248,363 A | 9/1993 | Hale |
| 5,258,066 A | 11/1993 | Kobayashi et al. |
| 5,258,505 A | 11/1993 | Eida et al. |
| 5,262,268 A | 11/1993 | Bertrand |
| 5,272,201 A | 12/1993 | Ma et al. |
| 5,281,261 A | 1/1994 | Lin |
| 5,281,569 A | 1/1994 | Amon et al. |
| 5,296,022 A | 3/1994 | Kobayashi et al. |
| 5,300,148 A | 4/1994 | Domingo et al. |
| 5,302,223 A | 4/1994 | Hale |
| 5,310,778 A | 5/1994 | Shor et al. |
| 5,318,617 A | 6/1994 | Nagasawa et al. |
| 5,320,668 A | 6/1994 | Shields et al. |
| 5,334,435 A | 8/1994 | Rossi |

| Patent | Date | Inventor |
|---|---|---|
| 5,342,439 A | 8/1994 | Lauw |
| 5,344,483 A | 9/1994 | Hinton |
| 5,352,484 A | 10/1994 | Bernard et al. |
| 5,364,461 A | 11/1994 | Beach et al. |
| 5,364,462 A | 11/1994 | Crystal |
| 5,364,702 A | 11/1994 | Idei |
| 5,372,697 A | 12/1994 | Akutsu et al. |
| 5,377,024 A | 12/1994 | Dillinger |
| 5,378,269 A | 1/1995 | Rossi |
| 5,389,134 A | 2/1995 | Breton et al. |
| 5,393,461 A | 2/1995 | Fillipova |
| 5,393,821 A | 2/1995 | Shieh et al. |
| 5,395,435 A | 3/1995 | Mizobuchi |
| 5,407,725 A | 4/1995 | Ryoke et al. |
| 5,421,658 A | 6/1995 | Suzuki et al. |
| 5,421,871 A | 6/1995 | Onishi et al. |
| 5,424,780 A | 6/1995 | Cooper |
| 5,428,383 A | 6/1995 | Shields |
| 5,431,501 A | 7/1995 | Hale |
| 5,437,716 A | 8/1995 | Sano et al. |
| 5,441,564 A | 8/1995 | Vogt |
| 5,484,475 A | 1/1996 | Breton |
| 5,484,899 A | 1/1996 | Deitz et al. |
| 5,485,188 A | 1/1996 | Tochihara et al. |
| 5,487,614 A | 1/1996 | Hale |
| 5,488,401 A | 1/1996 | Mochizuki et al. |
| 5,488,402 A | 1/1996 | Shields |
| 5,488,907 A | 2/1996 | Xu |
| 5,503,664 A | 4/1996 | Sano et al. |
| 5,509,140 A | 4/1996 | Koitabashi et al. |
| 5,522,317 A | 6/1996 | Hale |
| 5,522,922 A | 6/1996 | Furusawa |
| 5,529,616 A | 6/1996 | Prasad |
| 5,529,767 A | 6/1996 | Brox et al. |
| 5,531,816 A | 7/1996 | Wickramanayake |
| 5,531,818 A | 7/1996 | Lin |
| 5,534,051 A | 7/1996 | Lauw |
| 5,536,306 A | 7/1996 | Johnson et al. |
| 5,538,548 A | 7/1996 | Yamazaki et al. |
| 5,550,082 A | 8/1996 | Wolfe et al. |
| 5,552,182 A | 9/1996 | Scarpetti |
| 5,554,739 A | 9/1996 | Belmont |
| 5,555,813 A | 9/1996 | Hale |
| 5,559,169 A | 9/1996 | Belmont |
| 5,560,720 A | 10/1996 | Suzuki et al. |
| 5,562,762 A | 10/1996 | Mrvos et al. |
| 5,570,118 A | 10/1996 | Rezanka et al. |
| 5,571,311 A | 11/1996 | Belmont et al. |
| 5,575,845 A | 11/1996 | Belmont et al. |
| 5,575,877 A | 11/1996 | Hale |
| 5,580,372 A | 12/1996 | Gino et al. |
| 5,585,189 A | 12/1996 | Inoue et al. |
| 5,589,522 A | 12/1996 | Beach et al. |
| 5,590,600 A | 1/1997 | Hale |
| 5,591,455 A | 1/1997 | Signorino et al. |
| 5,593,459 A | 1/1997 | Gamblin |
| 5,595,592 A | 1/1997 | Signorino et al. |
| 5,601,023 A | 2/1997 | Hale |
| 5,604,276 A | 2/1997 | Suga |
| 5,609,671 A | 3/1997 | Nagasawa |
| 5,611,847 A | 3/1997 | Guistina et al. |
| 5,615,957 A | 4/1997 | Suzuki et al. |
| 5,621,027 A | 4/1997 | Roschger et al. |
| 5,622,439 A | 4/1997 | Suzuki et al. |
| 5,622,557 A | 4/1997 | Mahmud et al. |
| 5,624,485 A | 4/1997 | Calhoun |
| 5,626,655 A | 5/1997 | Pawlowski et al. |
| 5,630,868 A | 5/1997 | Belmont et al. |
| 5,631,309 A | 5/1997 | Yanagi et al. |
| 5,640,180 A | 6/1997 | Hale |
| 5,642,141 A | 6/1997 | Hale |
| 5,644,988 A | 7/1997 | Xu |
| 5,647,896 A | 7/1997 | Nishimura et al. |
| 5,647,897 A | 7/1997 | Ouki et al. |
| 5,648,405 A | 7/1997 | Ma |
| 5,656,071 A | 8/1997 | Kappele |
| 5,658,376 A | 8/1997 | Noguchi et al. |
| 5,665,150 A | 9/1997 | Schwarz |
| 5,667,569 A | 9/1997 | Fujioka |
| 5,667,571 A | 9/1997 | Ono et al. |
| 5,667,572 A | 9/1997 | Taniguchi |
| 5,672,198 A | 9/1997 | Belmont |
| 5,679,143 A | 10/1997 | Looman |
| 5,686,508 A | 11/1997 | Shimomura |
| 5,686,633 A | 11/1997 | Vieira |
| 5,688,311 A | 11/1997 | Adamic |
| 5,690,721 A | 11/1997 | Itoh |
| 5,690,722 A | 11/1997 | Pawlowski |
| 5,690,723 A | 11/1997 | Sano et al. |
| 5,693,126 A | 12/1997 | Ito |
| 5,698,016 A | 12/1997 | Adams et al. |
| 5,700,317 A | 12/1997 | Adamic |
| 5,704,969 A | 1/1998 | Kanaya |
| 5,707,432 A | 1/1998 | Adams |
| 5,709,976 A | 1/1998 | Malhotra |
| 5,713,988 A | 2/1998 | Belmont |
| 5,713,989 A | 2/1998 | Wickramanayake |
| 5,713,992 A | 2/1998 | Satoh et al. |
| 5,714,538 A | 2/1998 | Beach et al. |
| 5,718,746 A | 2/1998 | Nagasawa et al. |
| 5,719,204 A | 2/1998 | Beach et al. |
| 5,721,344 A | 2/1998 | Baettig |
| 5,725,641 A | 3/1998 | MacLeod |
| 5,725,643 A | 3/1998 | Higashiyama |
| 5,725,644 A | 3/1998 | Sano et al. |
| 5,730,790 A | 3/1998 | Rehman |
| 5,734,396 A | 3/1998 | Hale |
| 5,734,403 A | 3/1998 | Suga et al. |
| 5,735,941 A | 4/1998 | Feeman et al. |
| 5,745,140 A | 4/1998 | Stoffel et al. |
| 5,746,816 A | 5/1998 | Xu |
| 5,746,817 A | 5/1998 | Katsen et al. |
| 5,746,818 A | 5/1998 | Yatake |
| 5,747,562 A | 5/1998 | Mahmud et al. |
| 5,749,950 A | 5/1998 | Mahmud et al. |
| 5,749,951 A | 5/1998 | Yoshiike et al. |
| 5,749,952 A | 5/1998 | Tsang |
| 5,750,592 A | 5/1998 | Shinozuka et al. |
| 5,751,320 A | 5/1998 | Scheffelin et al. |
| 5,766,327 A | 6/1998 | Maze |
| 5,769,930 A | 6/1998 | Sano |
| 5,772,742 A | 6/1998 | Wang |
| 5,777,648 A | 7/1998 | Scheffelin et al. |
| 5,785,743 A | 7/1998 | Adamic et al. |
| 5,786,436 A | 7/1998 | Fischer et al. |
| 5,788,754 A | 8/1998 | Deardurff et al. |
| 5,795,375 A | 8/1998 | Yamazaki et al. |
| 5,803,958 A | 9/1998 | Katsen et al. |
| 5,803,959 A | 9/1998 | Johnson |
| 5,814,138 A | 9/1998 | Fague |
| 5,814,683 A | 9/1998 | Branham |
| 5,814,685 A | 9/1998 | Satake et al. |
| 5,821,283 A | 10/1998 | Hesler |
| 5,825,387 A | 10/1998 | Cowger et al. |
| 5,830,263 A | 11/1998 | Hale |
| 5,830,264 A | 11/1998 | Fujioka et al. |
| 5,830,265 A | 11/1998 | Tsang et al. |
| 5,830,930 A | 11/1998 | Mahmud et al. |
| 5,837,043 A | 11/1998 | Wong et al. |
| 5,837,045 A | 11/1998 | Johnson |
| 5,837,374 A | 11/1998 | Hirayama et al. |
| 5,846,306 A | 12/1998 | Kubota |
| 5,846,307 A | 12/1998 | Nagasawa et al. |
| 5,849,067 A | 12/1998 | Tsuchiya et al. |
| 5,851,274 A | 12/1998 | Lin |
| 5,851,280 A | 12/1998 | Belmont et al. |
| 5,853,465 A | 12/1998 | Tsang |
| 5,854,307 A | 12/1998 | Kimura |
| 5,854,331 A | 12/1998 | Ma |
| 5,858,075 A | 1/1999 | Deardurff et al. |
| 5,858,078 A | 1/1999 | Andes et al. |
| 5,861,447 A | 1/1999 | Nagasawa et al. |
| 5,863,323 A | 1/1999 | Mahmud et al. |
| 5,868,823 A | 2/1999 | Yamazaki et al. |
| 5,869,550 A | 2/1999 | Mahmud |
| 5,871,572 A | 2/1999 | Marritt |
| 5,874,974 A | 2/1999 | Courian et al. |
| 5,876,491 A | 3/1999 | Gunn et al. |

| | | | | | | |
|---|---|---|---|---|---|---|
| 5,877,100 | A | 3/1999 | Smith et al. | 6,103,380 | A | 8/2000 | Devonport |
| 5,877,238 | A | 3/1999 | Mahmud et al. | 6,103,782 | A | 8/2000 | Mizobuchi |
| 5,877,253 | A | 3/1999 | Matta et al. | 6,105,502 | A | 8/2000 | Wagner et al. |
| 5,885,335 | A | 3/1999 | Adams | 6,107,350 | A | 8/2000 | Boes et al. |
| 5,885,336 | A | 3/1999 | Kitahara et al. | 6,110,266 | A | 8/2000 | Gonzalez-Blanco et al. |
| 5,886,065 | A | 3/1999 | Tsang et al. | 6,110,994 | A | 8/2000 | Cooke et al. |
| 5,891,232 | A | 4/1999 | Moffatt | 6,116,409 | A | 9/2000 | Yokajty |
| 5,891,934 | A | 4/1999 | Moffatt et al. | 6,120,594 | A | 9/2000 | Curtis et al. |
| 5,895,522 | A | 4/1999 | Belmont et al. | 6,124,376 | A | 9/2000 | Nichols et al. |
| 5,897,694 | A | 4/1999 | Woolf | 6,126,731 | A | 10/2000 | Kemeny |
| 5,897,961 | A | 4/1999 | Malhotra | 6,132,021 | A | 10/2000 | Smith |
| 5,898,445 | A | 4/1999 | Becker et al. | 6,132,502 | A | 10/2000 | Yatake |
| 5,900,029 | A | 5/1999 | Belmont et al. | 6,136,286 | A | 10/2000 | Okuyama et al. |
| 5,904,762 | A | 5/1999 | Mahmud | 6,137,502 | A | 10/2000 | Anderson et al. |
| 5,911,816 | A | 6/1999 | Gore | 6,139,139 | A | 10/2000 | Stoffel et al. |
| 5,916,934 | A | 6/1999 | Mahmud et al. | 6,142,621 | A | 11/2000 | Romano |
| 5,916,956 | A | 6/1999 | Wang et al. | 6,149,327 | A | 11/2000 | Ward et al. |
| 5,919,293 | A | 7/1999 | Moffatt et al. | 6,150,433 | A | 11/2000 | Tsang et al. |
| 5,919,841 | A | 7/1999 | Mahmud et al. | 6,150,453 | A | 11/2000 | Mahmud et al. |
| 5,919,855 | A | 7/1999 | Reed | 6,152,038 | A | 11/2000 | Wagner et al. |
| 5,922,118 | A | 7/1999 | Johnson | 6,169,129 | B1 | 1/2001 | Mahmud et al. |
| 5,925,176 | A | 7/1999 | Rehman | 6,172,154 | B1 | 1/2001 | Brown |
| 5,928,419 | A | 7/1999 | Uemura et al. | 6,174,354 | B1 | 1/2001 | Takizawa et al. |
| 5,932,631 | A | 8/1999 | Marritt | 6,176,629 | B1 | 1/2001 | Suzuki et al. |
| 5,935,309 | A | 8/1999 | Moffatt et al. | 6,177,498 | B1 | 1/2001 | Rehman |
| 5,938,829 | A | 8/1999 | Higashiyama et al. | 6,180,691 | B1 | 1/2001 | Cheng et al. |
| 5,946,012 | A | 8/1999 | Courian et al. | 6,184,268 | B1 | 2/2001 | Nichols et al. |
| 5,948,150 | A | 9/1999 | Lin | 6,187,086 | B1 | 2/2001 | Rehman |
| 5,948,835 | A | 9/1999 | Mahmud et al. | 6,193,364 | B1 | 2/2001 | Iida |
| 5,951,749 | A | 9/1999 | Krepski et al. | 6,197,274 | B1 | 3/2001 | Mahmud et al. |
| 5,952,481 | A | 9/1999 | Markham | 6,206,517 | B1 | 3/2001 | Kovacs et al. |
| 5,955,232 | A | 9/1999 | Little | 6,207,719 | B1 | 3/2001 | Pardikes |
| 5,955,515 | A | 9/1999 | Kimura et al. | 6,209,998 | B1 | 4/2001 | Yue |
| 5,958,999 | A | 9/1999 | Bates et al. | 6,211,279 | B1 | 4/2001 | Mahmud |
| 5,961,703 | A | 10/1999 | Fraas | 6,214,100 | B1 | 4/2001 | Parazak et al. |
| 5,963,238 | A | 10/1999 | Scheffelin et al. | 6,218,067 | B1 | 4/2001 | Belmont |
| 5,965,196 | A | 10/1999 | Sawada | 6,221,141 | B1 | 4/2001 | Takada et al. |
| 5,966,156 | A | 10/1999 | Scheffelin et al. | 6,221,142 | B1 | 4/2001 | Wang et al. |
| 5,968,243 | A | 10/1999 | Belmont | 6,221,143 | B1 | 4/2001 | Palumbo |
| 5,968,244 | A | 10/1999 | Ueda et al. | 6,221,932 | B1 | 4/2001 | Moffatt et al. |
| 5,969,003 | A | 10/1999 | Foucher et al. | 6,224,202 | B1 | 5/2001 | Romano, Jr. |
| 5,972,083 | A | 10/1999 | Iijima | 6,231,655 | B1 | 5/2001 | Marritt |
| 5,976,232 | A | 11/1999 | Gore | 6,239,193 | B1 | 5/2001 | Cheng |
| 5,976,233 | A | 11/1999 | Osumi et al. | H1967 | H | 6/2001 | Woolf |
| 5,977,213 | A | 11/1999 | Mahmud | 6,241,811 | B1 | 6/2001 | Sano |
| 5,981,623 | A | 11/1999 | McCain et al. | 6,242,529 | B1 | 6/2001 | Marritt |
| 5,985,015 | A | 11/1999 | Kanaya | 6,244,687 | B1 | 6/2001 | Gast et al. |
| 5,985,016 | A | 11/1999 | Tsang | 6,247,808 | B1 | 6/2001 | Ma |
| 5,990,202 | A | 11/1999 | Nguyen | 6,258,864 | B1 | 7/2001 | Dalton et al. |
| 6,004,389 | A | 12/1999 | Yatake | 6,264,301 | B1 | 7/2001 | Helterline |
| 6,007,611 | A | 12/1999 | Mheidle et al. | 6,271,285 | B1 | 8/2001 | Miyabayashi et al. |
| 6,008,272 | A | 12/1999 | Mahmud et al. | 6,276,791 | B1 | 8/2001 | Kovacs et al. |
| 6,013,123 | A | 1/2000 | Scarpetti | 6,277,183 | B1 | 8/2001 | Johnson et al. |
| 6,015,454 | A | 1/2000 | Lacroix et al. | 6,277,184 | B1 | 8/2001 | Kato |
| 6,017,980 | A | 1/2000 | Wang | 6,280,512 | B1 | 8/2001 | Botros |
| 6,019,828 | A | 2/2000 | Rehman | 6,280,513 | B1 | 8/2001 | Osumi et al. |
| 6,020,397 | A | 2/2000 | Matzinger | 6,280,516 | B1 | 8/2001 | Lucchi et al. |
| 6,022,908 | A | 2/2000 | Ma | 6,280,871 | B1 | 8/2001 | Tosco et al. |
| 6,024,786 | A | 2/2000 | Gore | 6,281,267 | B2 | 8/2001 | Parazak |
| 6,028,137 | A | 2/2000 | Mahmud et al. | 6,281,917 | B1 | 8/2001 | Katsuragi et al. |
| 6,034,153 | A | 3/2000 | Tsang et al. | 6,284,029 | B1 | 9/2001 | Sano |
| 6,036,759 | A | 3/2000 | Wickramanayake et al. | 6,291,572 | B1 | 9/2001 | Brown et al. |
| 6,039,796 | A | 3/2000 | Kubota | 6,299,675 | B1 | 10/2001 | Ono |
| 6,042,643 | A | 3/2000 | Belmont et al. | 6,300,391 | B2 | 10/2001 | Parazak |
| 6,050,671 | A | 4/2000 | Rotering | 6,306,204 | B1 | 10/2001 | Lin |
| 6,054,238 | A | 4/2000 | Little | 6,312,103 | B1 | 11/2001 | Haluzak |
| 6,056,812 | A | 5/2000 | Lin | 6,314,574 | B1 | 11/2001 | Chan |
| 6,057,387 | A | 5/2000 | Mahmud | 6,323,257 | B1 | 11/2001 | Moffatt et al. |
| 6,068,688 | A | 5/2000 | Whitehouse et al. | 6,323,258 | B1 | 11/2001 | Lin |
| 6,069,190 | A | 5/2000 | Bates | 6,323,273 | B1 | 11/2001 | Mahmud et al. |
| 6,074,042 | A | 6/2000 | Gasvoda et al. | 6,328,894 | B1 | 12/2001 | Chan et al. |
| 6,083,315 | A | 7/2000 | Nakamura et al. | 6,332,919 | B2 | 12/2001 | Osumi et al. |
| 6,086,197 | A | 7/2000 | Kubota et al. | 6,336,965 | B1 | 1/2002 | Johnson et al. |
| 6,086,198 | A | 7/2000 | Shields | 6,337,358 | B1 | 1/2002 | Whitehouse et al. |
| 6,089,687 | A | 7/2000 | Helterline | 6,341,856 | B1 | 1/2002 | Thompson et al. |
| 6,099,632 | A | 8/2000 | Nagasawa et al. | 6,342,094 | B1 | 1/2002 | Kabalnov |
| 6,100,315 | A | 8/2000 | Kitamura et al. | 6,342,095 | B1 | 1/2002 | Takizawa et al. |
| 6,102,996 | A | 8/2000 | Parazak | 6,348,939 | B1 | 2/2002 | Xu |
| 6,103,041 | A | 8/2000 | Wagner et al. | 6,350,519 | B1 | 2/2002 | Devonport |

| Patent | Date | Name |
|---|---|---|
| 6,352,341 B2 | 3/2002 | Kovacs et al. |
| 6,354,693 B1 | 3/2002 | Looman et al. |
| 6,361,156 B1 | 3/2002 | Romano, Jr. et al. |
| 6,364,472 B1 | 4/2002 | Barinaga et al. |
| 6,364,944 B1 | 4/2002 | Mahmud et al. |
| 6,367,922 B2 | 4/2002 | Romano, Jr. |
| 6,368,239 B1 | 4/2002 | Devonport et al. |
| 6,372,329 B1 | 4/2002 | Graczyk et al. |
| 6,372,818 B1 | 4/2002 | Kimura et al. |
| 6,372,820 B1 | 4/2002 | Devonport |
| 6,375,317 B1 | 4/2002 | Osumi et al. |
| 6,379,443 B1 * | 4/2002 | Komatsu et al. .......... 106/31.58 |
| 6,383,274 B1 | 5/2002 | Lin |
| 6,383,275 B1 | 5/2002 | Lin |
| 6,386,695 B1 | 5/2002 | Kowalski |
| 6,387,168 B1 | 5/2002 | Koitabashi et al. |
| 6,387,500 B1 | 5/2002 | Behl |
| 6,391,947 B1 | 5/2002 | Noguchi et al. |
| 6,398,858 B1 | 6/2002 | Yu et al. |
| 6,399,029 B1 | 6/2002 | Porteous |
| 6,399,202 B1 | 6/2002 | Yu |
| 6,399,674 B1 | 6/2002 | Kashiwazaki et al. |
| 6,402,313 B1 | 6/2002 | Xu et al. |
| 6,402,825 B1 | 6/2002 | Sun |
| 6,406,143 B1 | 6/2002 | Chen et al. |
| 6,406,528 B1 | 6/2002 | Macholdt et al. |
| 6,412,935 B1 | 7/2002 | Doumaux |
| 6,417,249 B1 | 7/2002 | Nguyen |
| 6,419,733 B1 | 7/2002 | Sano et al. |
| 6,423,375 B1 | 7/2002 | Bi et al. |
| 6,425,331 B1 | 7/2002 | Xu |
| 6,425,662 B1 | 7/2002 | Teraoka et al. |
| 6,431,677 B1 | 8/2002 | Anderson et al. |
| 6,432,194 B2 | 8/2002 | Johnson et al. |
| 6,432,523 B1 | 8/2002 | Ma et al. |
| 6,435,240 B1 | 8/2002 | Fagebaume et al. |
| 6,435,659 B1 | 8/2002 | Bruinsma |
| 6,436,178 B1 | 8/2002 | Hosmer |
| 6,439,710 B1 | 8/2002 | Hale |
| 6,444,017 B1 | 9/2002 | Yue |
| 6,444,294 B1 | 9/2002 | Malhotra et al. |
| 6,447,629 B1 | 9/2002 | Thompson et al. |
| 6,448,309 B2 | 9/2002 | Mahmud et al. |
| 6,450,098 B1 | 9/2002 | Hale |
| 6,450,632 B1 | 9/2002 | Tsang |
| 6,451,098 B1 | 9/2002 | Lye et al. |
| 6,451,103 B1 | 9/2002 | Uemura et al. |
| 6,451,379 B1 | 9/2002 | Tsao |
| 6,454,403 B1 | 9/2002 | Takada et al. |
| 6,454,846 B2 | 9/2002 | Yatake |
| 6,458,195 B1 | 10/2002 | Stoffel et al. |
| 6,458,458 B1 | 10/2002 | Cooke et al. |
| 6,460,987 B1 | 10/2002 | Katsuragi et al. |
| 6,460,989 B1 | 10/2002 | Yano et al. |
| 6,461,418 B1 | 10/2002 | Yue et al. |
| 6,464,334 B2 | 10/2002 | Lopez et al. |
| 6,467,896 B2 | 10/2002 | Meyer |
| 6,468,340 B1 | 10/2002 | Moffatt |
| 6,468,342 B1 | 10/2002 | Itoh et al. |
| 6,471,757 B1 | 10/2002 | Koitabashi et al. |
| 6,471,763 B1 | 10/2002 | Karl |
| 6,472,471 B2 | 10/2002 | Cooke et al. |
| 6,475,271 B2 | 11/2002 | Lin |
| 6,475,612 B1 | 11/2002 | Knight et al. |
| 6,478,863 B2 | 11/2002 | Johnson et al. |
| 6,478,963 B1 | 11/2002 | Rossmanith |
| 6,479,571 B1 | 11/2002 | Cooke et al. |
| 6,485,138 B1 | 11/2002 | Kubota et al. |
| 6,486,903 B1 | 11/2002 | Wagner et al. |
| 6,488,370 B2 | 12/2002 | Hale |
| 6,488,753 B1 | 12/2002 | Ito et al. |
| 6,491,976 B2 | 12/2002 | Horiuchi et al. |
| 6,494,943 B1 | 12/2002 | Yu et al. |
| 6,494,946 B1 | 12/2002 | Belmont et al. |
| 6,497,479 B1 | 12/2002 | Stoffel et al. |
| 6,498,222 B1 | 12/2002 | Kitamura et al. |
| 6,500,248 B1 | 12/2002 | Hayashi |
| 6,500,880 B1 | 12/2002 | Parazak |
| 6,502,917 B1 | 1/2003 | Shinada et al. |
| 6,502,920 B1 | 1/2003 | Anderson et al. |
| 6,503,307 B1 | 1/2003 | Noguchi |
| 6,503,308 B2 | 1/2003 | Stramel |
| 6,503,311 B1 | 1/2003 | Karl et al. |
| 6,503,317 B1 | 1/2003 | Ortalano |
| 6,503,978 B1 | 1/2003 | Tsao |
| 6,505,910 B1 | 1/2003 | Doval |
| 6,505,929 B1 | 1/2003 | Chow |
| 6,506,239 B1 | 1/2003 | Osumi |
| 6,506,240 B2 | 1/2003 | Takemoto |
| 6,506,245 B1 | 1/2003 | Kinney et al. |
| 6,508,871 B1 | 1/2003 | Kato |
| 6,508,872 B2 | 1/2003 | Nguyen |
| 6,511,534 B1 | 1/2003 | Mishina et al. |
| 6,514,330 B1 | 2/2003 | Kanaya et al. |
| 6,514,920 B1 | 2/2003 | Katsuragi et al. |
| 6,517,199 B1 | 2/2003 | Tomioka et al. |
| 6,521,034 B1 | 2/2003 | Osumi et al. |
| 6,522,522 B2 | 2/2003 | Yu |
| 6,524,383 B2 | 2/2003 | Komatsu et al. |
| 6,528,148 B1 | 3/2003 | Niu |
| 6,530,656 B1 | 3/2003 | Teraoka et al. |
| 6,533,406 B2 | 3/2003 | Katsuragi |
| 6,533,407 B2 | 3/2003 | Mouri et al. |
| 6,533,853 B1 | 3/2003 | Mishina |
| 6,534,569 B2 | 3/2003 | Mahmud et al. |
| 6,536,878 B2 | 3/2003 | Kasperchik et al. |
| 6,536,890 B1 | 3/2003 | Kato et al. |
| 6,537,364 B2 | 3/2003 | Dietz et al. |
| 6,538,047 B1 | 3/2003 | Miyabayashi |
| 6,538,049 B1 | 3/2003 | Kappele |
| 6,540,329 B1 | 4/2003 | Kaneko et al. |
| 6,540,334 B1 | 4/2003 | Mrvos et al. |
| 6,540,345 B1 | 4/2003 | Wagner et al. |
| 6,541,538 B1 | 4/2003 | Matzinger |
| 6,543,889 B2 | 4/2003 | Murcia et al. |
| 6,547,381 B2 | 4/2003 | Watanabe et al. |
| 6,548,572 B1 | 4/2003 | Breck |
| 6,550,901 B1 | 4/2003 | Iida |
| 6,550,902 B2 | 4/2003 | Shinada et al. |
| 6,550,903 B2 | 4/2003 | Katsuragi |
| 6,551,393 B2 | 4/2003 | Devonport et al. |
| 6,554,891 B1 | 4/2003 | Momose |
| 6,562,121 B2 | 5/2003 | Nickel et al. |
| 6,565,202 B2 | 5/2003 | Rose et al. |
| 6,572,226 B2 | 6/2003 | Tyvoll |
| 6,572,690 B2 | 6/2003 | Rehman et al. |
| 6,572,692 B2 | 6/2003 | Osumi |
| 6,578,943 B2 | 6/2003 | Arquilevich et al. |
| 6,582,508 B2 | 6/2003 | Dietz et al. |
| 6,585,815 B2 | 7/2003 | Koitabashi et al. |
| 6,585,817 B2 | 7/2003 | Lee |
| 6,585,818 B2 | 7/2003 | Thakkar et al. |
| 6,586,501 B1 | 7/2003 | Dalton et al. |
| 6,588,880 B1 | 7/2003 | Gasvoda et al. |
| 6,592,657 B2 | 7/2003 | Lee et al. |
| 6,596,065 B2 | 7/2003 | Ito |
| 6,596,068 B1 | 7/2003 | Ito et al. |
| 6,596,378 B2 | 7/2003 | Hanmura et al. |
| 6,602,333 B2 | 8/2003 | Miyabayashi |
| 6,602,335 B2 | 8/2003 | Moffatt et al. |
| 6,604,809 B2 | 8/2003 | Katsuragi |
| 6,605,420 B2 | 8/2003 | Nakai et al. |
| 6,607,266 B2 | 8/2003 | Katsuragi et al. |
| 6,607,268 B2 | 8/2003 | Bruinsma |
| 6,607,565 B1 | 8/2003 | Herrmann et al. |
| 6,607,589 B2 | 8/2003 | Adamic et al. |
| 6,610,129 B1 | 8/2003 | Sader et al. |
| 6,616,273 B1 | 9/2003 | Bruinsma |
| 6,618,066 B2 | 9/2003 | Hale |
| 6,620,229 B2 | 9/2003 | Doi et al. |
| 6,630,268 B2 | 10/2003 | Tosco et al. |
| 6,631,984 B2 | 10/2003 | Thompson et al. |
| 6,632,275 B1 | 10/2003 | Schoen et al. |
| 6,632,485 B1 | 10/2003 | Tang et al. |
| 6,632,594 B2 | 10/2003 | Nakai et al. |
| 6,637,876 B2 | 10/2003 | Hori |
| 6,638,350 B2 * | 10/2003 | Butler et al. ............... 106/31.28 |
| 6,641,259 B1 | 11/2003 | Kopolow et al. |

| | | |
|---|---|---|
| 6,641,651 B2 | 11/2003 | Suzuki |
| 6,641,653 B2 | 11/2003 | Yu |
| 6,641,656 B2 | 11/2003 | Yu |
| 6,643,220 B2 | 11/2003 | Anderson |
| 6,644,778 B2 | 11/2003 | Rotering |
| 6,648,950 B2 | 11/2003 | Lee |
| 6,648,953 B2 | 11/2003 | Yamazaki et al. |
| 6,648,954 B2 | 11/2003 | Uemura et al. |
| 6,649,317 B2 | 11/2003 | Wagner et al. |
| 6,652,084 B1 | 11/2003 | Teraoka |
| 6,659,582 B2 | 12/2003 | Underwood |
| 6,660,075 B2 | 12/2003 | Bergemann et al. |
| 6,664,312 B2 | 12/2003 | Devonport |
| 6,673,503 B2 | 1/2004 | Wagner et al. |
| 6,679,576 B2 | 1/2004 | Crivelli |
| 6,679,598 B2 | 1/2004 | Kato et al. |
| 6,685,769 B1 | 2/2004 | Karl et al. |
| 6,686,314 B2 | 2/2004 | Xu et al. |
| 6,686,409 B2 | 2/2004 | Mahmud et al. |
| 6,688,737 B2 | 2/2004 | Nagai et al. |
| 6,689,433 B2 | 2/2004 | Niu et al. |
| 6,699,319 B2 | 3/2004 | Adams |
| 6,706,104 B2 | 3/2004 | Takuhara et al. |
| 6,706,105 B2 | 3/2004 | Takada et al. |
| 6,709,506 B2 | 3/2004 | Mahmud et al. |
| 6,715,866 B2 | 4/2004 | Kasperchik |
| 6,716,278 B2 | 4/2004 | Prasad et al. |
| 6,719,420 B2 | 4/2004 | Tomioka et al. |
| 6,720,367 B2 | 4/2004 | Taniguchi et al. |
| 6,722,765 B2 | 4/2004 | Rolly et al. |
| 6,723,161 B2 | 4/2004 | Langenmayr et al. |
| 6,723,783 B2 | 4/2004 | Palumbo et al. |
| 6,730,152 B2 | 5/2004 | Rehman |
| 6,733,120 B2 | 5/2004 | Ogasawara et al. |
| 6,737,449 B1 | 5/2004 | Yatake |
| 6,740,151 B2 | 5/2004 | Belmont et al. |
| 6,740,689 B1 | 5/2004 | Lee et al. |
| 6,749,773 B2 | 6/2004 | Emanuel |
| 6,753,425 B2 | 6/2004 | Nakai et al. |
| 6,759,459 B2 | 7/2004 | Lin |
| 6,761,759 B2 | 7/2004 | Oki et al. |
| 6,767,640 B2 | 7/2004 | Moffatt |
| 6,776,830 B2 | 8/2004 | Marritt |
| 6,777,462 B2 | 8/2004 | Smith et al. |
| 6,779,864 B2 | 8/2004 | Underwood |
| 6,779,884 B1 | 8/2004 | Ma |
| 6,780,389 B2 | 8/2004 | Karl et al. |
| 6,780,901 B1 | 8/2004 | Endo et al. |
| 6,786,957 B2 | 9/2004 | Choy et al. |
| 6,790,268 B2 | 9/2004 | Lee et al. |
| 6,790,878 B2 | 9/2004 | Kurabayashi |
| 6,793,308 B2 | 9/2004 | Sugimoto et al. |
| 6,793,329 B2 | 9/2004 | Battey et al. |
| 6,793,722 B2 | 9/2004 | Chien et al. |
| 6,793,723 B2 | 9/2004 | Auslander et al. |
| 6,794,427 B2 | 9/2004 | Kurabayashi et al. |
| 6,797,347 B2 | 9/2004 | Chow |
| 6,805,736 B2 | 10/2004 | Wickramanayake |
| 6,806,300 B2 | 10/2004 | Waki et al. |
| 6,806,925 B2 | 10/2004 | Ishii et al. |
| 6,808,555 B2 | 10/2004 | Wang et al. |
| 6,808,583 B2 | 10/2004 | Kwasny et al. |
| 6,811,597 B2 | 11/2004 | Oki et al. |
| 6,814,790 B2 | 11/2004 | Sir et al. |
| 6,814,791 B2 | 11/2004 | Moore |
| 6,814,792 B2 | 11/2004 | Taniguchi |
| 6,814,793 B2 | 11/2004 | Akers et al. |
| 6,818,048 B2 | 11/2004 | Prasad et al. |
| 6,820,972 B2 | 11/2004 | Kinalski |
| 6,821,328 B2 | 11/2004 | Tomioka et al. |
| 6,821,330 B1 | 11/2004 | Sano |
| 6,822,781 B1 | 11/2004 | Amici et al. |
| 6,824,263 B2 | 11/2004 | Taniguchi et al. |
| 6,827,403 B2 | 12/2004 | Paasche et al. |
| 6,827,434 B1 | 12/2004 | Katsuragi et al. |
| 6,827,768 B2 | 12/2004 | Andrievsky et al. |
| 6,830,326 B2 | 12/2004 | Tsao |
| 6,830,327 B2 | 12/2004 | Asakawa |
| 6,830,927 B2 | 12/2004 | Rao |
| 6,832,830 B2 | 12/2004 | Seino |
| 6,833,026 B2 | 12/2004 | Palumbo |
| 6,834,945 B2 | 12/2004 | Ishizawa et al. |
| H2113 H | 1/2005 | Nichols et al. |
| 6,840,614 B2 | 1/2005 | Wagner et al. |
| 6,843,838 B2 | 1/2005 | Zimmer et al. |
| 6,844,035 B2 | 1/2005 | Niu et al. |
| 6,848,779 B2 | 2/2005 | Lo et al. |
| 6,848,781 B2 | 2/2005 | Ogino et al. |
| 6,849,111 B2 | 2/2005 | Suzuki |
| 6,851,787 B2 | 2/2005 | Johnson |
| 6,852,153 B2 | 2/2005 | Uhlir-Tsang |
| 6,852,156 B2 | 2/2005 | Yeh et al. |
| 6,855,193 B2 | 2/2005 | Andrievsky et al. |
| 6,858,301 B2 | 2/2005 | Ganapathiappan |
| 6,860,593 B2 | 3/2005 | Kashiwazaki et al. |
| 6,863,719 B2 | 3/2005 | Butler et al. |
| 6,866,378 B2 | 3/2005 | Wotton et al. |
| 6,866,381 B2 | 3/2005 | Kelly-Rowley et al. |
| 6,866,707 B2 | 3/2005 | Kato |
| 6,867,286 B1 | 3/2005 | Holloway |
| 6,869,470 B2 | 3/2005 | Kato |
| 6,869,647 B2 | 3/2005 | Page |
| 6,871,929 B2 | 3/2005 | Crivelli et al. |
| 6,872,430 B2 | 3/2005 | Burch et al. |
| 6,887,640 B2 | 5/2005 | Zhang et al. |
| 6,896,647 B1 | 5/2005 | Karger et al. |
| 6,899,754 B2 | 5/2005 | Yeh |
| 6,908,185 B2 | 6/2005 | Chen |
| 6,911,073 B2 | 6/2005 | Adams et al. |
| 6,916,088 B2 | 7/2005 | Smith et al. |
| 6,916,089 B2 | 7/2005 | Iida |
| 6,921,429 B2 | 7/2005 | Sago et al. |
| 6,921,433 B2 | 7/2005 | Kuribayashi et al. |
| 6,935,717 B2 | 8/2005 | Su et al. |
| 6,945,644 B2 | 9/2005 | Kabalnov |
| 6,948,021 B2 | 9/2005 | Derrico |
| 6,948,804 B2 | 9/2005 | Iida |
| 6,953,239 B2 | 10/2005 | Gondek et al. |
| 6,955,422 B2 | 10/2005 | Miyazawa et al. |
| 6,961,076 B2 | 11/2005 | Wagner |
| 6,964,702 B2 | 11/2005 | Shen et al. |
| 6,966,643 B2 | 11/2005 | Hale |
| 6,969,159 B2 | 11/2005 | Su et al. |
| RE38,952 E | 1/2006 | Hale et al. |
| 6,988,796 B2 | 1/2006 | Rolly et al. |
| 6,991,329 B2 | 1/2006 | Gore |
| 6,991,676 B2 | 1/2006 | Kabalnov et al. |
| 6,997,979 B2 | 2/2006 | Bauer |
| 7,001,649 B2 | 2/2006 | Wagner et al. |
| 7,001,660 B2 | 2/2006 | Garitano |
| 7,001,936 B2 | 2/2006 | Akers, Jr. et al. |
| 7,005,003 B2 | 2/2006 | Mott |
| 7,005,461 B2 | 2/2006 | Sanada et al. |
| 7,008,053 B2 | 3/2006 | Hashii et al. |
| 7,008,977 B2 | 3/2006 | Sakai et al. |
| 7,011,397 B2 | 3/2006 | Miyazawa et al. |
| 7,018,030 B2 | 3/2006 | Seino et al. |
| 7,018,953 B2 | 3/2006 | Gore et al. |
| 7,025,813 B2 | 4/2006 | Vanmaele et al. |
| 7,025,820 B2 | 4/2006 | Champlin et al. |
| 7,027,185 B2 | 4/2006 | Subirada et al. |
| 7,030,174 B2 | 4/2006 | Yatake |
| 7,030,175 B2 | 4/2006 | Vincent |
| 7,033,423 B2 | 4/2006 | Rolly |
| 7,034,149 B2 | 4/2006 | Hirokazu et al. |
| 7,034,273 B1 | 4/2006 | O |
| 7,037,398 B2 | 5/2006 | Kwasny et al. |
| 7,041,424 B2 | 5/2006 | Xu |
| 7,045,002 B2 | 5/2006 | Bauer et al. |
| 7,046,389 B2 | 5/2006 | Lopez et al. |
| 7,049,039 B2 | 5/2006 | Tazawa et al. |
| 7,052,535 B2 | 5/2006 | Uhlir-Tsang et al. |
| 7,056,962 B2 | 6/2006 | Johnson et al. |
| 7,058,339 B2 | 6/2006 | Wilcox |
| 7,066,590 B2 | 6/2006 | Lee et al. |
| 7,074,843 B2 | 7/2006 | Nakamura et al. |
| 7,086,732 B2 | 8/2006 | Kasperchik |
| 7,090,719 B2 | 8/2006 | Ishikawa et al. |

| | | |
|---|---|---|
| 7,097,275 B2 | 8/2006 | Murcia |
| 7,112,629 B2 | 9/2006 | Niu et al. |
| 7,115,675 B2 | 10/2006 | Schut |
| 7,119,133 B2 | 10/2006 | Vincent |
| 7,125,100 B2 | 10/2006 | Ishizawa et al. |
| 7,129,284 B2 | 10/2006 | Ma |
| 7,148,182 B2 | 12/2006 | Field et al. |
| 7,150,522 B2 | 12/2006 | Sen |
| 7,152,965 B2 | 12/2006 | Ishizawa et al. |
| 7,157,504 B2 | 1/2007 | Ma et al. |
| 7,159,975 B2 | 1/2007 | Yue |
| 7,163,577 B2 | 1/2007 | Tyrell |
| 7,165,836 B2 | 1/2007 | Ahlvin et al. |
| 7,173,078 B2 | 2/2007 | Lamprey et al. |
| 7,204,872 B2 | 4/2007 | Uhlir-Tsang |
| 7,204,873 B2 | 4/2007 | Bauer |
| 7,214,260 B2 | 5/2007 | Doi et al. |
| 7,217,315 B2 | 5/2007 | Bauer |
| 7,220,303 B2 | 5/2007 | Tyvoll |
| 7,220,304 B2 | 5/2007 | Momose et al. |
| 7,220,528 B2 | 5/2007 | Ganapathiappan |
| 7,221,878 B2 | 5/2007 | Chen |
| 7,241,334 B2 | 7/2007 | Srinivas |
| 7,247,195 B2 | 7/2007 | Dodge et al. |
| 7,253,216 B2 | 8/2007 | Miyabayashi |
| 7,264,662 B2 | 9/2007 | Dodge et al. |
| 7,294,183 B2 | 11/2007 | Tyvoll |
| 7,294,185 B2 | 11/2007 | Belmont et al. |
| 7,297,202 B2 | 11/2007 | Ichinose et al. |
| 7,314,273 B2 | 1/2008 | Robertson et al. |
| 7,355,044 B2 | 4/2008 | Vanmaele et al. |
| 7,390,441 B2 | 6/2008 | Bollepalli |
| 7,393,403 B2 | 7/2008 | Lee et al. |
| 7,413,683 B2 | 8/2008 | Bollepalli |
| 7,416,587 B2 | 8/2008 | Kondo |
| 7,416,594 B2 | 8/2008 | Moffatt |
| 7,416,597 B2 | 8/2008 | Rehman |
| 7,497,563 B2 | 3/2009 | Rehman |
| 2001/0018472 A1 | 8/2001 | Parazak et al. |
| 2001/0031422 A1 | 10/2001 | Iwasaki |
| 2002/0005146 A1 | 1/2002 | Palumbo et al. |
| 2002/0088375 A1 | 7/2002 | Komatsu et al. |
| 2002/0130938 A1 | 9/2002 | Kowalski |
| 2002/0144626 A1 | 10/2002 | Schut |
| 2002/0158952 A1* | 10/2002 | Adachi et al. ................. 347/100 |
| 2002/0195022 A1 | 12/2002 | Moffatt et al. |
| 2003/0019398 A1 | 1/2003 | Komatsu et al. |
| 2003/0019529 A1 | 1/2003 | Reinelt |
| 2003/0024434 A1 | 2/2003 | Butler et al. |
| 2003/0038869 A1 | 2/2003 | Kaneko et al. |
| 2003/0164114 A1 | 9/2003 | Kitayama et al. |
| 2003/0205171 A1 | 11/2003 | Adams et al. |
| 2003/0209166 A1 | 11/2003 | Vanmaele et al. |
| 2004/0006157 A1 | 1/2004 | Gloster et al. |
| 2004/0020407 A1* | 2/2004 | Kato ........................... 106/31.6 |
| 2004/0035323 A1 | 2/2004 | Suzuki et al. |
| 2004/0074018 A1 | 4/2004 | Wuzik et al. |
| 2004/0092647 A1 | 5/2004 | Chauvin |
| 2004/0103822 A1 | 6/2004 | Champlin |
| 2004/0169165 A1 | 9/2004 | Srinivas |
| 2004/0201658 A1 | 10/2004 | Jackson et al. |
| 2004/0229974 A1 | 11/2004 | Miyabayashi |
| 2004/0252162 A1 | 12/2004 | Gondek et al. |
| 2005/0020728 A1 | 1/2005 | Nagasawa et al. |
| 2005/0129015 A1 | 6/2005 | Jamieson et al. |
| 2005/0171238 A1 | 8/2005 | Bauer et al. |
| 2005/0171239 A1 | 8/2005 | Bauer et al. |
| 2005/0171240 A1 | 8/2005 | Bauer et al. |
| 2005/0183629 A1 | 8/2005 | McCain |
| 2005/0187312 A1 | 8/2005 | Akers, Jr. et al. |
| 2005/0190244 A1 | 9/2005 | Tyrell |
| 2005/0199152 A1 | 9/2005 | Hale et al. |
| 2005/0199155 A1 | 9/2005 | Lauw et al. |
| 2005/0204957 A1 | 9/2005 | Momose et al. |
| 2005/0223938 A1 | 10/2005 | Tyvoll |
| 2006/0004790 A1 | 1/2006 | Brown et al. |
| 2006/0070549 A1 | 4/2006 | Jung et al. |
| 2006/0071992 A1 | 4/2006 | Sarkisian et al. |
| 2006/0135361 A1 | 6/2006 | Markel et al. |
| 2006/0150345 A1 | 7/2006 | Mazza |
| 2006/0162612 A1 | 7/2006 | Kabalnov et al. |
| 2006/0176349 A1 | 8/2006 | Nagai et al. |
| 2006/0189717 A1 | 8/2006 | Johnson et al. |
| 2006/0201380 A1* | 9/2006 | Kowalski et al. ............. 106/31.6 |
| 2006/0211790 A1 | 9/2006 | Dimotakis et al. |
| 2006/0211791 A1 | 9/2006 | Burns et al. |
| 2007/0154821 A1 | 7/2007 | Galloway et al. |
| 2007/0277699 A1 | 12/2007 | Bauer |
| 2007/0289072 A1 | 12/2007 | Mazza |
| 2008/0047462 A1 | 2/2008 | Klein et al. |
| 2008/0115695 A1 | 5/2008 | Sujeeth et al. |
| 2008/0119613 A1 | 5/2008 | Klein et al. |
| 2008/0152808 A1 | 6/2008 | Kabalnov et al. |
| 2008/0308002 A1 | 12/2008 | Moffatt |
| 2009/0050014 A1 | 2/2009 | Sujeeth et al. |
| 2009/0111917 A1 | 4/2009 | Bonora |
| 2009/0192248 A1 | 7/2009 | Palumbo et al. |
| 2010/0061951 A1 | 3/2010 | Sujeeth et al. |
| 2010/0251932 A1 | 10/2010 | Sujeeth et al. |

FOREIGN PATENT DOCUMENTS

| | | |
|---|---|---|
| CA | 2198750 | 3/1996 |
| CA | 2207414 | 6/1996 |
| CA | 2258188 | 12/1997 |
| DE | 4215367 | 11/1993 |
| DE | 19618564 | 11/1997 |
| DE | 19823866 | 2/1999 |
| DE | 19831869 | 1/2000 |
| DE | 102005010468 | 9/2006 |
| EP | 0475075 | 3/1992 |
| EP | 0688836 | 12/1995 |
| EP | 0761783 | 3/1997 |
| EP | 0778798 | 6/1997 |
| EP | 0834537 | 4/1998 |
| EP | 0894835 | 3/1999 |
| EP | 0960911 | 12/1999 |
| EP | 1045014 | 10/2000 |
| EP | 1061107 | 12/2000 |
| EP | 1132439 | 9/2001 |
| EP | 1243625 | 9/2002 |
| EP | 1418209 | 5/2004 |
| EP | 1469042 | 10/2004 |
| EP | 1533347 | 5/2005 |
| EP | 1616913 | 1/2006 |
| EP | 1616915 | 1/2006 |
| EP | 1681320 | 7/2006 |
| FR | 2672307 | 8/1992 |
| GB | 668724 | 3/1948 |
| GB | 688776 | 3/1953 |
| GB | 788195 | 12/1957 |
| GB | 916132 | 1/1963 |
| GB | 1348850 | 3/1974 |
| GB | 1386543 | 3/1975 |
| GB | 1527396 | 10/1978 |
| GB | 1537379 | 12/1978 |
| JP | 59122555 | 7/1984 |
| JP | 59184161 | 10/1984 |
| JP | 60115665 | 6/1985 |
| JP | 3279369 | 12/1991 |
| JP | 5255607 | 10/1993 |
| JP | 6128517 | 5/1994 |
| JP | 7258578 | 10/1995 |
| JP | 8003498 | 1/1996 |
| JP | 8283596 | 10/1996 |
| JP | 10036726 | 2/1998 |
| JP | 10036727 | 2/1998 |
| JP | 10067957 | 3/1998 |
| JP | 10110110 | 4/1998 |
| JP | 10110111 | 4/1998 |
| JP | 10110112 | 4/1998 |
| JP | 10110114 | 4/1998 |
| JP | 10120958 | 5/1998 |
| JP | 10195331 | 7/1998 |
| JP | 10195360 | 7/1998 |
| JP | 10237349 | 9/1998 |
| JP | 10330665 | 12/1998 |
| JP | 11246806 | 9/1999 |
| JP | 11323175 | 11/1999 |

| | | |
|---|---|---|
| JP | 11349312 | 12/1999 |
| JP | 2000053902 | 2/2000 |
| JP | 2000345085 | 12/2000 |
| JP | 2000345086 | 12/2000 |
| JP | 2000345094 | 12/2000 |
| JP | 2000345095 | 12/2000 |
| JP | 2002097236 | 4/2002 |
| JP | 2002220557 | 8/2002 |
| JP | 2003105235 | 4/2003 |
| JP | 2003117995 | 4/2003 |
| JP | 2004010632 | 1/2004 |
| JP | 2005048114 | 2/2005 |
| JP | 2005097491 | 4/2005 |
| JP | 2005132985 | 5/2005 |
| JP | 2005349827 | 12/2005 |
| JP | 2006265379 | 10/2006 |
| WO | WO 92/13983 | 8/1992 |
| WO | WO 93/08237 | 4/1993 |
| WO | WO 93/12939 | 7/1993 |
| WO | WO 94/05732 | 3/1994 |
| WO | WO 96/06729 | 3/1996 |
| WO | WO 96/18688 | 6/1996 |
| WO | WO 96/24636 | 8/1996 |
| WO | WO 99/61529 | 12/1999 |
| WO | WO 99/63007 | 12/1999 |
| WO | WO 00/03609 | 1/2000 |
| WO | WO 00/75246 | 12/2000 |
| WO | WO 01/51566 | 7/2001 |
| WO | WO 01/62862 | 8/2001 |
| WO | WO 02/090448 | 11/2002 |
| WO | WO 02/092680 | 11/2002 |
| WO | WO 03/100884 | 12/2003 |
| WO | WO 2004/011558 | 2/2004 |
| WO | WO 2004/012515 | 2/2004 |
| WO | WO 2004/094537 | 11/2004 |
| WO | WO 2005/028576 | 3/2005 |
| WO | WO 2005/113677 | 12/2005 |
| WO | WO 2006/039034 | 4/2006 |
| WO | WO 2006/066132 | 6/2006 |
| WO | WO 2006/069165 | 6/2006 |
| WO | WO 2006/081299 | 8/2006 |
| WO | WO 2006/086660 | 8/2006 |
| WO | WO 2007/057111 | 5/2007 |
| WO | 2007/136540 | 11/2007 |
| WO | WO 2008/018873 | 2/2008 |
| WO | WO 2008/049735 | 5/2008 |
| WO | WO 2008/055244 | 5/2008 |
| WO | WO 2008/055245 | 5/2008 |
| WO | WO 2009/026552 | 2/2009 |
| WO | 2009/075802 | 6/2009 |
| WO | 2010/022377 | 2/2010 |

OTHER PUBLICATIONS

United States Patent Office Action for U.S. Appl. No. 12/197,087 dated Apr. 5, 2010 (6 pages).
Invitation to Pay Additional Fees and Partial International Search for Application No. PCT/US2009/054700 dated Jul. 8, 2010 (5 pages).
International Search Report and Written Opinion for Application No. PCT/US2009/054700 dated Sep. 28, 2010 (20 pages).
United States Patent Office Action for U.S. Appl. No. 13/042,803 dated Aug. 10, 2011 (10 pages).
United States Patent Office Notice of Allowance for U.S. Appl. No. 13/109,865 dated Oct. 19, 2011 (5 pages).
United States Patent Office Notice of Allowance for U.S. Appl. No. 12/197,087 dated Feb. 9, 2011 (3 pages).
United States Patent Office Notice of Allowance for U.S. Appl. No. 11/933,116 dated Dec. 10, 2010 (4 pages).
United States Patent Office Action for U.S. Appl. No. 12/545,790 dated Jun. 30, 2011 (7 pages).
European Patent Office Action for Application No. 07844788.5 dated May 20, 2011 (4 pages).
International Search Report and Written Opinion for Application No. PCT/US2010/030311 dated Aug. 3, 2011 (14 pages).
Invitation to Pay Additional Fees and Partial International Search for Application No. PCT/US2010/030311 dated Dec. 7, 2010 (5 pages).
"Pentaethylenehexamine 4067-16-7" prepared for NCI to support chemical nomination by Technical Resources International, Inc. under contract No. N02-CB-07007 (10/05; 3/06) 1-23.
Air Products and Chemicals, Inc., "Surfynol Surfactants for Pigment Grinding" (1999) 4 pages.
Air Products and Chemicals, Inc., Material Safety Data Sheet No. 300000004701 for SURFYNOL® CT-131 GRIND AID (2006) 1-7.
Allinger, N.L. et al., "Organische Chemie," Kapitel 8. Verbindungen mit Carbonyl-Gruppen, Walter deGruyter, Berlin (1980) p. 292.
American Ink Maker (1923-2001) (1996) vol. 44(2):30-2, 34-6, 66.
BASF Corporation, Joncryl® 1163, data sheet (Dec. 5, 2008) 2 pages.
BASF Corporation, Joncryl® 142, data sheet (Dec. 5, 2008) 3 pages.
BASF Corporation, Joncryl® 1536, data sheet (Dec. 5, 2008) 2 pages.
BASF Corporation, Joncryl® 1655, data sheet (Dec. 5, 2008) 4 pages.
BASF Corporation, Joncryl® 1670, data sheet (Dec. 5, 2008) 2 pages.
BASF Corporation, Joncryl® 1680, data sheet (Dec. 5, 2008) 2 pages.
BASF Corporation, Joncryl® 1695, data sheet (Dec. 5, 2008) 2 pages.
BASF Corporation, Joncryl® 2153, data sheet (Dec. 5, 2008) 2 pages.
BASF Corporation, Joncryl® 2350, data sheet (Dec. 12, 2008) 2 pages.
BASF Corporation, Joncryl® 2640, data sheet (Dec. 5, 2008) 2 pages.
BASF Corporation, Joncryl® 2641, data sheet (Nov. 14, 2008) 2 pages.
BASF Corporation, Joncryl® 2646, data sheet (Dec. 5, 2008) 2 pages.
BASF Corporation, Joncryl® 2660, data sheet (Nov. 13, 2008) 3 pages.
BASF Corporation, Joncryl® 2664, data sheet (Dec. 5, 2008) 4 pages.
BASF Corporation, Joncryl® 50, data sheet (Dec. 10, 2008) 2 pages.
BASF Corporation, Joncryl® 537, data sheet (Dec. 10, 2008) 3 pages.
BASF Corporation, Joncryl® 538-A, data sheet (Nov. 14, 2008) 3 pages.
BASF Corporation, Joncryl® 58, data sheet (Dec. 10, 2008) 2 pages.
BASF Corporation, Joncryl® 585, data sheet (Dec. 10, 2008) 2 pages.
BASF Corporation, Joncryl® 60, data sheet (Dec. 11, 2008) 2 pages.
BASF Corporation, Joncryl® 61, data sheet (Dec. 11, 2008) 2 pages.
BASF Corporation, Joncryl® 611, data sheet (Dec. 11, 2008) 3 pages.
BASF Corporation, Joncryl® 617-A, data sheet (Nov. 13, 2008) 2 pages.
BASF Corporation, Joncryl® 62, data sheet (Dec. 11, 2008) 2 pages.
BASF Corporation, Joncryl® 624, data sheet (Nov. 13, 2008) 2 pages.
BASF Corporation, Joncryl® 63, data sheet (Dec. 11, 2008) 2 pages.
BASF Corporation, Joncryl® 631 , data sheet (Dec. 11, 2008) 2 pages.
BASF Corporation, Joncryl® 636, data sheet (Dec. 5, 2008) 2 pages.
BASF Corporation, Joncryl® 646, data sheet (Dec. 11, 2008) 3 pages.
BASF Corporation, Joncryl® 655, data sheet (Dec. 11, 2008) 3 pages.
BASF Corporation, Joncryl® 660, data sheet (Dec. 11, 2008) 3 pages.
BASF Corporation, Joncryl® 67, data sheet (Dec. 11, 2008) 2 pages.
BASF Corporation, Joncryl® 678, data sheet (Dec. 11, 2008) 3 pages.
BASF Corporation, Joncryl® 680, data sheet (Dec. 11, 2008) 2 pages.
BASF Corporation, Joncryl® 682, data sheet (Dec. 11, 2008) 3 pages.
BASF Corporation, Joncryl® 690, data sheet (Dec. 11, 2008) 3 pages.
BASF Corporation, Joncryl® 693, data sheet (Dec. 11, 2008) 3 pages.
BASF Corporation, Joncryl® 74, data sheet.

BASF Corporation, Joncryl® 74-A, data sheet (Nov. 12, 2008) 2 pages.
BASF Corporation, Joncryl® 74-A, data sheet (Dec. 5, 2008) 2 pages.
BASF Corporation, Joncryl® 750, data sheet (Nov. 13, 2008) 3 pages.
BASF Corporation, Joncryl® 77, data sheet (Dec. 11, 2008) 2 pages.
BASF Corporation, Joncryl® 80, data sheet (Nov. 13, 2008) 2 pages.
BASF Corporation, Joncryl® 89, data sheet (Dec. 11, 2008) 2 pages.
BASF Corporation, Joncryl® 9010, preliminary data sheet (Jan. 22, 2009) 4 pages.
BASF Corporation, Joncryl® 99, data sheet (Dec. 11, 2008) 2 pages.
BASF Corporation, Joncryl® DFC 3025, data sheet (Nov. 12, 2008) 2 pages.
BASF Corporation, Joncryl® DFC 3030, data sheet (Nov. 12, 2008) 2 pages.
BASF Corporation, Joncryl® DFC 3040, data sheet (Nov. 13, 2008) 2 pages.
BASF Corporation, Joncryl® DFC 3050, data sheet (Nov. 12, 2008) 2 pages.
BASF Corporation, Joncryl® ECO 2124, data sheet (Nov. 14, 2008) 2 pages.
BASF Corporation, Joncryl® FLX 5000, data sheet (Nov. 14, 2008) 3 pages.
BASF Corporation, Joncryl® HPD 196, data sheet (Mar. 12, 2009) 3 pages.
BASF Corporation, Joncryl® HPD 296, data sheet (Dec. 11, 2008) 3 pages.
BASF Corporation, Joncryl® HPD 671, data sheet (Dec. 11, 2008) 4 pages.
BASF Corporation, Joncryl® HPD 696, data sheet (Nov. 26, 2008) 3 pages.
BASF Corporation, Joncryl® HPD 71, data sheet (Dec. 11, 2008) 2 pages.
BASF Corporation, Joncryl® HPD 96, data sheet (Dec. 11, 2008) 2 pages.
BASF Corporation, Joncryl® HRC 1645, data sheet (Nov. 13, 2008) 2 pages.
BASF Corporation, Joncryl® HRC 1661, data sheet (Nov. 13, 2008) 2 pages.
BASF Corporation, Joncryl® HRC 1663, data sheet (Nov. 13, 2008) 2 pages.
BASF Corporation, Joncryl® LMV 7000 Series User's Guide (2009) 3 pages.
BASF SE, "Faster, stronger and more efficient! Joncryl® HPD 296—water-based resin technology for high performance pigment dispersions" brochure (2009) 8 pages.
BASF, "BASF Resins," http://www2.basf.us/naftaresins/, Publication date unknown, last printed Mar. 10, 2009, 1 page.
Bristow, J.A., "Liquid absorption into paper during short time intervals," Svensk Papperstidning (1967) 70(19):623-629.
BYK-Chemie GmbH, Data Sheet W210 for DISPERBYK-190, DISPERBYK-191, DISPERBYK-192, DISPERBYK-194 (2008) 4 pages.
Cabot Corporation, "CAB-O-JET® 200" (Feb. 2009) 1 page.
Carbon Black Handbook, published by Carbon Black Society, issued by Tosho Shuppan Co. p. 440-441.
Cary Company, The, "Degussa Carbon Blacks," http://www.thecarycompany.com/products/Degussa-Blacks.html (Jun. 8, 2007) 3 pgs.
Casas-Ballester, R., Recharger Magazine (Jul. 1999).
Columbian Chemicals brochure, "Raven blacks: industrial applications require powerful solutions," Apr. 22, 2005, 5 pages.
Concise Encyclopedia of Polymers, Science & Engineering (1990) 160-171.
Cytec Surface Specialties, "Fiche de donnees de securite conforme a la Directive 2001/58/CE, Ebercryl 2003" (2005) 8 pages.
Degussa, "Purity of Pigment Black," Technical Information TI 1223 (Feb. 2001) 3 pages.
Degussa, What is Carbon Black? Brochure, 9 pages.
Donnet, J.B. et al., "No. 294—Etude de l'action chimique des oxydants sur le noir de carbone" or "No. 294—Study of he chemical action of oxidants on carbon black," (1962) 1727-1735 (with English translation).
Donnet, J.B. et al., "Radical reactions and surface chemistry of carbon black No. 252," Bull. Soc. Chim. Fr. (1960) 1609-1618.
Donnet, J.B. et al., "Surface chemistry and priviledged sites of fine charges," Extract from the revue General du Caoutchouc (1959) 3-12 (28 pages).
Ehrburger, D.F. et al., "Use of N2, Ar and CO2 adsorption for the determination of microporosity and surface fractal dimension of carbon blacks and silicas," Pure & Appl. Chem. (1993) 65(10):2223-2230.
Fujiu, T. et al., "Oxidation of hydrazino-1,3,5-triazine," Nippon Kagaku Kaishi (1989) 1652-1654.
Galgoci, E.C. et al., "Innovative molecular defoamer technology," Air Products and Chemicals, Inc., Pub. No. 120-05-017-GLB (2004) 1-19.
Hanke, M.T. et al., "Studies on proteinogenous amines. XIV. A microchemical colorimetric method for estimating tyrosine, tyramine and other phenols," J. Biol. Chem. (1922) 50:235-270.
Harris, J.M., "Laboratory synthesis of polytheylene glycol derivatives," JMS—Rev. Macromol. Chem. Phys. (1985) C25(3):325-373.
Hirtt, P., "Carbon black oil absorption, ASTM D2414 and D3493 recent evolution and changes," India Rub Tech Expo 2004, Feb. 13-14, 2004, Mysore, Karnataka, India.
http:inoxairproducts.com/chemicals/surfynoladditives.html Surfynol & Dynol Additives (Aug. 14, 2009—originally accessed Sep. 10, 2007).
http://www.answers.com/topic/sulfonation-and-sulfation, "Sulfonation and sulfation," (2009) 1 page.
http:www.nissin-chem.co.jp/english/products/new.html, "Surfynol/Olfine" (Aug. 14, 2009—originally accessed Sep. 10, 2007).
Huntsman Corporation, "JEFFSPERSE® X3102 Dispersant" Advanced Technical Bulletin (2008) 2 pages.
Huntsman Corporation, "SURFONAMINE® B-60 Amine" Technical Bulletin (2007) 2 pages.
Huntsman Corporation, "SURFONAMINE® L-100 Amine" Technical Bulletin (2007) 2 pages.
Huntsman Corporation. "SURFONAMINE® L-207 Amine" Technical Bulletin (2007, 2008) 2 pages.
Huntsman Corporation, "SURFONAMINE® L-300 Amine" Technical Bulletin (2007, 2008) 2 pages.
Huntsman Corporation, "The use of SURFONAMINE® amines in ink and pigment applications," Technical Bulletin (2006) 5 pages.
International Agency for Research on Cancer (IARC)—Summaries and Evaluations "Carbon Black" (1996) 65:149.
Johnson Polymer, Material Safety Data Sheet for JONCRYL® HPD 296 (2005) 1-5.
Johnson Polymer, Material Safety Data Sheet for JONCRYL® HPD 96 (2004) 1-5.
Johnson, J.E., "Surface modification of black pigments: a novel approach for advancing black pigment performance in imaging systems," Proceedings of IS&T Annual Conference XX, XX, No. 50th Conference (1997) 310-312.
Knapp, D.R., "Derivation of particular compound types," in Handbook of analytical derivatization reactions, 9th Edition, John Wiley & Sons (1979) p. 60.
Koessler, K.K. et al., "Studies on proteinogenous amines. II. A microchemical colorimetric method for estimating imidazole derivatives," J. Biol. Chem. (1919) 39:497-519.
Kunishima, M. et al., "Development of chlorotriazine polymer dehydrocondensing reagents (Poly-Trzs)," Tetrahedron (2007) 63:2604-2612.
Lahaye, J. et al., "Surface chemistry of carbon: an atomistic approach," Pure & Appl. Chem. (1989) 61(11):1853-1858.
Lessard, B. et al., "Styrene/acrylic acid random copolymers synthesized by nitroxide-mediated polymerization: effect of free nitroxide on kinetics and copolymer composition," Macromolecules (2008) 41(10):3446-3454.
Luthge, T. et al., "New methods of carbon black surface modification," IS&T's NIP 19:2003 International Conference on Digital Printing Technologies, p. 194-198.

MacKenzie, J.D. et al., "Physical properties of sol-gel coatings," J. Sol-Gel Science & Tech. (2000) 19:23-29.

Mellor, J.W., "Oxides and oxyacids of chlorine, etc.," from Modern Inorganic Chemistry, Longmans, Green and Co., New York (1925) p. 334-335.

National Industrial Chemicals Notification and Assessment Scheme (NICNAS), Full Public Report "Polymer in JONCRYL® HPD 96 MEA," (2006) 1-7.

Nippon Shokubai, "Polyethyleneimine: EPOMIN" taken from http://www.shokubai.co.jp/eng/products/epomin.html (2006) 10 pages.

PMB, Ltd., "What is masterbatch?" http://www.pmb.co.uk/masterbatch.htm (2007) 2 pages.

Powell Fabrication & Manufacturing Inc., "General Information about sodium hypochlorite," http://www.powellfab.com/technical_information/preview/general_info_about_sodium_hypo.asp, First date available unknown, Jun. 10, 2009.

Sartomer Company, Inc., Product Bulletin: SMA® 1440 H Solution (2002) 1 page.

Sartomer Company, Inc., Product Bulletin: SMA® 17352 H Solution (2002) 1 page.

Sax, N. I., Dangerous Properties of Industrial Materials, Reinhold Publishing Corporation, New York (1957) 778 and 1122.

Sensient Imaging Technologies, Inc., Material Safety Data Sheet for JONCRYL 678 SOL EXP. 8003-112-01 (2008) 1-4.

Subramanian, R.V., "Electrochemical polymemrization and deposition on carbon fibers," Pure & Appl. Chem. (1980) 52:1929-1937.

Suetsugu, A. et al., "Effects of amphiphilic amines on moisture characteristics of alluvial and volcanic soils," Soil. Sci. Soc. Am. J. (2001) 65:1129-1135.

Textile Printing, LCW Miles, 2nd Edition (1994) ch. 3.2.

Torres, L. et al., "Isolation and characterization of an Fe(III)-chelating compound produced by pseudomonas syringae," App. Environ. Microbiol. (1986) 52(1):157-160.

Tsubokawa, N. et al., "Grafting of polyesters onto carbon black. 2. Effect of temperature and solvent on the polymerization of beta-propiolactone initiated by COOK groups on the surface of carbon black," Polymer Bulletin (1982) 7:589-596.

Tsubokawa, N., "Carbon-black," Polymer Sci. Tech. (1991) 2(2):71-80.

Tsubokawa, N. et al., "Grafting onto carbon black having few functional group 1. Introduction of carboxyl group by use of radical initiator and its application for grating of polyesters," Nihon Gomu Kyoukaishi (1989) 62:668-673 (Abstract only).

Tsubokawa, N. et al., "Reactive carbon black having isocyanate or acyl azide group. Preparation and reaction with polymers having hydroxyl group," Polymer Bulletin (1985) 13:215-222.

Tsubokawa, N. et al., "Grafting of functional polymers onto reactive carbon black having chlorotriazinyl groups," Polymer Journal (1988) 20(9):721-728.

Tsubokawa, N. et al., "Grafting onto carbon black by the reaction of reactive carbon black having acyl chloride group with several polymers," Polymer Bulletin (1987) 17:87-93.

Tsubokawa, N. et al., "Grafting onto carbon black by the reaction of reactive carbon black having epoxide groups with several polymers," J. Poly. Sci. Part A: Poly Chem. (1980) 27:1701-1718.

Tsubokawa, N., "Functionalization of carbon black by surface grafting of polymers," Prog. Polym. Sci. (1992) 17:417-470.

Vancha, A.R. et al., "Use of polyethyleneimine polymer in cell culture as attachment factor and lipofection enhancer," BMC Biotechnology (2004) 4:23, 12 pages.

Voorhies, J.D. et al., "Coulometry with the carbon black electrode," Anal. Chem. (1960) 32(13):1855-1857.

International Search Report and Written Opinion of Application No. PCT/US2007/083257 dated Apr. 14, 2008 (9 pages).

International Search Report and Written Opinion of Application No. PCT/US2007/083258 dated Apr. 14, 2008 (9 pages).

Partial International Search for Application No. PCT/US2008/074086 dated Apr. 6, 2009 (3 pages).

United States Office Action for U.S. Appl. No. 11/933,116 dated Feb. 13, 2009 (8 pages).

International Search Report and Written Opinion for Application No. PCT/US2008/074086 dated Aug. 18, 2009 (13 pages).

European Patent Office Action for Application No. 07844788.5 dated Dec. 19, 2011 (4 pages).

International Search Report and Written Opinion for Application No. PCT/US2010/030311 dated Aug. 3, 2011 (14 pages).

* cited by examiner (a)

(b)

(c)

INKS COMPRISING MODIFIED PIGMENTS AND METHODS FOR MAKING AND USING THE SAME

CROSS-REFERENCE TO RELATED APPLICATIONS

This application claims priority under 35 U.S.C. §119(e) to U.S. Provisional Patent Application No. 60/855,573 filed Oct. 31, 2006, the entire content of which is hereby incorporated by reference.

FIELD OF USE

The present invention relates to a method of making self-dispersing pigments. More particularly, the present invention relates to the surface modification of pigments, as well as inks, such as inkjet inks, comprising surface-modified pigments.

BACKGROUND

Pigments offer several advantages over water-soluble dyes when it comes to inkjet inks. Pigments may exhibit at least one of greater light resistance, water resistance, optical density and edge acuity than water-soluble dyes. Unfortunately, pigments also have a greater propensity to settle during storage, thus initially limiting their use in inkjet inks. The advent of media mills to grind pigment particles to sub-micron level combined with chemical additives for colloidal stability has propelled the use of pigment dispersions in inkjet ink formulations. However, chemical additives can increase the viscosity of a dispersion such that it becomes difficult to jet the ink from the small orifices in an inkjet printhead. Moreover, chemical additives can add significant cost to the preparation of inkjet inks and are therefore economically unfavorable as well. A need remains for improved ink compositions, especially for use in inkjet printers, which overcome the problems typically associated with current dye-based systems and pigment systems employing chemical additives.

SUMMARY

In one embodiment, the invention provides an ink composition that includes a self-dispersing pigment that has about 0.02 to about 1.0 mMoles of S and about 0.2 to about 2.0 mMoles of active hydrogen per gram of pigment, water, and an organic solvent.

In another embodiment, the invention provides a method of making an ink composition that includes sulfonating a pigment, subsequently oxidizing the pigment to produce a modified pigment, and incorporating the modified pigment into an ink.

Other aspects of the invention will become apparent by consideration of the detailed description and accompanying drawings.

DETAILED DESCRIPTION

Figure 1:
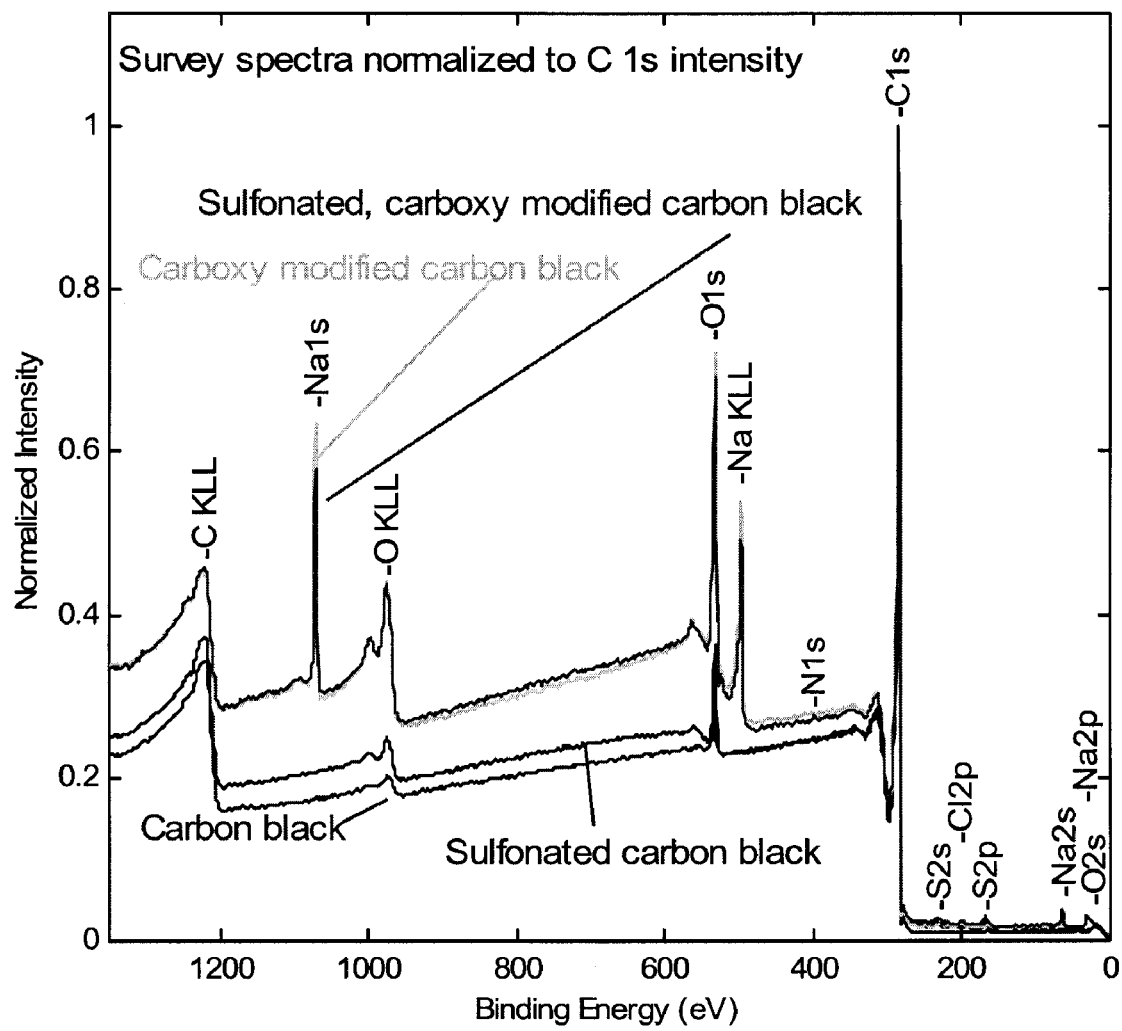
FIG. 1 displays low resolution X-Ray Photoelectron Spectroscopy (XPS) spectra for carbon black (Sample 1), carboxy modified carbon black (Sample 2), sulfonated carbon black (Sample 3) and sulfonated, carboxy modified carbon black (Sample 4), as set forth in Example 20.

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

Surface Modified Pigments

One aspect of the present invention relates to a method for making stable, self-dispersing pigments.

As used herein, the term "pigment" means a colored material insoluble in a solvent medium used to impart color to a substrate such as plain or coated paper, film and other types of receiving media.

As used herein, the term "self-dispersing pigment" means a pigment having stabilizing groups covalently attached to its surface such that the pigment forms a stable aqueous dispersion in the absence of any additional dispersing agents.

As used herein, the term "stable" means that on aging the dispersion will undergo minimal changes as demonstrated by less than 10% change in measured critical properties such as mean particle size, large particle count, viscosity, surface tension or pH, when the dispersion is stored at ambient temperature for at least about 3 months, at least about 6 months, or at least about 2 years, or when the dispersion is stored at 70° C. for at least about 1 week, at least about 2 weeks, at least about 3 weeks or at least about 4 weeks.

The method for making the self-dispersed pigments generally comprises (1) attaching hydrophilic groups to the surface of the pigment by sulfonation and (2) subsequently oxidizing the surface of the pigment to impart greater charge density around the particle. The oxidation step adds surface modifying groups that may include carboxyl groups, lactone groups, phenolic groups, quinone groups and combinations thereof. More particularly, the oxidation step adds surface modifying groups comprising carboxyl groups.

Pigments

Pigments that may be surface modified according to the present invention may include, but are not limited to, azo pigment, phthalocyanine pigment, anthraquinone pigment, quinacridone pigment, thioindigo pigment, triphenylmethane lake pigment, and oxazine lake pigment. Specifically, those having yellow colors include, for example, C. I. Pigment Yellow 1, 2, 3, 4, 5, 6, 7, 10, 11, 12, 13, 14, 15, 16, 17, 65, 74, 83, 97, 138 and 155. Those having red colors include, for example, C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 49, 50, 51, 52, 53, 55, 60, 64, 83, 87, 88, 89, 90, 112, 114, 122, 123 and 163. Those having blue colors include, for example, Solvent Blue 67 and C. I. Pigment Blue 2, 3, 15, 16, 22 and 25. Those having black colors include, for example, C. I. Pigment Black 1 and 7. Commercially available colored pigments include, for example, Pigment Red 122 (available from Lansco Colors, Montvale, N.J.), Pigment Red 122 (available from BASF Color, Charlotte, N.C.), Pigment Red 122 (available from Clariant Colors, Charlotte, N.C.), Pigment Red 122 (available from Sun Chemical, Cincinnati, Ohio), Pigment Blue 15:1 (available from Fanwood Chemical, Fanwood, N.J.), Pigment Blue 15:3 (available from BASF Corporation, Charlotte, N.C.) and Solvent Yellow 33 (available from Rainbow Chemicals, Northbrook, Ill.).

Suitable pigments also include carbon black. Carbon black is the generic name for carbon particles derived from the thermal decomposition or the incomplete combustion of natural gas and hydrocarbons, such as aromatic oils on coal tar basis, mineral oils, coal tar distillate, and acetylene. More than 100 individual grades of carbon black are available on the market today, each with its own distinctive set of characteristics and properties. Any acidic carbon black, neutral carbon black and alkaline carbon black may be beneficially subjected to the treatment disclosed in the present invention. This includes channel blacks, gas blacks, lamp blacks, thermal blacks, acetylene blacks and furnace blacks. More particularly, suitable carbon blacks include channel blacks. The quality of carbon black utilized will have an impact on the critical properties of the dispersion such as mean particle size, opacity, color shade, stability, etc. Examples of commercially available carbon blacks include, but are not limited to, those available from Cabot (Elftex 8, Black Pearls® 490, Black Pearls® 120, Monarch® 120, Monarch® 700, Monarch® 880, Monarch® 1000, Monarch® 1100, Monarch® 1300, Monarch® 1400, Mogul® L, Regal® 99R, Regal® 250R, Regal® 300R, Regal® 330R, Regal® 400R, Regal® 500R, Regal® 660R), Degussa (NIPex® 150 IQ, NIPex® 150, Printex® 55, Printex® 80, Printex® 90, Printex® A, Printex® G, Printex® U, Printex® V, Printex® 140U, Printex® 140V, Purex® LS 35, Corax® HP 160, Thermal Black N 990, NIPex® 160 IQ, NIPex® 90, Special black 4, Special black 4A, Special black 5, Special black 6, Special black 100, Special black 250, Color black FW1, Color black FW2, Color black FW2V, Color black FW18, Color black FW200, Color black S150, Color black S160 and Color black S170), Columbian (Raven® 780, Raven® 5000 UII, Raven® 1255, Raven® 2500 U, Raven® 3600 U, Raven® 3500, Raven® 7000, Raven® 1220 and Raven® 1225) and Mitsubishi Kagaku K.K. (MA8, MA11, MA77, MA100, MA220, MA230, MA600, MCF88, #10B, #20B, #30, #33, #40, #44, #45, #45L, #50, #55, #95, #260, #900, 970#, #1000, #2200B, #2300, #2350, #2400B, #2650, #2700, #4000B and CF9).

Carbon black is available in a variety of particle sizes. Generally, smaller particle sizes are associated with larger surface areas, and larger surface areas can accommodate a higher concentration of hydrophilic surface groups, which ultimately enhance the dispersibility of the carbon black in aqueous-based media. Therefore, particle size can influence the dispersibility of a surface-modified pigment. The average primary particle size of carbon blacks in the present invention may be less than about 30 nm, particularly less than about 20 nm, and more particularly less than about 10 nm. Aggregates of carbon black particles may be less than about 200 nm, particularly less than about 150 nm, and more particularly less than about 100 nm. The surface area of carbon black particles may be greater than about 100 $m^2/g$, particularly greater than about 150 $m^2/g$, and more particularly greater than about 200 $m^2/g$. Carbon black particles with larger dimensions may be comminuted to a desired size either before or during surface modification using any number of techniques known to those skilled in the art. Such techniques may include, but are not limited to, a ball mill, an attritor, a flow jet mixer, an impeller mill, a colloidal mill and a sand mill (e.g., one commercially sold under the tradename 'Super Mill', 'Agitator Mill', 'Dyno-mill' or 'Beads Mill'). Mill media may include, but are not limited to, glass beads, zirconia beads and stainless steel beads. Mill media may comprise particles ranging in size from about 0.01 mm to about 5 mm, and more particularly from about 0.1 mm to about 0.3 mm. If the carbon black is easily crumbled, a rotary homogenizer or an ultrasonic homogenizer may be used to reduce particle size. In one embodiment, a surface-modified black pigment is made from a commercial grade carbon black pigment consisting of primary particle sizes less than about 30 nm and aggregates not more than about 200 nm with a surface area greater than about 100 $m^2/g$.

By way of example, surface modification of carbon black will be generally described below. However, the surface modification may be similarly applied to other colored pigments, such as those mentioned above and described in the Example section below.

Sulfonation

Hydrophilic groups comprising sulfonic acid are attached to carbon black by sulfonation with sulfuric acid, oleum (fuming sulfuric acid) or a combination thereof. Attachment of sulfonic acid groups directly on the surface of the carbon black pigment may also be achieved by sulfonating with other known chemical agents such as chlorosulfonic acid or by displacement of a leaving group attached to the pigment, such as halogen with a suitable reagent such as sodium bisulfite.

In the case of sulfonating carbon black with sulfuric acid, oleum or a combination thereof, a suitable acid strength for sulfonation lies in the range of about 85% to about 104% (weight of sulfuric acid/total weight), particularly in the range of about 90% to about 102% (weight of sulfuric acid/total weight), and more particularly in the range of about 99% to about 101% (weight of sulfuric acid/total weight). The combination of acid strength, reaction temperature and duration determine how many sulfonic acid groups are attached to the surface of the pigment, therefore strength of sulfuric acid used in the present invention is best determined in conjunction with other critical parameters. In one embodiment, as represented by Example 2, sulfonation is carried out with a mixture of carbon black and equal amounts of concentrated sulfuric acid and oleum (20% excess $SO_3$). In other embodiments, as represented by Example 1, sulfonation is carried out with a mixture of carbon black and 20% oleum. In yet other embodiments, as represented by Example 3, sulfonation is carried out with a mixture of carbon black and 99.4% sulfuric acid. Similar acid strengths may be employed in the sulfonation of pigments other than carbon black. In one embodiment, as represented by Example 12, sulfonation is carried out with a mixture of C.I. Pigment Red 122 and 90% sulfuric acid.

The ratio (by weight) of carbon black to acid is largely determined as a function of operational efficiency which includes mixing, ease of transfer and cost. A minimum of acid to carbon ratio of about 4:1 (wt/wt) is needed to get good mixing throughout the reaction. A large excess such as a ratio of about 20:1 (wt/wt) does not result in significant benefit but increases the cost of both materials and waste handling.

Sulfonation of the carbon black is carried out at elevated temperatures for a period of up to about 2 days. The reaction temperature during sulfonation may be at least about 25° C., particularly at least about 80° C., and more particularly at least about 120° C. Furthermore, the reaction temperature during sulfonation may be less than or equal to about 160° C., particularly less than or equal to about 140° C., and more particularly less than or equal to about 120° C. This includes embodiments where the reaction temperature during sulfonation is about 80° C. to about 120° C. Generally, higher temperatures require shorter reaction times to achieve a desirable concentration of sulfonic acid groups on the surface of carbon black. For example, the desired sulfonation at a reaction temperature of 140° C. may take about two hours, whereas the same degree of sulfonation at 80° C. would be expected to take more than two hours. In some embodiments, a suitable reaction time may be at least about 12 hours, in others at least about 24 hours, and in yet others at least about 40 hours. In other embodiments, the suitable reaction time may be less than or equal to about 48 hours, in others less than or equal to about 30 hours, and in yet others less than or equal to about 20 hours. This includes embodiments where the suitable reaction time is from about 2 hours to about 48 hours. The contents of the reaction vessel are stirred during sulfonation to insure adequate mixing.

After sulfonation, the reaction mixture may be quenched in water. In some embodiments, the reaction mixture may be cooled to a temperature less than about 100° C. prior to quenching, in others to a temperature of less than about 80° C. prior to quenching, and in yet others to a temperature less than about 60° C. prior to quenching. This includes embodiments where the reaction mixture is cooled to a temperature of about 60° to about 65° C. prior to quenching. The water into which the reaction mixture is added may be at or below a temperature of about 10° C. using, for example, ice, a cooling device or combination thereof. The sulfonated product, referred to as a carbon sulfonation cake, may be isolated from the water by filtration and washed free of excess reactants and water soluble products.

Oxidation

The carbon sulfonation cake is subsequently oxidized with oxidizing agents known to modify the carbon surface by attaching hydrophilic groups such as carboxyl groups, lactone groups, phenolic groups, quinone groups and combinations thereof. The oxidation method may include, but is not limited to, contact with air, a gas phase oxidation method using reaction with a nitrogen oxide or ozone, a liquid phase oxidation method using an oxidizing agent such as nitric acid, potassium permanganate, potassium dichromate, perchloric acid, a hypohalite, hydrogen peroxide, a bromine aqueous solution or an ozone aqueous solution. In one embodiment, oxidation of the carbon black is carried out using a hypohalogenous acid and/or its salt. Suitable hypohalogenous acids or salts thereof include, but are not limited to, sodium hypochlorite (NaOCl), potassium hypochlorite (KOCl), sodium hypobromite (NaOBr), and potassium hypobromite (KOBr). More particularly, the oxidizing agent comprises NaOCl.

In some embodiments, oxidation of the carbon sulfonation cake includes reacting carbon black with hypohalite salts in an aqueous medium. The carbon sulfonation cake may be dispersed in deionized water prior to the addition of hypohalite salts. The initial concentration (by weight) of hypohalite salt in the reaction mixture is at least about 1%, particularly at least about 5%, and more particularly at least about 10%. Furthermore, the concentration of hypohalite salt may be less than or equal to about 14%, particularly less than or equal to about 12% or about 10%, and more particularly less than or equal to about 7% or about 5%. This includes embodiments where the concentration of hypohalite salt is about 5% to about 10%. The proportion (by weight) of hypohalite salt to carbon sulfonation cake is about 1:20 to about 1:5, particularly about 1:15 to about 1:8, and more particularly about 1:11 to about 1:9. For pigments other than carbon black, the proportion (by weight) of hypohalite salt to sulfonation cake is about 1:5 to about 1:1.

Reaction between the carbon sulfonation cake and oxidizing agent may occur for a period of about 1 to about 2 hours with mixing. If necessary, to consume all of the hypochlorite, the oxidation reaction can be carried out at an elevated temperature of about 30° C. to about 90° C. In some embodiments, the reaction may be carried out at about 80° C. In other embodiments, the reaction may be carried out at about 60° C. The oxidation step may, but need not, be repeated one or more times.

Oxidation of the carbon black creates acidic surface groups that can lower the pH of the reaction mixture. A decrease in pH may result in a destabilization of the modified pigment dispersion during the oxidation treatment and may also result in an increase in viscosity. Therefore, the pH may be adjusted, as needed, before and during oxidation with a basic reagent. The pH of the reaction mixture prior to oxidation may be greater than or equal to about 7, particularly greater than or equal to about 10 or about 11, and more particularly greater than or equal to about 12. The pH of the reaction mixture during oxidation may be greater than or equal to about 9, particularly greater than or equal to about 10, and more particularly greater than or equal to about 11. The pH may be adjusted by any known method in the art including, for example, the addition of base. Suitable bases may include, but are not limited to, alkali hydroxides and calcium free alkali hydroxides (e.g., NaOH, KOH and LiOH), alkali carbonates and bicarbonates (e.g., $NaHCO_3$, $KHCO_3$), and organic bases (e.g., dimethylethanol amine and triethanol amine). In particular, a suitable pH adjuster comprises calcium free sodium hydroxide.

Isolation of Surface Modified Pigment

After oxidation, the modified pigment, such as the modified carbon black described above, may be isolated from the reaction mixture as a dry powder. The resultant modified pigment may be purified by using any number of techniques known to those skilled in the art to remove unreacted raw materials, byproduct salts and other reaction impurities. Purification techniques may include, but are not limited to, filtration, centrifugation, or a combination of the two. The modified pigment may also be isolated, for example, by evaporation or it may be recovered by filtration and drying using techniques known to those skilled in the art.

Alternatively, the modified pigment may be delivered as a concentrated aqueous pigment dispersion. Dispersions of the pigments of the present invention may be purified to remove impurities and other undesirable free species which can coexist in the dispersion as a result of the manufacturing process. Purification techniques may include, but are not limited to, water washing, reverse osmosis, and ultrafiltration. In some embodiments, dissolved impurities may be removed by ultrafiltration until each of the chloride content and the sulfate content of the feed sample adjusted to 10% solids is less than about 150 ppm, particularly less than about 100 ppm, and more particularly less than about 10 ppm. If necessary, the pH of the dispersion may be adjusted prior to purification. A sufficient amount of acid or base may be added to adjust the pH of the dispersion to at least about 7, particularly to at least about 8, and more particularly to at least about 9. This includes embodiments where the pH of the dispersion is about 7 to about 9. The dispersion may be concentrated if desired by removal of some of the water. In some embodiments, the dispersion is concentrated to at least about 8% or about 10% solids, in others to at least about 18% solids, and in yet others to at least about 20% solids. This includes embodiments where the dispersion is concentrated to about 14% to about 16% solids.

A biocide may also be added to the dispersion to inhibit the growth of microorganisms. Examples of suitable biocides include, but are not limited to, sodium benzoate, pentachlorophenol sodium, 2-pyridinethiol-1-oxide sodium, sodium sorbate, sodium dehydroacetate, benzisothiazolinone, 1,2-dibenzothiazolin-3-one, methylisothiazolinone and chloromethylisothiazolinone. Commercially available biocides include Proxel® CRL, Proxel® BDN, Proxel®5 GXL, Proxel® XL-2, and Proxel® TN (available from Arch Chemicals, Smyrna, Ga.).

The dispersion may be filtered through filter cartridges as required for the designated end use of the dispersion. In some embodiments, the nominal pore size of the filter cartridge is less than or equal to about 5 microns, particularly less than or equal to about 1 micron, and more particularly less than or equal to about 0.5 or about 0.3 micron.

In addition to powders and dispersions, the modified pigment may also be isolated as a water wet presscake. In presscake form, the modified pigment is not agglomerated to the extent that it is in dry form and thus the modified pigment does not require as much deagglomeration when used, for example, in the preparation of inks.

If desired, the counterions associated with the surface-modifying groups as a result of the sulfonation/oxidation process may be exchanged or substituted with other suitable cations using known ion-exchange techniques such as ultrafiltration, reverse osmosis, conversion to acid form as an intermediate, and the like. Examples of suitable cations that may be exchanged include, but are not limited to, alkali metal ions (e.g., $K^+$ and $Li^+$), alkaline earth metals (e.g., $Ca^{2+}$, $Mg^{2+}$ and $Ba^{2+}$) and $NR_1R_2R_3H^+$ wherein $R_1$, $R_2$ and $R_3$ may independently be H or $C_1$-$C_8$ alkyl groups that may be unsubstituted or substituted. Exemplary cations include, but are not limited to, tetraethylammonium, tetramethylammonium (TMA), ethanolammonium, triethanolammonium (TEA), monoethanolammonium (MEA), tetrabutylammonium (TBA), etc. In one embodiment, as represented by Example 19, the pKa differences between the surface carboxyl and sulfonyl groups can be beneficially exploited for partial exchange of counterions.

Properties of Modified Pigments

The method of modifying pigments by sulfonation and subsequent oxidation may, but need not, provide several advantages over pigments that have been treated with sulfonation or oxidation alone. For example, the modified pigments of the present invention may exhibit greater dispersability. As presented in the Examples section, Commercial pigment red 122 was modified by sulfonation and oxidation (Examples 10-13), oxidation only (Comparative Example 1) and sulfonation only (Comparative Example 2). The comparative examples are disclosed in U.S. Pat. Nos. 6,596,068 and 6,648,954, respectively. The oxidized pigment in Comparative Example 1 began to settle upon standing within three days at ambient temperature. The sulfonated pigment in Comparative Example 2 exhibited hard settling in the bottom of a container after setting for one week in an oven at 70° C. In contrast, the sulfonated/oxidized pigments of Examples 10-13 exhibited no observable settling after setting for two weeks at 70° C. More generally, the dispersions of the present invention may not settle for at least about 1 week, more particularly at least about 3 weeks, and even more particularly at least about 4 weeks when stored at 70° C.

Other advantages may include a greater concentration of surface modifying groups. Example 22 contrasts the TGA spectra for a sulfonated, carboxy modified carbon black (obtained from the procedure of Example 7) with a carboxy modified carbon black (i.e., Sensijet® Black SDP 1000, available from Sensient Colors, Inc., St. Louis, Mo.). Both modified carbon blacks exhibit three distinct weight loss regions. The sulfonated, carboxy modified carbon black exhibits a weight loss equivalent to 1424 µMoles $CO_2$ per gram of pigment from 103-313° C. In contrast, the carboxy modified carbon black exhibits a weight loss equivalent to 1239 µMoles $CO_2$ per gram of pigment from 101-308° C. The greater weight loss equivalent over similar temperature ranges for the carboxy modified carbon black suggests a greater concentration of surface modifying groups when compared to the carboxy modified carbon black.

Modified pigments of the present invention in an aqueous dispersion take up about 0.1 to about 1.7 mMoles of HCl when titrated with 2.0 N HCl. In the case of carbon black, this range is typically about 1.4 to about 1.7 mMoles of HCl when titrated with 2.0 N HCl, as represented in Example 23.

Carbon black modified according to the present invention may comprise about 0.3 to about 1.0 mMoles of S per gram of pigment, particularly about 0.5 to about 0.8 mMoles of S per gram of pigment. Colored pigments other than carbon black (such as yellow, magenta and cyan) may comprise about 0.02 to about 0.9 mMoles of S per gram of pigment, particularly about 0.03 to about 0.2 mMoles of S per gram of pigment.

The modified carbon black may comprise about 1.0 to about 2.0 mMoles of active hydrogen per gram of pigment, particularly about 1.5 to about 1.8 mMoles of active hydrogen per gram of pigment. Colored pigments other than carbon black (such as yellow, magenta and cyan) may comprise about 0.2 to about 1.5 mMoles of active hydrogen per gram of pigment, particularly about 0.3 to about 1.0 mMoles of active hydrogen per gram of pigment.

Dispersions of the present invention may have viscosities ranging from about 1.5 to about 3.0 cP, particularly about 1.8 to about 2.6 cP. Surface tensions may range from about 60 dynes/cm to about 72 dynes/cm, particularly about 67 dynes/ cm to about 72 dynes/cm. pH values may range from about 7 to about 9, particularly about 7.4 to about 8.5.

The self-dispersing pigments of the present invention may also exhibit long-term and high temperature stability, higher water and highlighter resistance than expected of a pigment with attached sulfonic or carboxylic acid groups, and have particle size distributions comparable to products typically obtained only after particle reduction processes such as "milling".

The modified pigments according to the present invention may be used in a number of end use applications. These uses include, but are not limited to, coatings, paints, papers, adhesives, latexes, toners, textiles, fibers, plastics and inks. The modified pigments produced by the process of the invention are particularly well-suited for use in inkjet inks.

Ink Jet Inks

Another aspect of the present invention relates to inkjet ink formulations using the surface-modified pigments described above. Inkjet formulations comprising such modified pigments or dispersions comprising such modified pigments may do at least one of the following: 1) provide uniform, bleed-free images, when printed both on a plain and color background, with high resolution and high density on print media; 2) not cause nozzle clogging which typically occurs due to drying of the ink at a distal end of a nozzle; 3) rapidly dry on paper; 4) exhibit good light resistance and water resistance; 5) demonstrate good long-term storage stability; 6) demonstrate print characteristics which are independent of the paper quality; and 7) provide resistance to highlighter after printing.

The ink compositions of the present invention may be prepared by combining the above modified pigments with an aqueous vehicle and any suitable additives. The amount of modified pigment (by weight) in the ink composition is suitably at least about 0.1%, particularly at least about 1.5%, particularly at least about 2.0%, and more particularly at least about 2.5% or about 5.0%. Furthermore, the amount of modified pigment (by weight) in the ink composition is less than or equal to about 12% or about 10%, particularly less than or equal to about 10% or about 8%, and more particularly less than or equal to about 5.5% or about 5%. This includes embodiments where the amount of modified pigment (by weight) in the ink composition is present in an amount ranging from about 0.5% to about 10%, and an amount ranging from about 2% to about 5%.

The aqueous vehicle may comprise water or water in combination with one or more water-soluble organic solvents. The type of water used in the ink compositions is not limited. However, distilled water, deionized water, super pure water, and ultrafiltrate may be used to minimize the introduction of impurities. The water may also be sterilized by UV radiation and/or the addition of hydrogen peroxide. The amount of water (by weight) in the ink composition is at least about 40%, particularly at least about 50%, and more particularly at least about 60%. Furthermore, the amount of water (by weight) in the ink composition is less than or equal to about 90%, particularly less than or equal to about 85%, and more particularly less than or equal to about 80% or about 70%. This includes embodiments where the amount of water (by weight) in the ink composition is about 40% to about 85%.

Water-soluble organic solvents may be combined with water to make up the aqueous vehicle. Water-soluble organic solvents may include alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; polyhydric alcohols such as ethylene glycol, diethylene glycol, triethylene glycol, propylene glycol, dipropylene glycol, tripropylene glycol, 1,3-propylene glycol, isopropylene glycol, butylene glycol, isobutylene glycol, 1,4-butanediol, 1,3-butanediol, 1,5-pentanediol, 1,6-hexanediol, 1,2-hexanediol, 1,2,6-hexanetriol, trimethylolpropane, glycerin, polyethyleneglycol, meso-erythritol and pentaerythritol; ketones and ketone alcohols such as acetone and diacetone alcohol; ethers such as tetrahydrofuran and dioxane; lower alkyl ethers of polyhydric alcohols, such as ethylene glycol monomethyl (or monoethyl) ether, diethylene glycol monomethyl (or monoethyl)ether and triethylene glycol monomethyl (or monoethyl)ether; lower dialkyl ethers of polyhydric alcohols, such as triethylene glycol dimethyl (or diethyl)ether and tetraethylene glycol dimethyl (or diethyl)ether; nitrogen-containing solvents such as pyrrolidone, N-methyl-2-pyrrolidone, 1,3-dimethyl-2-imidazolidinone, cyclohexylpyrrolidone, monoethanolamine, diethanolamine, triethanolamine, dimethylformamide and dimethylacetamide; sulfur-containing solvents such as thiodiethanol, thiodiglycerol, sulfolane, and dimethylsulfoxide; propylene carbonate, and ethylene carbonate, sugars and derivatives thereof such as glucose, fructose, galactose, mannose, and xylose; sugar-alcohols; an oxyethylene adduct of glycerin; and an oxyethylene adduct of diglycerin. The water-soluble organic solvents may be used alone or in combination. If a mixture of water and a water-soluble organic solvent is used, the amount of water-soluble organic solvent (by weight) in the ink composition is at least about 1% or about 5%, particularly at least about 15%, and more particularly at least about 20% or about 25%. Furthermore, the amount of water-soluble organic solvent (by weight) in the ink composition is less than or equal to about 80% or about 50%, particularly less than or equal to about 60% or about 30%, and more particularly less than or equal to about 40% or about 15%. This includes embodiments where the amount of water-soluble organic solvent (by weight) in the ink composition is about 5% to about 30%, and more preferably about 1% to about 25%.

Additives may be incorporated into the aqueous vehicle to impart any number of desired properties, such as might be needed to adapt the ink to the requirements of a particular inkjet printer or to provide a balance of light stability, smear resistance, viscosity, surface tension, coating penetration, optical density, adhesion, highlighter resistance or crust resistance. Penetrants, for example, may be added to reduce bleed, improve wetting of the print media, and otherwise improve overall performance of the print image. Examples of penetrants may include, but are not limited to, alkyl alcohols having 1 to 4 carbon atoms, such as ethanol, methanol, butanol, propanol and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono n-propyl ether, ethylene glycol mono isopropyl ether, diethylene glycol mono isopropyl ether, ethylene glycol mono n-butyl ether, ethylene glycol mono t-butyl ether, diethylene glycol mono t-butyl ether, 1-methyl-1-methoxy butanol, propylene glycol monomethyl ether, propylene glycol monoethyl ether, propylene glycol mono t-butyl ether, propylene glycol mono n-propyl ether, propylene glycol mono isopropyl ether, dipropylene glycol monomethyl ether, dipropylene glycol monoethyl ether, dipropylene glycol mono n-propyl ether, and dipropylene glycol mono isopropyl ether, diethylene glycol butyl ether, butyl oxitol glycol ether; diols, such as 1,2-alkyl diols; formamide; acetamide; dimethylsulfoxide; sorbitol; sorbitan; acetin; diacetin; triacetin; and sulfolane. The penetrants may be used alone or in combination. The amount of penetrant (by weight) in the ink composition ranges from 0% to about 60%, particularly from about 0% or about 2% to about 40%, and more particularly from about 0.5% to about 15%, or from about 5% to about 20%, or from about 10% to about 15%.

Surfactants may be added to the aqueous medium to reduce the surface tension of the ink composition. The surfactants may be anionic surfactants, non-ionic surfactants and/or cationic surfactants. Suitable surfactants may include those listed below and in U.S. Pat. No. 5,116,409 issued May 26, 1992, U.S. Pat. No. 5,861,447 issued Jan. 19, 1999, and U.S. Pat. No. 6,849,111 issued Feb. 1, 2005, each of which is hereby incorporated by reference.

The anionic surfactants may include alkylbenzene sulfonate, an alkylphenyl sulfonate, an alkylnaphthalene sulfonate, a higher fatty acid salt, a sulfate ester of a higher fatty acid ester, a sulfonate of a higher fatty acid ester, a sulfate ester and a sulfonate of a higher alcohol ether, a higher alkylsulfosuccinate, a polyoxyethylene alkylether carboxylate, a polyoxyethylene alkylether sulfate, an alkylphosphate, and a polyoxyethylene alkylether phosphate. Specific examples of the anionic surfactant include dodecylbenzene sulfonate, isopropylnaphthalene sulfonate, monobutylphenylphenol sulfonate, monobutylbiphenyl sulfonate, monobutylbiphenyl sulfonate, and dibutylphenylphenol disulfonate.

The nonionic surfactants may include a polyoxyethylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene sorbitol fatty acid ester, a glycerin fatty acid ester, a polyoxyethylene glycerin fatty acid ester, a polyglycerin fatty acid ester, a cane sugar fatty acid ester, a polyoxyethylene alkylamine, a polyoxyethylene fatty acid amide, an alkylalkanolamide, a polyethylene glycol polypropylene glycol block copolymer, acetylene glycol, and a polyoxyethylene adduct of acetylene glycol, and specific examples of the nonionic surfactant include polyoxyethylene nonyl phenyl ether, polyoxyethylene octyl phenyl ether, polyoxyethylene dodecyl phenyl ether, a polyoxyethylene alkyl ether, a polyoxyethylene fatty acid ester, a sorbitan fatty acid ester, a polyoxyethylene sorbitan fatty acid ester, fatty acid alkylolamide, a polyethylene glycol/polypropylene glycol block copolymer, acetylene glycol, and a polyoxyethylene adduct of acetylene glycol.

Specific examples of the water-soluble cationic surfactants used in the present invention may include inorganic or organic acid salts of an aliphatic primary amine such as octylamine, laurylamine, stearylamine, oleylamine, tetradecylamine, hexadecylamine, coconut amine, coconut alkylamine, tallow amine, cured tallow alkylamine, soybean alkylamine and the like; inorganic or organic acid salts of an aliphatic secondary amine such as distearylamine, dioleylamine, di-coconut alkylamine, di-cured tallow alkylamine and the like; inorganic or organic acid salts of aliphatic tertiary amine such as dimethyloctylamine, dimethyldecylamine, dimethyllaurylamine, dimethylmyristylamine, dimethylpalmitylamine, dimethylstearylamine, dilaurylmonomethylamine, dioleylmonomethylamine, trioctylamine, dimethyl coconut amine, coconut alkyldimethylamine, tallow alkyldimethylamine, cured tallow alkyldimethylamine, soybean alkyldimethylamine, di-coconut alkylmonomethylamine, di-cured tallow alkylmonomethylamine and the like; aliphatic quaternary ammonium salts such as tetramethylammonium chloride, tetraethylammonium chloride, tetrapropylammonium chloride, tetrabutylammonium chloride, lauryltrimethylammonium chloride, trioctylmethylammonium chloride, 3-chloro-2-hydroxypropyltrimethylammonium chloride, docosenyltrimethylammonium chloride, hexadecyltrimethylammonium chloride, octadecyltrimethylammonium chloride, coconut alkyltrimethylammonium chloride, tallow alkyltrimethylammonium chloride, octadecyldimethyl (3-trimethoxysilylpropyl)ammonium chloride and the like; aromatic quaternary ammonium salts such as benzyltrimethylammonium chloride, benzyltriethylammonium chloride, benzyltributylammonium chloride, benzyltrimethylammonium chloride, phenyltrimethylammonium chloride, cetyldimethylbenzylammonium chloride and the like; pyridinium salt type compounds (e.g., octylpyridinium chloride, cetylpicolinium chloride), imidazoline type cationic compounds (e.g., 2-heptadecenyl-hydroxyethylimidazolium chloride), benzotonium chloride, ethylene oxide added type quaternary ammonium salts (e.g., polyoxyethylenetrimethylammonium chloride), hydrochloride or acetate of aliphatic amides; salt of polyethylenepolyamine aliphatic amides; salt of urea condensate of polyethylenepolyamine aliphatic amides; quaternary ammonium salt of urea condensate of polyethylenepolyamine aliphatic amides; and N,N-dialkylmorphonium salts; and the like.

Other surfactants include a silicone surfactant such as an oxyethylene adduct of polysiloxane, a fluorinated surfactant such as a perfluoroalkylcarboxylate, a perfluoroalkylsulfonate, or an oxyethyleneperfluoroalkyl ether. A biosurfactant such as spicrispolic acid, rhamnolipid, or lysolecithin can also be used.

Among the above described surfactants, surfactants each having an unsaturated bond and surfactants each having a secondary or tertiary alkyl group may be used. Examples of the surfactant each having an unsaturated bond include alkyl ether derivatives of unsaturated alcohols such as oleyl alcohol, elaidyl alcohol, linoleyl alcohol, linolenyl alcohol, 2-heptanedecene-1-ol, and acetylene alcohol; and alkyl ester derivatives of unsaturated fatty acids such as lauroleic acid, myristoleic acid, oleic acid, linoleic acid, linolenic acid, dodecynoic acid, and octadecynoic acid.

Examples of the surfactant each having secondary or tertiary alkyl group include alkyl ether derivatives of branched alcohols such as 2-ethylhexyl alcohol, 2-octanol, 2-hexadecanol, and 2-octadecanol; and alkyl esters of branched fatty acids such as methylheptadecanoic acid, methylpentadecanoic acid, and methyloctadecanoic acid.

Surfactants are commercially available under various well-known tradenames, such as the PLURONIC® series (BASF Corporation, Parsippany, N.J.), the TETRONIC® series (BASF Corporation, Parsippany, N.J.), the ARQUAD® series (Akzo Chemical Inc., Chicago, Ill.), the TRITON® series (Union Carbide Corp., Danbury, Conn.), the SURFONIC® series (Texaco Chemical Company, Houston, Tex.), the ETHOQUAD® series (Akzo Chemical Inc., Chicago, Ill.), the ARMEEN® series (Akzo Chemical Inc., Chicago, Ill.), the ICONOL® series (BASF Corporation, Parsippany, N.J.), the SURFYNOL® series (Air Products and Chemicals, Inc. Allentown, Pa.), and the ETHOMEEN® series (Akzo Chemical Inc., Chicago, Ill.), to name a few.

The surfactants may be used alone or in combination. The amount of surfactant (by weight) in the ink composition may range from 0% to about 10%, particularly from about 0.1% to about 3%, and more particularly from about 0.05 or about 1.5% to about 3% or about 5%. This includes embodiments where the amount of surfactant (by weight) in the ink composition may range from about 0% or about 0.1% to about 8%.

One or more humectants may be added to the aqueous vehicle to prevent clogging, caused by drying out during periods of latency, of inkjet nozzles. Humectants may be selected from materials having high hygroscopicity and water-solubility. Examples of humectants include, but are not limited to, polyols such as glycerol, ethylene glycol, diethylene glycol, triethylene glycol, tetraethylene glycol, polyethylene glycol, propylene glycol, dipropylene glycol, polypropylene glycol, 1,2-propanediol, 1,3-propanediol, 1,2-butanediol, 1,3-butanediol, 2,3-butanediol, 1,4-butanediol, 1,5-pentanediol, 1,6-hexanediol, 1,8-octanediol, 1,2,4-butenetriol, 1,2,6-hexanetriol and pentaerythritol; lactams such as 2-pyrrolidone, 1-methyl-2-pyrrolidone, N-methyl-2-pyrrolidone and ε-caprolactam; urea compounds such as urea, thiourea, ethyleneurea and 1,3-dimethylimidazolidinone; saccharides such as maltitol, sorbitol, gluconolactone and maltose; 1,4-cyclohexanedimethanol; 1-methyl-2-piperidone; N-ethylacetamide; N-methylpropionamide; N-acetyl ethanolamine; N-methylacetamide; formamide; 3-amino-1, 2-propanediol; 2,2-thiodiethanol; 3,3-thiodipropanol; tetramethylene sulfone; butadiene sulfone; ethylene carbonate; butyrolacetone; tetrahydrofurfuryl alcohol; trimethylpropane; pantothenol and Liponic EG-1. There are no particular limitations on the amount used of the humectant, but in general the amount of humectant (by weight) in the ink composition may range from 0% to about 30%, particularly from about 1% to about 15% or about 20%, and more particularly from about 4% or about 5% to about 10% or about 15%.

Polymers may be added to the ink composition to improve the water resistance, rub resistance and highlighter resistance of the images on print media. Suitable polymers may include, but are not limited to, polyvinyl alcohol, polyester, polyester-melamine, styrene-acrylic acid copolymers, styrene-maleic acid copolymers, styrene-maleic acid-alkyl acrylate copolymers, styrene-metacrylic acid copolymers, styrene-metacrylic acid-alkyl acrylate copolymers, styrene-maleic half ester copolymers, vinyl-naphthalene-acrylic acid copolymers, vinyl naphthalene-maleic acid copolymers and salts thereof. Additional polymers include polyvinylimidazole, derivatives of polyvinylimidazole, copolymers of vinylimidazole, copolymers of vinylimidazole derivatives, polyvinylpyridine, derivatives of polyvinylpyridine, copolymers of vinylpyridine, copolymers of vinylpyridine derivatives, polyethyleneimine, and derivatives of polyethyleneimine. The polymers may be used alone or in combination. The amount of polymer (by weight) in the ink composition may range from 0% to about 5%, particularly from about 0.1% to about 3%, and more particularly from about 0.2% to about 2.5%. This includes embodiments where the amount of polymer (by weight) in the ink composition may range from about 0% or about 0.1% to about 3.0%.

Ink compositions of the present invention may be buffered to a desired pH using any number of pH modifiers. Suitable pH modifiers may include alkali hydroxides (e.g., sodium hydroxide, lithium hydroxide and potassium hydroxide), alkali carbonates and bicarbonates (e.g., sodium carbonate and sodium bicarbonate), ammonium hydroxide, potassium hydrogenphthalate, potassium dihydrogenphosphate, sodium dihydrogenphosphate, sodium tetraborate, potassium hydrogen tartrate, sodium hydrogen carbonate, tris(hydroxymethyl)aminomethane, and tris(hydroxymethyl)aminomethane hydrochloride, triethylamine, dimethylethanolamine, triethanolamine, mineral acids, hydrochloric acid, and sulfuric acid. The pH modifiers may be used alone or in combination. The amount of pH modifier (by weight) in the ink composition may range from 0% to about 3.0%, particularly from about 0.1% to about 2.0%, and more particularly from about 0.05% or about 0.5% to about 1.0% or about 1.5%. This includes embodiments where the amount of pH modifier (by weight) in the ink composition ranges from about 0.05% or about 0.2% to about 1.5% or about 2.5%.

Preservatives, such as biocides and fungicides, may also be added to the ink composition. Examples of suitable preservatives include sodium benzoate, pentachlorophenol sodium, 2-pyridinethiol-1-oxide sodium, sodium sorbate, sodium dehydroacetate, benzisothiazolinone, 1,2-dibenzothiazolin-3-one, methylisothiazolinone and chloromethylisothiazolinone. Commercially available biocides include UCARCIDE® 250 (available from Union Carbide Company), Proxel® CRL, Proxel® BDN, Proxel® GXL, Proxel® XL-2, Proxel® TN (available from Arch Chemicals, Smyrna, Ga.), Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), XBINX® 119G (PMC Specialties Group, Inc., Cincinnati, Ohio), Bioban™ (available from Dow Chemical, Midland, Mich.), and Troysans® (Troy Chemical Corp., Newark, N.J.). The preservatives may be used alone or in combination. The amount of preservatives (by weight) in the ink composition may range from 0% to about 1.5%, particularly from about 0.05% to about 1.0%, and more particularly from about 0.1% to about 0.3%. This includes embodiments where the amount of preservative (by weight) in the ink composition may range from about 0.05% to about 0.5%.

The ink composition may contain one or more viscosity modifiers. Viscosity modifiers may include rosin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum Arabic and starch. The amount of viscosity modifier (by weight) in the ink composition may range from 0% to about 10%, particularly from about 0.5% to about 8%, and more particularly from about 1% to about 5%. This includes embodiments where the amount of viscosity modifier (by weight) in the ink composition may range from about 0% or about 1% to about 7%.

Other additives which may be incorporated into the aqueous vehicle may also include antioxidants, ultraviolet absorbers, chelating agents, corrosion inhibitors, electric conductivity adjusters, viscosity modifiers, oxygen absorbers, anti-kogation agents, anti-curling agents, anti-bleed agents, defoamers, and buffers.

Examples of suitable corrosion inhibitors may include, without limitation, acidic sulfite, sodium thiosulfate, ammonium thioglycolate, diisopropyl ammonium nitrite, pentaerythritol tetranitrate, dicyclohexyl ammonium nitrite, benzotriazole, tolyltriazole, carboxybenzotriazole, and sodium tolytriazole. The corrosion inhibitors may be used alone or in combination. The amount of corrosion inhibitor (by weight) in the ink composition may range from 0% to about 1.0%, particularly from about 0.05% to about 0.5%, and more particularly from about 0.1% to about 0.3%.

The ink compositions of the present invention may contain one or more colorants in addition to the pigment dispersion of the present invention. Such colorants can be selected from the group of pigments and dyes generally useful in inkjet printing. Examples of such dyes may include, but are not limited to, C. I. Direct Black 17, 19, 32, 51, 71, 108, 146, 154, 168; C. I. Direct Blue 6, 22, 25, 71, 86, 90, 106, 199; C. I. Direct Red 1, 4, 17, 28, 83, 227; C. I. Direct Yellow 12, 24, 26, 86, 98, 132, 142; C. I. Direct Orange 34, 39, 44, 46, 60; C. I. Direct Violet 47, 48; C. I. Direct Brown 109; C. I. Direct Green 59; C. I. Acid Black 2, 7, 24, 26, 31, 52, 63, 112, 118; C. I. Acid Blue 9, 22, 40, 59, 93, 102, 104, 113, 117, 120, 167, 229, 234; C. I. Acid Red 1, 6, 32, 37, 51, 52, 80, 85, 87, 92, 94, 115, 181, 256, 289, 315, 317; C. I. Acid Yellow 11, 17, 23, 25, 29, 42, 61, 71; C. I. Acid Orange 7, 19; and C. I. Acid Violet 49. The dyes as described above may be used singly. Alternatively, two or more of the dyes as described above may be used in combination.

Any one of the organic pigments may be used as a colorant. The pigment is not specifically limited. Examples of such pigments may include, but are not limited to, carbon black, azo pigment, phthalocyanine pigment, anthraquinone pigment, quinacridone pigment, thioindigo pigment, triphenylmethane lake pigment, and oxazine lake pigment. Specifically, those having yellow colors include, for example, C. I. Pigment Yellow 1, 2, 3, 4, 5, 6, 7, 10, 11, 12, 13, 14, 15, 16, 17, 19, 65, 74, and 83 and Solvent Yellow 33. Those having red colors include, for example, C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 49, 50, 51, 52, 53, 55, 60, 64, 83, 87, 88, 89, 90, 112, 114, 122, 123, and 163. Those having blue colors include, for example, C. I. Pigment Blue 2, 3, 15, 16, 22, and 25. Those having black colors include, for example, C. I. Pigment Black 1 and 7. Those capable of self dispersion, which are subjected to the surface-modifying treatment and which can be stably dispersed even when no dispersing agent is used, are preferred as the pigment.

The ink compositions of the present invention may be formulated using a variety of methods known in the art. In one embodiment, the inks may be formulated using a two vessel method. In this method, a first vessel is used to make the ink base or diluent. A second vessel is used to slowly dilute the pigmented dispersion during a process commonly called a "letdown." The equipment used in the method of making the ink may be glass, polypropylene, polyethylene, or stainless steel. Other materials that are inert to the ink ingredients may also be used.

First, the appropriate amount of water is added to the first vessel. A mixing device is then placed inside the vessel to agitate the water and provide mixing while the other ingredients are added. Mixing may be achieved either by a magnetic stirring mechanism or a motor driven stirring blade. Any chelating agents are then added to the first vessel and allowed to dissolve prior to the addition of any co-solvents. Next, any desired co-solvents are added and allowed to dissolve. Any desired pH modifiers may then be added and are allowed to dissolve. Finally, any other functional ingredients that may be desired, including, without limitation, surfactants and corrosion inhibitors, may be added and are allowed to dissolve.

The second vessel is prepared by adding the appropriate amount of the pigment dispersion to the vessel. A mixing device is then placed into the vessel. After all of the ingredients in the diluent have dissolved, the diluent is slowly added to the pigment dispersion in the second vessel. The dispersion is mixed during this process. In another embodiment, the pigment dispersion is slowly added to the diluent. After all of the diluent or dispersion has been added, the ink is mixed for about 15 minutes to about 1 hour, or until it is completely homogenous. After mixing, the ink is filtered.

The ink compositions of the present invention are particularly suited for use as an ink composition for inkjet printing wherein droplets of the ink composition are ejected from a printing apparatus and deposited onto a substrate to generate an image. Suitable printing apparatus include, but are not limited to, Continuous Ink Jet (CIJ), prop-on-Demand Valve (DoD Valve), prop-on-Demand Piezo-Electric (DoD Piezo), Memjet and Thermal Ink Jet (TIJ). Similarly, any suitable substrate may be employed including plain papers, bonded papers, coated papers, transparency materials, textile materials, plastics, polymeric films and inorganic substrates. However, it should be recognized by those skilled in the art that the above ink compositions may also have use in other applications including, but not limited to, general writing utensil applications and stamp applications.

The black ink compositions of the present invention may be used alone, or with a color underlay, to produce a black image or in combination with other ink compositions to produce a color image. In some embodiments, the ink composition of the present invention is used in combination with other ink composition(s), such as a black ink, a cyan ink, a magenta ink and/or a yellow ink. In other embodiments, a cyan ink, a magenta ink and a yellow ink are overprinted to form a black image and this printing is used in combination with the printing of the black ink of the present invention.

The ink compositions of the present invention may have certain print performance characteristics. These print performance characteristics are measured in the following manner.

Print Performance Testing:

Water Resistance Procedure. Spectrodensitometer Procedure.

To test water resistance, a sample that is one half inch wide by three inches long is prepared. The top half is left unprinted while the bottom half is printed with the ink of interest. Using an X-Rite 938 spectrodensitometer with a D65 illuminant and 10 degrees standard observer (available from X-Rite Inc., Grand Rapids, Mich.), the printed block portion of the sample is scanned for initial optical density reading. The printer block half of the sample is submerged under DI water for 60 seconds. The sample is removed and laid down to dry completely on a hard surface. The sample is rescanned for soaked optical density reading. The data is recorded as the difference in optical density readings.

The black and color ink compositions of the present invention may have a water resistance value (measured as the difference in optical density) of about 0.00 to about 2.00, preferably a value of about 0.00 to about 0.20, and more preferably a value of less than about 0.05.

Highlighter Resistance Procedure. Spectrodensitometer Procedure.

A printed test image with a black or colored box two inches wide is prepared. Even pressure is applied on the highlighter and moved back and forth in blank portion of the page to create a baseline highlighted section. The procedure is repeated moving back and forth in and out of the black or colored box. An X-Rite 938 spectrodensitometer with a D65 illuminant and 10 degrees standard observer is used, scanning both in the highlighter baseline area and next to the black or colored box where the highlighter is passing. The data is recorded as the difference in optical density readings.

The black ink compositions of the present invention may have a highlighter resistance value (measured as the difference in optical density) of about 0.00 to about 2.00, preferably a value of about 0.00 to about 0.10, and more preferably a value of less than about 0.04.

The color ink compositions of the present invention may have a highlighter resistance value (measured as the difference in optical density) of about 0.00 to about 0.10, and more preferably a value of less than about 0.04.

Rub Resistance Procedure: Sutherland Rub Tester 2000 (available from Danilee Company, San Antonio, Tex.), 100 cycles, Speed 1, 8 Samples, 4 lb, Test Pattern 9 from RFver 1.4 test file. Spectrodensitometer Procedure.

A printed test image with a black or colored box two inches wide is prepared. A wadded up delicate lab tissue is used to apply even pressure and is rubbed back and forth in and out of the black or colored box. An X-Rite 938 spectrodensitometer with a D65 illuminant and 10 degrees standard observer is used to scan both a blank section of the page as a baseline and next to the black or colored box where the rubbing occurred. The data is recorded as the difference in optical density readings.

The black and color ink compositions of the present invention may have a rub resistance value (measured as the difference in optical density) of about 0.00 to about 2.00, preferably a value of about 0.00 to about 0.25, and more preferably a value of less than about 0.10.

ImageXpert Instrument Procedure [Line Width, Edge Acuity, Intercolor Bleed, Mottle].

The ImageXpert SN1 test image is printed. ImageXpert Xaminer JR software (available from ImageXpert, Nashua, N.H.) is used to scan horizontal and vertical line widths, edge acuity, intercolor bleed, and mottle. The line widths and edge acuity are recorded in microns. Mottle is recorded as the standard deviation from the gray average density from the solid color block of interest.

The black and color ink compositions of the present invention may have an edge acuity value of about 0 microns to about 50 microns, and more preferably a value of less than about 25 microns.

The black and color ink compositions of the present invention may have a line width value of about 200 microns to about 350 microns, and more preferably a value of about 225 microns to about 300 microns.

The black and color ink compositions of the present invention may have a bleed value of about 0 microns to about 100 microns, and more preferably a value of less than about 25 microns.

The black ink compositions of the present invention may have a mottle value of about 0.00 to about 3.00, and more preferably a value of less than about 1.75.

The color ink compositions of the present invention may have a mottle value of about 0.00 to about 6.00, and more preferably a value of less than about 2.00.

Optical Density Procedure

Optical density (OD) is recorded using an X-Rite 938 spectrodensitometer. The OD is measured by supplying the standard illuminant D65 at 0 degrees from the ink sample. Reflectance is measured at 45 degrees from the ink sample. OD is calculated as the negative log of the percent reflected from the ink sample. D65 standard illuminant is defined under the CIE (Commission Internationale de l'eclairage).

The black and color ink compositions of the present invention may have an optical density (measured as the negative log of reflectance) of about 1.00 to about 3.00, and more preferably a value of about 1.30 to about 2.00.

CIE L*a*b* Color Space Coordinates Procedure

An X-Rite 938 spectrodensitometer is used to measure the color space coordinates. The D65 illuminant is used, and 0/45 degree angles from the light source to the sensor are used. In addition, when taking these measurements using the spectrodensitometer, the "CIE 1964 10 degree standard observer" is used in the color translation.

Cartridge Start-Up Procedure

Cartridge start-up is used to assess the printability of the ink in the cartridge. The ink is initially printed. Next, the cartridge is allowed to sit in ambient conditions for 3 days, without protecting the print head. The cartridge is then placed back into the printer and the ink is again printed. The prints are visually assessed for feathering, mottle, banding, or lining that appears.

Light Resistance Procedure

Light resistance is a measure of a sample before and after some exposure for an amount of time. The length of time is the same for each sample measured in the experiment. The length of time between experiments can vary from 120 hours to 168 hours of exposure. The samples are exposed to a 765 watts/m$^2$ xenon arc lamp in the Suntest CPS+ fadeometer (available from Atlas Material Testing Technology, Chicago, Ill.). The spectral distribution of the xenon arc lamp is altered using Atlas' Indoor Light filter to simulate indoor light spectral distribution.

A CPS+ fadeometer (available from Atlas Material Testing Technology, Chicago, Ill.) is used to measure the CIE L*a*b* coordinates of the samples before and after exposure. The distance between the two color space coordinates ($\Delta E$) is calculated by the Pythagorean theorem and expanded for three dimensions.

$$\Delta E = \sqrt{(L1+L2)^2 + (a1+a2)^2 + (b1+b2)^2},$$

where L1, a1, and b1 refer to the first set of L*a*b* coordinates, and L2, a2, and b2 refer to the second set of L*a*b* coordinates.

Heat at 70° C.—Particle Count Procedure

The ink sample is heated to 70° C. and the particles are counted initially, at one week, and at 23 days. The particle size is measured using an Accusizer 780A instrument (available from Partical Sizing Systems, Santa Barbara, Calif.). Pigmented ink flows through a small "photozone." A "photozone" is a narrow region of uniform illumination produced by light from a laser diode.

0.3 mL of the ink is dispensed into a 100 mL volumetric flask and diluted to the mark with DI water. 0.2 mL of the product of the sample dilution is added to the sample vessel, which contains 60 mL of DI water. The product of the sample dilution is well mixed with a stir bar contained in the sample vessel. The number of particles is calculated using the following formula:

$$\frac{\text{\# of Particles} > 0.5 \; \mu m}{\text{mL ink}} = \frac{(\text{average cumulative \# of particles} > 0.5 \; \mu m) * (\text{dilution factor}) * \frac{100 \text{ mL sample flask}}{(0.2 \text{ mL} * 0.3 \text{ mL})}}{\% \text{ solids of original sample}}$$

Freeze/Thaw/Heat Cycles Procedure

A 100 gram sample of the pigmented ink is prepared. First, the sample is frozen at −15° C. for 8 hours. It is then thawed at room temperature for another 8 hours. Finally, the sample was heated in an oven at 70° C. for 8 hours. These three steps constitute a single cycle. The cycle is repeated three times. The change in the particle size between the initial sample and the sample after three cycles was measured using an Accusizer 780A instrument.

Examples of papers on which the above-identified tests can be conducted are HP Multipurpose (20 lb weight, 92 brightness value), HP Multipurpose ColorLok (20 lb weight, 96 brightness value), Office Depot 104, Xerox 4200 (20 lb weight, 92 brightness value), Epson Photo Paper Glossy SO$_{41649}$, Epson Premium Photo Paper Glossy 2041667 (68 lb weight), Office Depot Premium White Copy (20 lb weight, 92 brightness value), and Hammerill Great White Copy (20 lb weight, 92 brightness value).

Paper Independence

The inks of the present invention work on a wide variety of papers. In other words, the inks may work well independent of the particular paper being used. These inks exceed other inks containing polymer stabilized dispersions and other dispersions containing modified pigments. For example, the inks may fall within the following tolerances for specified print quality attributes across a wide range of plain paper, contrary to other inks:

|  | Standard Deviation | 95% Within | Units |
|---|---|---|---|
| Optical Density | 0.08 | 0.16 |  |
| Line Width | 11.44 | 22.88 | Microns |
| Mottle | 0.35 | 0.70 |  |
| Bleed | 3.3 | 6.6 | Microns |

In one embodiment, the invention provides a method of making an ink, the method comprising: sulfonating a pigment; oxidizing the pigment to form a modified pigment; and incorporating the pigment into an ink, wherein prints made from the ink will fall within at least one of the following tolerances with a 95 percent confidence level, regardless of the type of paper on which the print is printed: an optical density of 0.16 (±0.08); line width of 22.88 microns (±11.44); mottle of 0.70 (±0.35); and bleed of 6.6 microns (±3.3).

EXAMPLES

Dispersion Examples

Particle size for the below examples was determined according to the following procedure. Samples comprising 8-15% solids were prepared by diluting one drop of sample to 15 ml deionized water and loading into 1 cm disposable cuvette, avoiding air bubbles. Malvern Zetasizer Nano series Model ZEN3600 was then used to measure mean particle size in the sample.

Example 1

Black Pigment Dispersion (Sulfonation with Oleum)

40 g of commercial furnace carbon black (available from Columbian Chemicals, Marietta, Ga.), with a primary particle size of 13 nm and CTAB surface area of 206 $m^2$/g, were sulfonated with 20% oleum (200 g) at 120° C. for 20 hours. The reaction mixture was cooled to 90° C. and quenched in water and ice, allowing the quench temperature to rise to 65° C. The precipitated product was isolated by filtration and washed free of dissolved material. The product cake (108 g) was then oxidized with sodium hypochlorite (lab grade from Fisher, 13% solution, 378 g) allowing the temperature due to exotherm to rise to 60° C. After holding the oxidation mixture at 60° C. for one hour, an additional 377 g of sodium hypochlorite (13% solution) were added and the reaction mixture was held at 60° C. for an additional hour. The reaction mixture was allowed to settle and then filtered to obtain 86 g of cake. The cake was re-dispersed in deionized water, and the pH of the dispersion was adjusted to 9.0. The dispersion was milled with a Hockmeyer media mill (available from Hockmeyer Equipment Corp., Elizabeth City, N.C.) with 0.3 mm YTZ media (available from Quackenbush Co., Inc., Crystal Lake, Ill.). The dissolved impurities were removed by ultrafiltration until each of the chloride content and the sulfate content of the feed sample was less than 50 ppm. The product was then concentrated to 8% solids and mixed with 0.3%, wt/wt Proxel GXL (available from Arch Chemicals, Smyrna, Ga.). Finally, the product was filtered through 0.7 micron GF filter.

The resulting dispersion had a solids content of 8.3% and a pH of 9.0. An analysis of the components in the dispersion showed 3 ppm Cl, 38 ppm $SO_4$, 13 ppm Ca, 38 ppm Fe, 2 ppm Mg and 4249 ppm Na. The average particle size was 95.6 nm.

Example 2

Black Pigment Dispersion (Sulfonation with a Mixture of Oleum and Sulfuric Acid)

160 g of commercial gas carbon black (available from Degussa, Akron, Ohio), with a primary particle size of 20 nm and B.E.T surface area of 150 $m^2$/g, were sulfonated with 800 g of lab grade (95%) sulfuric acid and 800 g of 20% reagent grade oleum at 120° C. for 21 hours. The reaction mixture was cooled to 60° C. and quenched in water and ice. The precipitated product was isolated by filtration and washed free of dissolved material. The product cake (826 g) was then oxidized with approximately 10.9% sodium hypochlorite solution (1461 g) for one hour at 80° C. to get a fine carbon suspension. The dissolved impurities were removed by ultrafiltration until each of the chloride content and sulfate content of the feed sample adjusted to 10% solids was less than 100 ppm. The pH was adjusted to 7.5 with the addition of either hydrochloric acid or sodium hydroxide prior to completion of the above noted purification step. The product was then concentrated to 16% solids and mixed with 0.3% wt/wt Proxel GXL (available from Arch Chemicals, Smyrna, Ga.). Finally, the product was filtered through a 0.7 micron GF filter.

The resulting dispersion had a solids content of 16.1%, a viscosity of 3.2 cP and a pH of 8.2. An analysis of the components in the dispersion showed 6 ppm Cl, 71 ppm $SO_4$, 2.1 ppm Ca, 3.6 ppm Fe, 0.9 ppm Mg and 6571 ppm Na. The average particle size was 116.5 nm.

Example 3

Black Pigment Dispersion (Sulfonation with Sulfuric Acid)

330 lbs of 99.4% sulfuric acid and 22 lbs of gas carbon black (available from Degussa, Akron, Ohio), with 150 $m^2$/g surface area and primary particle size of 20 nm, were combined in a 30 gallon Pfaudler reactor with good mixing. Once the carbon was dispersed in the sulfuric acid, the mixture was heated to about 120° C. The reaction mixture was stirred for about 20-24 hours while maintaining the temperature of the reaction mixture at about 120-125° C. Stirring was stopped and the reactor was allowed to cool to about 60-65° C.

While the reactor was cooling, a quench tank was filled with about 100 gallons deionized water and about 50 gallons ice to produce a deionized water/ice mixture. The quench tank was cooled to less than 10° C.

Once the reactor temperature reached about 60-65° C., the contents of the reactor were transferred to the quench tank slowly to avoid splashing. The reactor was rinsed with deionized water and the rinsings were added to the mixture in the quench tank. The mixture in the quench tank was heated to about 20-25° C. The material from the quench tank was filtered through a filter press. The filtrate was recycled back to the quench tank until the quench tank was free of solids. The filtered carbon sulfonation cake was washed with about 100 gallons of deionized water and the carbon sulfonation cake was dropped from the press. The carbon sulfonation cake at this point could be stored until ready for use.

32.5 lbs of wet carbon sulfonation cake were combined with 60 lbs of deionized water and mixed overnight. The next day, the mixture was cooled to 30° C. and 16.5 lbs of sodium hydroxide (25% solution) were added to bring the pH up to about 11.9. The mixture was further cooled to 28° C., and 119 lbs of sodium hypochlorite were added to the mixture. An additional 19.5 lbs of sodium hydroxide (25% solution) were added, bringing the pH up to 13.3. The mixture was heated at about 80° C. closed lid for about 1 hour and then cooled to a temperature of 17° C. The mixture was then transferred to an ultrafiltration feed tank. About 0.5 L of 6.3% hydrochloric acid was added to the mixture in the feed tank to bring the pH down to about 7.8. The ultrafiltration was completed in about 13 hours when the desired salt levels and concentration were achieved. The solution was then filtered at 15.6% solids through 1.0 GF and 0.45 μGF filters and diluted to 41.3 lbs for a solids content of 14.8%. Finally, 3 lbs deionized water and 55.8 g of Proxel GXL (available from Arch Chemicals, Smyrna, Ga. and Avecia, Billingham, UK) were added to the mixture.

The resulting dispersion had a solids content of 14.9%, a surface tension of 69 dynes/cm, a pH of 8.1, a conductivity of 1.45 mS and a viscosity of 3.0 cP. The changes in viscosity, pH and surface tension of the dispersion stored at 70° C. for three weeks are summarized below.

|  | Viscosity (cP) | pH | Surface Tension (dynes/cm) |
| --- | --- | --- | --- |
| Original | 3.0 | 8.1 | 69 |
| Week 1 @ 70° C. | 2.49 | 7.4 | 70.8 |
| Week 2 @ 70° C. | 2.45 | 7.3 | 71.8 |
| Week 3 @ 70° C. | 2.59 | 7.3 | 70.7 |

An analysis of the components in the dispersion showed 14 ppm Cl, 151 ppm $SO_4$, 4.2 ppm Ca, 4.8 ppm Fe, 1.8 ppm Mg and 5035 ppm Na. The average particle size was 119.3 nm.

Example 4

Black Pigment Dispersion (Sulfonation/Oxidation of a Furnace Carbon Black with Primary Particle Size of 16 nm with Milling)

The procedure of Example 2 was repeated using 40 g of furnace carbon black (available from Cabot Corporation, Billerica, Mass.), with a primary particle size of 16 nm and a CTAB surface area of 255 $m^2/g$. The carbon black was sulfonated with a 1:1 mixture of commercial grade (93-98%) sulfuric acid (200 g) and 20% oleum (209 g) at 120° C. for a minimum of 18 hours. The oxidation with sodium hypochlorite (~8% solution, 406 g) took place using the mill described in Example 1, and was then driven to completion by heating to 80° C. with good mixing, for one hour. The product of the reaction was worked up as detailed in Example 1. The carbon dispersion so obtained was filtered through a 0.7 micron GF filter disk and was found to be a stable dispersion at room temperature.

The resulting dispersion had a solids content of 11.3% solids and a pH of 8.42. An analysis of the components in the dispersion showed 11 ppm Cl, 173 ppm $SO_4$, 2.6 ppm Ca, 16 ppm Fe and 5320 ppm Na. The average particle size was 129 nm.

Example 5

Black Pigment Dispersion (Sulfonation/Oxidation of a Furnace Carbon Black with Primary Particle Size of 13 nm, with Milling)

Example 4 was repeated using 40 g of furnace carbon black (available from Columbian Chemicals, Marietta, Ga.) with a primary particle size of 13 nm and CTAB surface area of 206 $m^2/g$.

The resulting dispersion had a solids content of 12.1% solids and a pH of 7.8. An analysis of the components in the dispersion showed 10 ppm Cl, 72 ppm $SO_4$, 2.8 ppm Ca, 17 ppm Fe and 4349 ppm Na. The average particle size was 89.1 nm.

Example 6

Black Pigment Dispersion (Sulfonation/Oxidation with Increased Surface Acidic Groups)

The procedure of Example 3 was repeated except that a second oxidation step was performed before purification by adding additional sodium hydroxide in an amount equivalent to that added in the first oxidation step. In this instance after the second stage oxidation the mixture was heated at 80° C., and the temperature and pH of the mixture were maintained at 80° C. and greater than 9.0, respectively, for a total of 48 hours.

The resulting dispersion had a solids content of 10.56% solids, a surface tension of 68.7 dynes/cm, a viscosity of 1.92 cP, and a conductivity of 1.23 mS. An analysis of the components in the dispersion showed 10 ppm Cl, 56 ppm $SO_4$, 9.9 ppm Ca, 6.4 ppm Fe, 1.0 ppm Mg, and 4330 ppm Na. The average particle size was 106.8 nm.

Example 7

Black Pigment Dispersion (Sulfonation/Oxidation and Purification at Elevated Temperature)

Example 6 was repeated using the two step oxidation, each step being carried out at 80° C. for a one hour period. After the second oxidation and heat period the reaction mixture was cooled to 60° C. and purified by ultrafiltration. The ultrafiltration was run at a temperature of 50-60° C. until the chloride and sulfate content of the feed sample was less than 100 ppm. The product was then concentrated to 14.1% solids and mixed with 0.3% wt/wt Proxel GXL (available from Arch Chemicals, Smyrna, Ga.). Finally, the product was filtered through a 0.7 micron GF filter.

The resulting dispersion had a solids content of 14.1%, a pH of 7.6, a surface tension of 68.8 dynes/cm, a conductivity of 1.20 mS, and a viscosity of 2.45 cP. The changes in viscosity, pH and surface tension of the dispersion stored at 70° C. for three weeks are summarized below.

|  | Viscosity (cP) | pH | Surface Tension (dynes/cm) |
| --- | --- | --- | --- |
| Original | 2.45 | 7.6 | 68.8 |
| Week 1 @ 70° C. | 2.53 | 7.2 | 70.5 |
| Week 2 @ 70° C. | 2.68 | 7.2 | 71.2 |
| Week 3 @ 70° C. | 2.83 | 7.3 | 70.3 |

An analysis of the components in the mixture showed 20 ppm Cl, 33 ppm $SO_4$, 8.4 ppm Ca, 12.5 ppm Fe, 4875 ppm Na, and 2584 ppm sulfur. The particle size of the dispersion was 119 nm.

Example 8

Black Pigment Dispersion (Sulfonation/Oxidation with Milling and Purification at Elevated Temperature)

The sulfonation cake from Example 3 (676.4 g) was redispersed in deionized water to a volume of ~1800 ml. To this slurry was added NaOH to reach a pH of >10.5. The cake slurry was then milled using a media mill (Hockmeyer Basket Mill) charged with 0.4 mm YTZ® beads (available from Quackenbush Co., Inc., Crystal Lake, Ill.) for 2 hours. During the milling process the volume increased to ~3500 ml with added deionized water. After the two hour milling period, the dispersion was split in half for the oxidation. Each half of the dispersion was oxidized with 954 g of sodium hypochlorite (10% solution). The pH of each was maintained above 9.0 with the addition of sodium hydroxide (25% solution). The dispersions were then heated at 80° C. for one hour then cooled to 35° C. After cooling, a second portion of sodium hypochlorite (954 g at 10%) was added to each dispersion. Again, the pH was kept above 9.0 with the addition of sodium hydroxide. The dispersions were then heated to 80° C. for an additional hour.

This process was repeated a total of 3 times to gain a larger amount of product. All of the oxidized products (6 total) were combined for ultrafiltration. The dissolved impurities were removed by ultrafiltration until each of the chloride content and the sulfate content of the feed sample is less than 100 ppm. The dispersion was taken and then heated to 80° C. overnight. After the overnight stir period the dispersion was again purified by ultrafiltration to remove the salts. The dispersion was again heated overnight at a temperature of 80° C. After the second heat step the dispersion was purified by ultrafiltration running at a elevated temperature of 50-60° C. until each of the chloride content and the salt content of the feed sample was less than 50 ppm. The product was then concentrated to 15.9% solids and mixed with 0.3% wt/wt Proxel GXL (available from Arch Chemicals, Smyrna, Ga.). Finally, the product was filtered through a 0.3 micron depth polypropylene filter (available from Ball Corporation, Port Washington, N.Y.).

The resulting dispersion had a solids content of 15.91% solids, a pH of 8.5, a surface tension of 70.5 dynes/cm, a viscosity of 2.65 cP, and a conductivity of 1.22 mS. The changes in viscosity, pH and surface tension of the dispersion stored at 70° C. for three weeks are summarized below.

|  | Viscosity (cP) | pH | Surface Tension (dynes/cm) |
| --- | --- | --- | --- |
| Original | 2.65 | 8.5 | 70.5 |
| Week 1 @ 70° C. | 2.19 | 7.5 | 70.6 |
| Week 2 @ 70° C. | 1.94 | 7.6 | 67 |
| Week 3 @ 70° C. | 2.11 | 7.5 | 71.0 |

An analysis of the components in the dispersion showed 4 ppm Cl, 7 ppm $SO_4$, 8.3 ppm Ca, 16.1 ppm Fe, 1.0 ppm Mg, and 5065 ppm Na. The average particle size was 97.8 nm.

Example 9

Black Pigment Dispersion (Sulfonation/Oxidation with Increased Surface Acidic Groups and Particle Size Reduction with Milling)

Example 6 was repeated except that a mill (Hockmeyer Basket Mill) charged with 0.4 mm YTZ® beads (available from Quackenbush Co., Inc., Crystal Lake, Ill.) was used during the first oxidation step with the sulfonation cake.

The resulting dispersion had a solids content of 16.9%, a surface tension of 69.9 dynes/cm, a conductivity of 1.53 mS and a viscosity of 3.0 cP. An analysis of the components in the dispersion showed 12 ppm Cl, 65 ppm $SO_4$, 7.8 ppm Ca, 0.6 ppm Mg, 9.7 ppm Fe and 6096 ppm Na. The average particle size was 98.1 nm.

Example 10

Magenta Pigment Dispersion (Sulfonation/Oxidation of CI Pigment Red 122)

80 g of commercial pigment red 122 (available from Lansco Colors, Montvale, N.J.) were sulfonated with 95% sulfuric acid (394 g) at 60° C. for 20 minutes. The reaction mixture was cooled to 41° C. and quenched in water and ice. The final quench temperature was 0° C. The precipitated product was isolated by filtration and washed free of dissolved material. A part (55 g, 14.3%) of the product cake was oxidized in the lab using a media mill (Hockmeyer Mill) charged with 0.4 mm YTZ® beads (available from Quackenbush Co., Inc., Crystal Lake, Ill.) at 2800 rpm, with sodium hypochlorite (commercial grade, 12% solution, 56 g diluted to 120 g with deionized water). The pH was maintained above 10 with the addition of 2.92 g calcium free sodium hydroxide (25% solution). After three hours, additional sodium hypochlorite (20 g diluted to 55 g, as before) was added and milled for an additional 135 minutes. The dissolved impurities were removed by ultrafiltration until each of the chloride content and the sulfate content of the feed sample was less than 50 ppm. The product was then concentrated to 4.8% solids and mixed with 0.3%, wt/wt Proxel GXL (available from Arch Chemicals, Smyrna, Ga.). Finally the product was filtered through 0.7 micron GF filter.

The resulting dispersion had a solids content of 4.8% and a viscosity of 1.34 cP. An analysis of the components in the dispersion showed 82 ppm Cl, 538 ppm $SO_4$, 10.0 ppm Ca, 3.5 ppm Mg, 8.2 ppm Fe and 539 ppm Na.

Example 11

Magenta Pigment Dispersion (Sulfonation/Oxidation of CI Pigment Red 122)

60 g of commercial pigment red 122 (available from Lansco Colors, Montvale, N.J.) were sulfonated with 90% sulfuric acid (525 g) at 80° C. for 5 hours. The reaction mixture was quenched in water and ice. The final quench temperature was 0° C. The precipitated product was isolated by filtration and washed free of dissolved material. The product cake was slurried in deionized water and oxidized in the lab using a media mill (Hockmeyer Mill) charged with 0.4 mm YTZ® beads (available from Quackenbush Co., Inc., Crystal Lake, Ill.) at 2800 rpm, with 240 g sodium hypochlorite (commercial grade, 12% solution). The pH was maintained above 9 with the addition of 2.97 g calcium free sodium hydroxide, 25% solution. After three hours, 10.36 g of additional sodium hydroxide was added and milled for an additional 2 hours. The dissolved impurities were removed by ultrafiltration until each of the chloride content and the sulfate content of the feed sample was less than 10 ppm. The product was then concentrated to 11% solids and mixed with 0.3%, wt/wt Proxel GXL (available from Arch Chemicals, Smyrna, Ga.). Finally, the product was filtered through a 0.7 micron GF filter.

The resulting dispersion had a solids content of 11.70% and a viscosity of 2.88 cPs. An analysis of the components in the dispersion showed 9 ppm Cl, 6 ppm $SO_4$, 4.1 ppm Ca, 1.2 ppm Mg, 2.7 ppm Fe, 179 ppm S and 568 ppm Na. The dispersion pH was 8.51.

Example 12

Magenta Pigment Dispersion (Sulfonation/Oxidation of CI Pigment Red 122)

60 g of commercial pigment red 122 (available from BASF Colors, Charlotte, N.C.) were sulfonated with 90% sulfuric acid (524 g) at 80° C. for 5 hours. The reaction mixture was quenched in water and ice. The final quench temperature was 0° C. The precipitated product was isolated by filtration and washed free of dissolved material. The product cake was slurried in deionized water and oxidized in the lab using a media mill (Hockmeyer Mill) charged with 0.4 mm YTZ® beads (available from Quackenbush Co., Inc., Crystal Lake, Ill.) at 2800 rpm, with 350 g sodium hypochlorite (commercial grade, 12% solution). The pH was maintained above 9 with the addition of 2.9 g calcium free sodium hydroxide, 25% solution. After three hours, 14.9 g of additional sodium hydroxide were added and milled for additional 2 hours. The dissolved impurities were removed by ultrafiltration until each of the chloride content and the sulfate content of the feed sample was less than 10 ppm. The product was then concentrated to 10% solids and mixed with 0.3%, wt/wt Proxel GXL (available from Arch Chemicals, Smyrna, Ga.). Finally, the product was filtered through a 0.7 micron GF filter.

The resulting dispersion had a solids content of 9.81% and a viscosity of 2.01 cPs. An analysis of the components in the dispersion showed 16 ppm Cl, 7 ppm $SO_4$, 3.2 ppm Ca, 1 ppm Mg, 1 ppm Fe, 239 ppm S and 605 ppm Na. The dispersion pH was 8.19.

Example 13

Magenta Pigment Dispersion (Sulfonation/Oxidation of CI Pigment Red 122)

60 g of commercial pigment red 122 (available from Clariant Colors, Charlotte, N.C.) were sulfonated with 90% sulfuric acid (475 g) at 80° C. for 5 hours. The reaction mixture was quenched in water and ice. The final quench temperature was 0° C. The precipitated product was isolated by filtration and washed free of dissolved material. The product cake was slurried in deionized water and oxidized in the lab using a media mill (Hockmeyer Basket Mill) charged with 0.4 mm YTZ® beads (available from Quackenbush Co., Inc., Crystal Lake, Ill.) at 2800 rpm, with 350 g sodium hypochlorite (commercial grade, 12% solution). The pH was maintained above 9 with the addition of 2.6 g calcium free sodium hydroxide, 25% solution. After three hours, 12.6 g of additional sodium hydroxide were added and milled for additional 2 hours. The dissolved impurities were removed by ultrafiltration until each of the chloride and sulfate content of the feed sample was less than 10 ppm. The product was then concentrated to 11% solids and mixed with 0.3%, wt/wt Proxel GXL (available from Arch Chemicals, Smyrna, Ga.). Finally, the product was filtered through 0.7 micron GF filter.

The resulting dispersion had a solids content of 11.07% and a viscosity of 2.1 cP. An analysis of the components in the dispersion showed 7 ppm Cl, 5 ppm $SO_4$, 3.4 ppm Ca, 0.9 ppm Mg, 1.2 ppm Fe, 133 ppm S and 777 ppm Na. The dispersion pH was 8.09. The introduction of S (0.344 mMoles of S per gram of sample) via sulfonation was confirmed by elemental analysis of a dried sample (by Schwarskopf Microanalytical Laboratory, Woodside, N.Y.).

Example 14

Magenta Pigment Dispersion (Sulfonation/Oxidation of CI Pigment Red 122)

60 g of commercial pigment red 122 (available from Sun Chemical, Cincinnati, Ohio) were sulfonated with 90% sulfuric acid (525 g) at 80° C. for 5 hours. The reaction mixture was quenched in water and ice. The final quench temperature was 0° C. The precipitated product was isolated by filtration and washed free of dissolved material. The product cake was slurried in deionized water and oxidized in the lab using a media mill (Hockmeyer Basket Mill) charged with 0.4 mm YTZ® beads (available from Quackenbush Co., Inc., Crystal Lake, Ill.) at 2800 rpm, with 280 g sodium hypochlorite (commercial grade, 12% solution). The pH was maintained above 9 with the addition of 1.78 g calcium free sodium hydroxide, 25% solution. After three hours, 10 g of additional sodium hydroxide were added and milled for an additional 2 hours. The dissolved impurities were removed by ultrafiltration until each of the chloride content and the sulfate content of the feed sample was less than 10 ppm. The product was then concentrated to 11% solids and mixed with 0.3%, wt/wt Proxel GXL (available from Arch Chemicals, Smyrna, Ga.). Finally, the product was filtered through 0.7 micron GF filter.

The resulting dispersion had a solids content of 11.70% and a viscosity of 2.88 cP. An analysis of the components in the dispersion showed 9 ppm Cl, 5 ppm $SO_4$, 1.8 ppm Ca, 0.4 ppm Mg, 0.6 ppm Fe, 71.3 ppm S and 460 ppm Na. The dispersion pH was 8.75

Comparative Example 1

Magenta Pigment Dispersion (Oxidation of CI Pigment Red 122 as Disclosed in U.S. Pat. No. 6,596,068)

25 g of commercial pigment red 122 (available from Lansco Colors, Montvale, N.J.) were added to 500 ml deionized water and mixed at 1000 rpm to wet the pigment. Then the mixture was milled for 1.5 hours using a media mill (Hockmeyer Mill) charged with 0.4 mm YTZ® beads (available from Quackenbush Co., Inc., Crystal Lake, Ill.) at 3000 rpm. Milling was continued for another hour after adding sodium hypochlorite (125 g, commercial grade, 10% solution). The milled product was stirred overnight and then isolated as a wet cake. The dissolved impurities were removed first by washing the cake with deionized water and then by ultrafiltration until each of the chloride content and the sulfate content of the feed sample was less than 50 ppm. The product was then concentrated to 7.74% solids and mixed with 0.3%, wt/wt Proxel GXL (available from Arch Chemicals, Smyrna, Ga.). The product was not a stable dispersion, settling was noticed on standing three days at ambient temperature.

The resulting dispersion had a solids content of 7.74% solids, a surface tension of 70.9, a viscosity of 1.91 cP, and a conductivity of 0.980 mS. An analysis of the components in the dispersion showed 57 ppm Cl, 474 ppm $SO_4$, 24 ppm Ca, 2.3 ppm Mg, 8.3 ppm Fe and 335.7 ppm Na.

Comparative Example 2

Magenta Pigment Dispersion (Sulfonation of CI Pigment Red 122 as Disclosed in U.S. Pat. No. 6,648,954)

20 g of commercial pigment red 122 (available from Lansco Colors, Montvale, N.J.) were added to 95% sulfuric acid (200 g) and heated to 80° C. After 2 hours at 80° C., it was quenched into an ice/water mixture. The isolated wet cake was washed with deionized water to remove excess acid and then re-dispersed in 200 g deionized water. A sufficient amount of calcium free sodium hydroxide was added to bring the pH to about 10. The dissolved impurities were removed by ultrafiltration until each of the chloride content and the sulfate content of the feed sample was less than 50 ppm. The product was then concentrated to 7.35% solids and mixed with 0.3%, wt/wt Proxel GXL (available from Arch Chemicals, Smyrna, Ga.). The product could not be filtered through 0.7 micron GF filter. After 1 week in an oven at 70° C., the material showed hard settling in the bottom of the container.

The resulting dispersion had a solids content of 7.35%, a surface tension of 70.5 dynes/cm, a viscosity of 2.27 cP, and a conductivity of 0.39 mS. An analysis of the components in the dispersion showed 10 ppm Cl, 50 ppm $SO_4$, 0.9 ppm Ca, 3.9 ppm Fe, 0.2 ppm Mg and 324.7 ppm Na.

Example 15

Cyan Pigment Dispersion (Example of Sulfonation/Oxidation with CI Pigment Blue 15:1)

80 g of commercial pigment blue 15:1 (available from Fanwood Chemical, Fanwood, N.J.) were sulfonated with 99.5% sulfuric acid (424 g) at 114-120° C. for 160 minutes. The reaction mixture was cooled to 100° C. and quenched in water and ice. The final quench temperature was 25° C. The precipitated product was isolated by filtration and washed free of dissolved material. A part (160 g, 48%) of the product cake was dispersed in the lab using a media mill (Hockmeyer Baske Mill) charged with 0.4 mm YTZ® beads (available from Quackenbush Co., Inc., Crystal Lake, Ill.) at 2800 rpm. The pH was maintained above 10 with the addition of 47.4 g calcium free sodium hydroxide, 25% solution. After three and a half hours, one half of this dispersion was oxidized with sodium hypochlorite (commercial grade, 12% solution, 56 g diluted to 126 g with deionized water) in the mill for additional hour. The dissolved impurities were removed by ultrafiltration until each of the chloride content and the sulfate content of the feed sample was less than 50 ppm. The product was then concentrated to 4.8% solids and mixed with 0.3% wt/wt Proxel GXL (available from Arch Chemicals, Smyrna, Ga.). Finally, the product was filtered through 0.7 micron GF filter.

The resulting dispersion had a solids content of 4.8% and a viscosity of 1.34 cP. An analysis of the components in the dispersion showed 82 ppm Cl, 538 ppm $SO_4$, 10.0 ppm Ca, 3.5 ppm Mg, 8.2 ppm Fe and 539 ppm Na.

Example 16

Cyan Pigment Dispersion (Example of Sulfonation/Oxidation with CI Pigment Blue 15:3)

120 g of commercial pigment blue 15:3 (available from BASF Corporation, Charlotte, N.C.) were sulfonated with a mixture of 300 g of sulfuric acid (95%) and 300 g of 20% oleum at 120° C. for 6 hours. The reaction mixture was cooled to 100° C. and quenched in water and ice. The solid product was isolated by filtration and washed free of dissolved material. The cake was dispersed using a media mill (Hockmeyer Basket Mill) charged with 0.4 mm YTZ beads (available from Quackenbush Co. Inc., Crystal Lake, Ill.) at 3000 rpm. The pH was maintained above 9.0 with the addition of 60 g calcium free sodium hydroxide, 25% solution. After 2 hours on the mill the dispersion was oxidized with 371.6 g of sodium hypochlorite (10.9%) in the mill for an additional 3 hours. The resulting product was then heated to 80° C. for a period of 1 hour. The dissolved impurities were then removed by ultrafiltration until each of the chloride content and the sulfate content of the feed sample was less than 100 ppm. The product was concentrated to 7.7% solids and mixed with 0.3% wt/wt Proxel GXL (available from Arch Chemicals, Smyrna, Ga.). Finally, the product was filtered through a 0.7 micron GF filter.

The resulting dispersion had a solids content of 7.73% solids and a pH of 8.24. An analysis of the components in the dispersion showed 23 ppm Cl, 21 ppm $SO_4$, 1.7 ppm Ca, 1.5 ppm Fe, 1830 ppm Na and 1560 ppm sulfur. The dispersion also had a viscosity of 2.10 cP, a surface tension of 69.1 dynes/cm, and a conductivity of 2.4 mS. The introduction of S (0.894 mMoles of S per gram of sample) via sulfonation was confirmed by elemental analysis of a dried sample (by Schwarskopf Microanalytical Laboratory, Woodside, N.Y.).

Example 17

Cyan Pigment Dispersion (Example of Sulfonation/Oxidation with CI Pigment Blue 15:3)

40 g of commercial pigment blue 15:3 (available from BASF Corporation, Charlotte, N.C.) were sulfonated with 200 g sulfuric acid (95%) at 120° C. for 24 hours. The reaction mixture was cooled to 100° C. and quenched in water and ice. The solid product was isolated by filtration and washed free of dissolved material. The acidic cake was brought to a pH of 8.0 and re-dispersed in deionized water. The resulting mixture was filtered to isolate the cake. The cake was dispersed using a media mill (Hockmeyer Basket Mill) charged with 0.4 mm YTZ beads (available from Quackenbush Co. Inc., Crystal Lake, Ill.) at 3000 rpm. After 2 hours on the mill the dispersion was oxidized with 55 g of 10.9% sodium hypochlorite in the mill for an additional 2 hours. The resulting product was then heated to 65° C. for 1 hour. The dissolved impurities were removed by ultrafiltration until each of the chloride content and the sulfate content of the feed sample was less than 100 ppm. The product was concentrated to 7% solids and mixed with 0.3% wt/wt Proxel GXL (available from Arch Chemicals, Smyrna, Ga.). Finally, the product was filtered through a 9-0.8 micron depth GF filter.

The resulting dispersion had a solids content of 6.38% and a pH of 7.5. An analysis of the components in the dispersion showed 160 ppm Cl, 21 ppm $SO_4$, 2.7 ppm Ca, 2.9 ppm Fe, 713 ppm Na and 1529 ppm sulfur. The dispersion also had a viscosity of 6.9 cP, a surface tension of 68.8 dynes/cm, and a conductivity of 1.38 mS.

Example 18

Yellow Pigment Dispersion (Example of Sulfonation/Oxidation with Solvent Yellow 33)

40 g of commercial solvent yellow 33 (available from Rainbow Chemicals Co., Northbrook, Ill.) were sulfonated using 200 g sulfuric acid (95%) at 120° C. for 6 hours. The reaction mixture was cooled to 100° C. and quenched in ice and water. The solid product was isolated by filtration and washed free of dissolved material. The resulting mixture was filtered to isolate the cake. The cake was dispersed using a media mill (Hockmeyer Basket Mill) charged with 0.4 mm YTZ beads (available from Quackenbush Co. Inc., Crystal Lake, Ill.) at 3000 rpm. After 3 and a half hours on the mill, the dispersion was oxidized with 65 g of 10.9% sodium hypochlorite in the mill for an additional hour. The resulting product was then heated to 60° C. for one hour. The dissolved impurities were removed by ultrafiltration until each of the chloride content and the sulfate content of the feed sample was less than 100 ppm. The product was concentrated to 2.17% solids and mixed with 0.3% wt/wt Proxel GXL (available from Arch Chemicals, Smyrna, Ga.). Finally, the product was filtered through a 9-0.8 micron depth GF filter.

The resulting dispersion had a solids content of 2.17% and a pH of 6.99. An analysis of the components in the dispersion showed 4 ppm Cl, 68 ppm $SO_4$, 2.3 ppm Ca, 15.2 ppm Fe, 187 ppm Na and 278 ppm sulfur. The dispersion had a viscosity of 1.55 Cp, a surface tension of 57.7 dynes/cm, and a conductivity of 0.578 mS.

Example 19

Replacing Counterions Associated with Surface Modifying Groups

Counterions associated with surface modifying groups of a pigment may be substituted with other suitable cations as exemplified by the following procedure.

The dispersion obtained from Example 3 (3200 g, 14.85% solids, pH=8.1) was further purified by ultrafiltration while the pH of the product was adjusted slowly downward with dilute hydrochloric acid (1 pH unit at a time over several hours) without shocking the pigment dispersion. A total of 34.7 g of 25% HCl was used to lower the pH to 5.5. When the product was found to be free of dissolved impurities, it was concentrated to 2693.1 g (14% solids, 12 ppm Cl and 45 ppm $SO_4$).

Different mixed salts (~50% sodium) with monoethanolammonium (MEA), triethanolammonium (TEA), tetramethylammonium (TMA), tetrabutylammonium (TBA), lithium, potassium, and ammonium were formed in 300 g portions by adjusting the pH to about 8.0 with corresponding base (e.g., KOH, $NH_4OH$, etc.). The properties of the resulting dispersions are summarized in Table 1.

TABLE 1

Mixed salts with ~50% sodium ion content.

| | $Na^+$ | $K^+$ | $Li^+$ | $NH_4^+$ | MEA | TEA | TBA | TMA |
|---|---|---|---|---|---|---|---|---|
| Solids [%] | 14.9 | 15.5 | 14.9 | 15.5 | 15.5 | 16.5 | 16.5 | 15.7 |
| pH | 7.9 | 8.4 | 8.5 | 8.5 | 8.4 | 8.4 | 8 | 8.6 |
| Conductivity | 1450 | 1375 | 1118 | 1305 | 1171 | 973 | 1860 | 1379 |
| Surface Tension | 69 | 53.5 | 64.7 | 69.5 | 61.1 | 59.4 | 59.2 | 55.4 |
| Viscosity | 2.68 | 2.98 | 3.02 | 3.18 | 3.02 | 3.06 | 3.01 | 3.02 |
| $Na^+$ [ppm] | 5035 | 3385 | 3489 | 3412 | 5213 | 3885 | 2919 | 3950 |
| S [ppm] | 2558 | 2950 | 2893 | 3631 | 3030 | 3236 | 1904 | 3189 |

Mixed salts (<20% sodium) were prepared in a similar manner to the mixed salts (~50% sodium) except that the pH was adjusted downward with dilute hydrochloric acid to a stable pH of 2.0 without shocking. The properties of the resulting dispersions are summarized in Table 2.

TABLE 2

Mixed salts with < 25% sodium ion content.

| | $Na^+$ | $K^+$ | $Li^+$ | $NH_4^+$ | MEA | TEA | TBA | TMA |
|---|---|---|---|---|---|---|---|---|
| Solids [%] | 13.7 | 15.3 | 14.5 | 14.9 | 15.6 | 16.3 | 16.1 | 16.0 |
| pH | 7.7 | 7.1 | 7.3 | 7.1 | 6.8 | 8.1 | 7.1 | 7.6 |
| Conductivity | 2830 | 3050 | 2060 | 3090 | 2170 | 2960 | 1808 | 2960 |
| Surface Tension | 55 | 65 | 65 | 69.3 | 57.4 | 64.2 | 58.7 | 61.9 |
| Viscosity | 2.77 | 3.19 | 3.11 | 3.24 | 3.38 | 3.33 | 3.36 | 3.44 |
| $Na^+$ [ppm] | 5291 | 1110 | 1119 | 1089 | 1087 | 1017 | 934 | 1154 |
| S [ppm] | 2810 | 2611 | 2446 | 2507 | 2714 | 2465 | 2667 | 2689 |

Example 20

X-Ray Photoelectron Spectroscopy (XPS) Analyses

XPS data were collected and analyzed for Samples 1-4 (Table 3).

TABLE 3

XPS samples.

| Sample | Sample | Source |
|---|---|---|
| 1 | Carbon Black | Gas carbon black, available from Degussa, Akron, OH. |
| 2 | Carboxy Modified Carbon Black | Sensijet ® Black SDP 1000 (available from Sensient Colors, Inc., St. Louis, MO). |
| 3 | Sulfonated Carbon Black | Sulfonation cake from Example 3 (washed and dried). |

TABLE 3-continued

XPS samples.

| Sample | Sample | Source |
|---|---|---|
| 4 | Sulfonated, Carboxy Modified Carbon Black | Modified pigment obtained in Example 7. |

Figure 2:
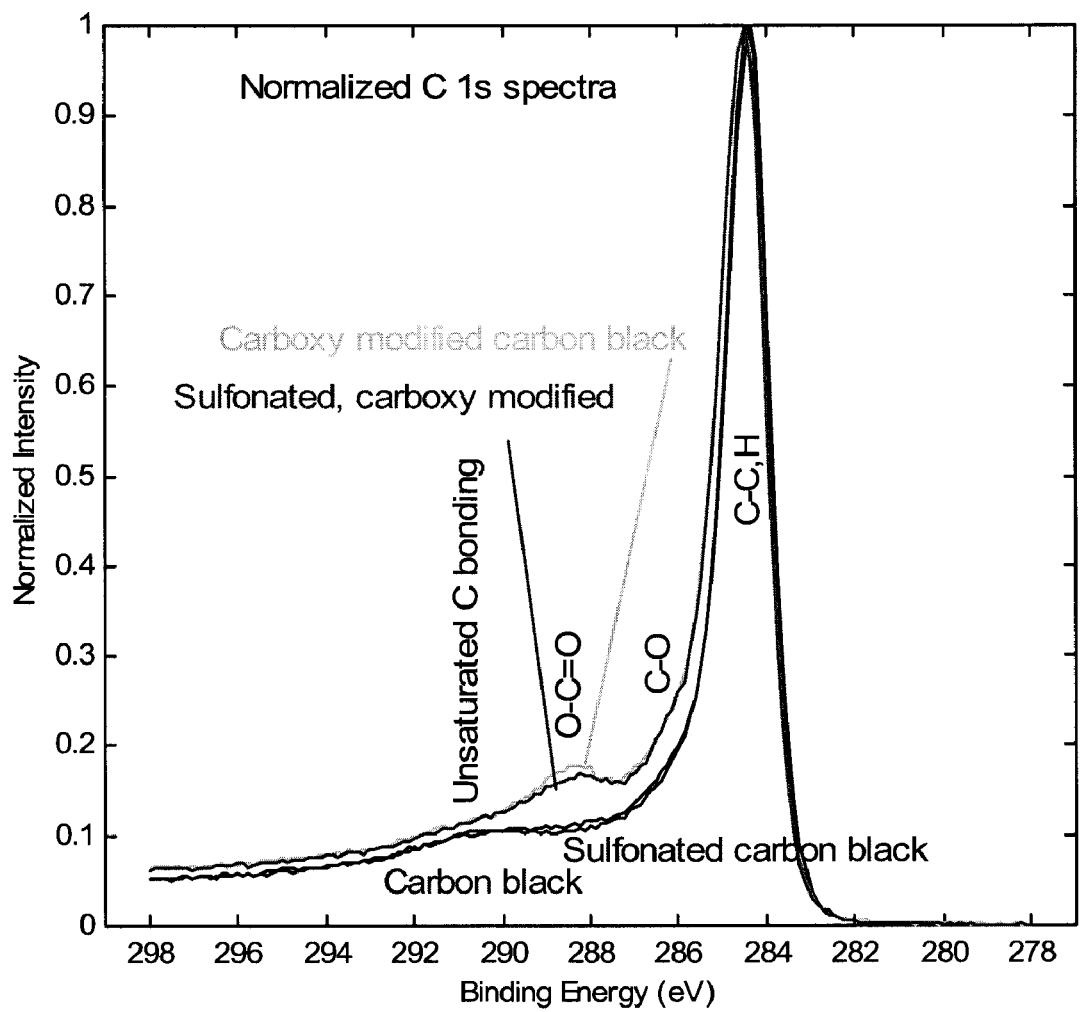
FIG. 2 displays high resolution XPS C 1s spectra for the samples in FIG. 1.
Figure 3:
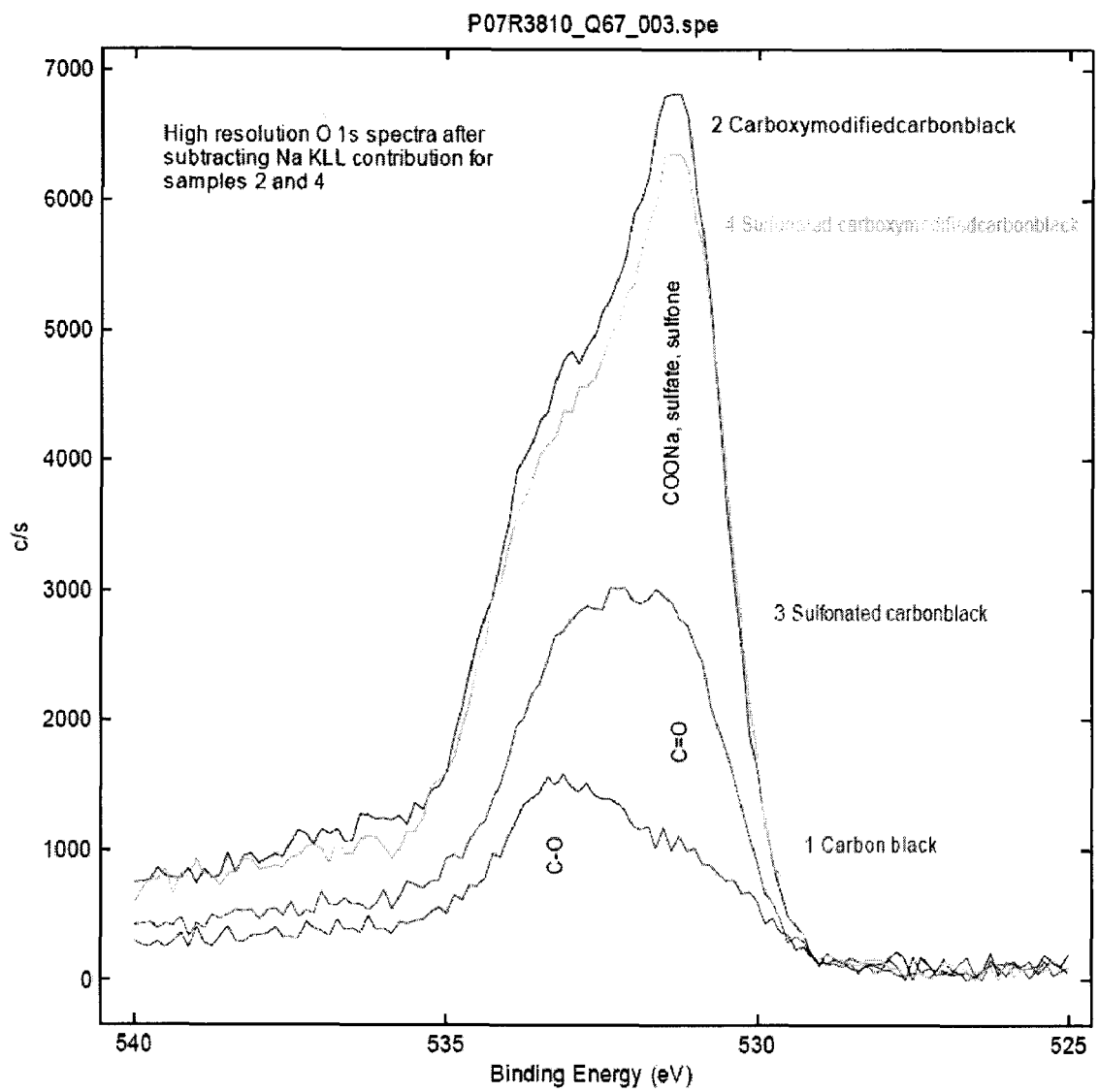
FIG. 3 displays high resolution XPS O 1s spectra for the samples in FIG. 1.
Figure 4:
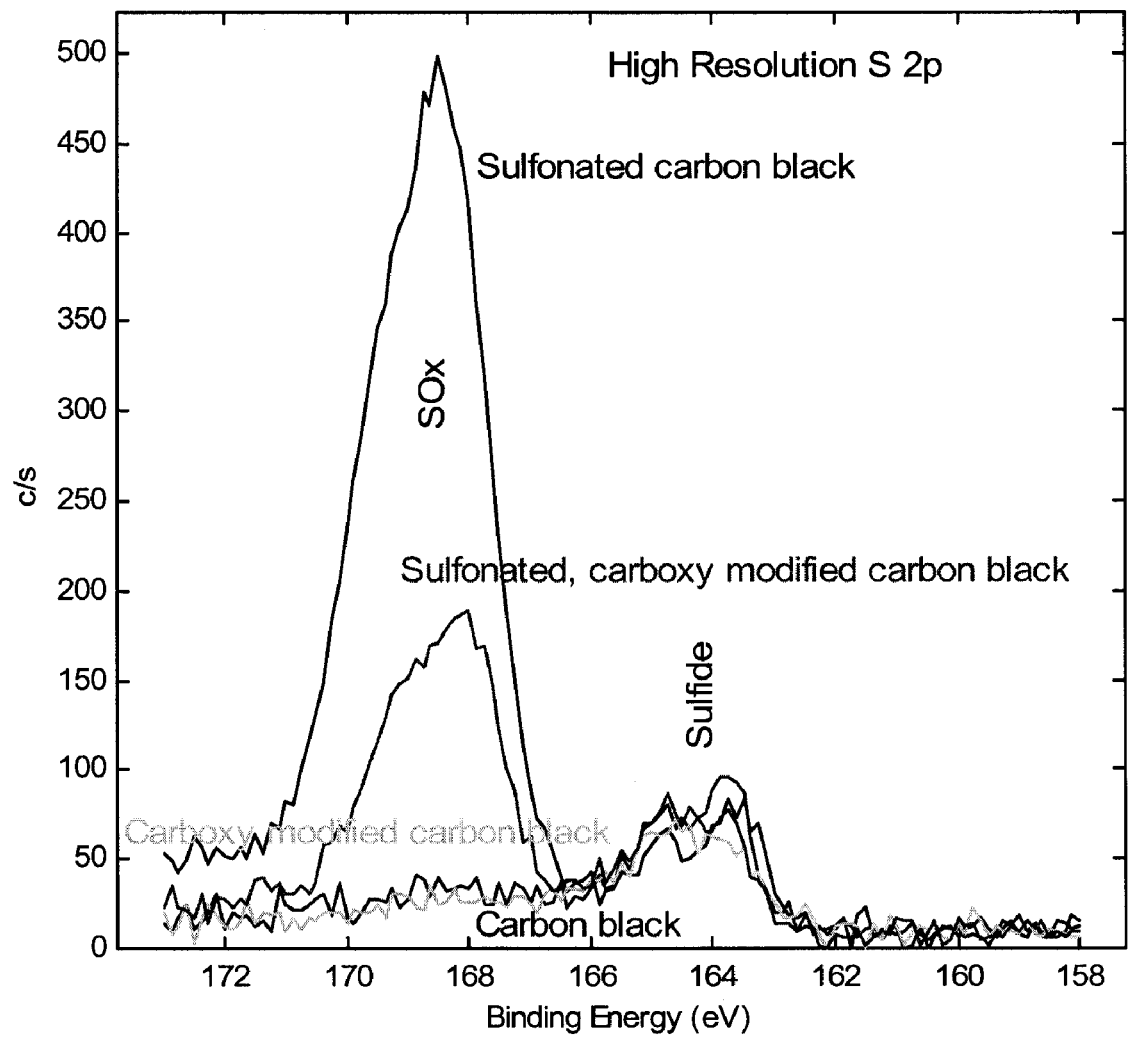
FIG. 4 displays high resolution XPS S 2p spectra for the samples in FIG. 1.

The XPS data were acquired by EAG Labs (in Chanhassen, Minn.) using a Physical Electronics Quantum 2000 Scanning XPS instrument with a probe beam of focused, monochromatic Al $K_\alpha$ 1486.6 eV radiation. Analyses were conducted in a 1.5 mm×0.3 mm analysis area with a 45° correction angle and no charge correction or charge neutralization. The x-rays generated photoelectrons that were energy analyzed and counted to reveal the atomic composition and chemistry of the sample surfaces. The escape depth of the photoelectrons limited the depth of analysis to the outer ~50 Å. FIG. 1 provides a low resolution survey scan ranging from 0 to 1100 eV binding energy. FIGS. 2-4 are high resolution spectra from selected elements, which provide chemical state information.

Samples 1 and 3 were mounted directly in powder form. Samples 2 and 4 (dispersed liquids) were prepared by drying down a small amount of the liquid under a nitrogen atmosphere and then grinding the resultant films to powders.

Elements detected on all samples included C, O, S and Cl. Samples 2 and 4 also had Na present. A trace of organic N was present on Sample 4.

As shown in FIG. 2, the C 1s spectra of all samples were consistent with a dominant carbon black contribution that included a main, asymmetric C—C,H peak at about 284.5 eV, and a strong satellite due to unsaturated bonds. Samples 2 and 4, both having been carboxy modified, also have a strong C 1s component at ~288.3 eV binding energy, consistent with COONa bonding. Although organic Cl was detected for all samples, the low level of Cl present precludes observation of a C—Cl bond peak in the C 1s spectra. The same is true for potential C to S bonds and C to N bonds due to the low concentrations of those elements. No attempt has been made to curve fit the C 1s peaks since the error associated with fitting the basic amorphous carbon line shape is similar in intensity to most of the expected carbon functionalities (other than the clear COONa peak).

As shown in FIG. 3, the 0 is spectra of all samples had two components at roughly 531 and 533 eV, consistent with C=O and C-0 bonding. The C-0 peak would include species such as hydroxyls, ethers and carboxylic acid groups. The C=O peak would include ketone, ester, acrylate, and carboxylic acid groups. Sulfone or sulfate oxygen contributions would both overlap the C=O contribution, as would COONa contributions. An apparent third component at ~535 eV binding energy was actually due to an overlapping Na KLL feature present for Samples 2 and 4. This component was removed from the spectra by subtraction of a reference NaCl Na KLL spectrum for calculation of atomic concentration, and by curve fitting for chemical state analysis.

Nitrogen was only detected at low level on sample 4 and no high resolution spectrum was acquired. Its binding energy in the survey spectrum suggests an organic form.

As shown in FIG. 4, sulfur was present on all samples in at least two forms. A reduced form, referred to in the spectral plots as sulfide, and an oxidized form, referred to in the plots as SOx (sulfate/sulfone). There was no spectral evidence to separate potential sulfate and sulfone contributions. The sulfide peak intensity was similar for all four samples, while the sulfate/sulfone peak intensity varied dramatically. The sulfide contributions, in some cases, required two components to obtain good curve fits. The nature of the multiple sulfide components is not understood, but could be due to the presence of different sulfide forms, or could conceivably reflect a complex peak shape due to photoelectron energy loss mechanisms within the carbon black matrix. Apparently the sulfide species are quite stable and not affected by either the carboxy modification or sulfonation process as similar amounts of sulfide sulfur are observed on all samples. No evidence for any oxidized sulfur (SOx) is observed on the carboxy modified carbon black sample. The only samples showing oxidized sulfur (SOx) are the sulfonated carbon black sample and the sulfonated, carboxy modified carbon black sample.

The high resolution spectra were used to obtain surface composition by integrating the areas under the photoelectron peaks and applying empirical sensitivity factors. The Atomic % (Table 4), % of Elements Detected (Table 5) and Atomic % by Chemical State (Table 6) for each sample are presented below.

TABLE 4

XPS Surface Concentrations (Atomic %).[1-3]

| Sample | C | N | O | Na | S | Cl |
|---|---|---|---|---|---|---|
| 1 Carbon black | 97.5 | — | 2.4 | — | 0.11 | 0.03 |
| 2 Carboxy modified carbon black | 81.4 | — | 13.0 | 5.3 | 0.11 | 0.19 |
| 3 Sulfonated carbon black | 94.0 | — | 5.4 | — | 0.58 | 0.03 |
| 4 Sulfonated, carboxy modified carbon black | 82.3 | 0.15 | 12.6 | 4.6 | 0.35 | 0.12 |

[1] Normalized to 100% of the elements detected. XPS does not detect H or He.
[2] Detection limits are typically between 0.05% and 1.0% for other elements.
[3] A dash "—" indicates the element was not detected.

TABLE 5

Curve Fit Summary Table (% of Element Detected).

| Sample | % Cl as metal chloride | % Cl as organic chloride | % S as sulfide | % S as sulfate, sulfone | %O as C=O, sulfate, sulfone, COONa | % O as C—O |
|---|---|---|---|---|---|---|
| 1 | 0 | 100 | 74 | 26 | 31 | 69 |
| 2 | 58 | 42 | 73 | 27 | 65 | 35 |
| 3 | 0 | 100 | 9 | 91 | 55 | 45 |
| 4 | 63 | 37 | 25 | 75 | 66 | 34 |

TABLE 6

Combined Table (Atomic % by Chemical State).

| Sample | C | N | O as C=O, sulfate, sulfone, COONa, | O as C—O | Na | S as sulfide | S as sulfate, sulfone | Cl as organic chloride | Cl as metal chloride |
|---|---|---|---|---|---|---|---|---|---|
| 1 | 97.5 | — | 0.7 | 1.6 | — | 0.08 | 0.03 | 0.03 | 0.00 |
| 2 | 81.4 | — | 8.5 | 4.5 | 5.3 | 0.08 | 0.03 | 0.08 | 0.11 |
| 3 | 94.0 | — | 2.9 | 2.4 | — | 0.05 | 0.53 | 0.03 | 0.00 |
| 4 | 82.3 | 0.15 | 8.3 | 4.3 | 4.6 | 0.09 | 0.26 | 0.04 | 0.08 |

Example 21

Scanning Electron Microscopy (SEM) Analyses

SEM analyses were performed on base carbon black (Sample 1, Table 3), carboxy modified carbon black (oxidized) (Sample 2, Table 3) and sulfonated, carboxy modified carbon black (Sample 4, Table 3) using a Hitachi S-4500 Field Emission Scanning Electron Microscope. The samples were dried at room temperature prior to analysis.

Figure 5:
FIG. 5 displays Scanning Electron Microscopy (SEM) images (15.0 kV×500 K 60 nm) of (a) carbon black having an average particle diameter of ~39.3±3 nm, (b) carboxy modified carbon black having an average particle diameter of ~31.1±3 nm, and (c) sulfonated, carboxy modified carbon black having an average particle diameter of ~38.7±2 nm, where each has been dried at room temperature, as set forth in Example 21.
Figure 5:
Figure 5:
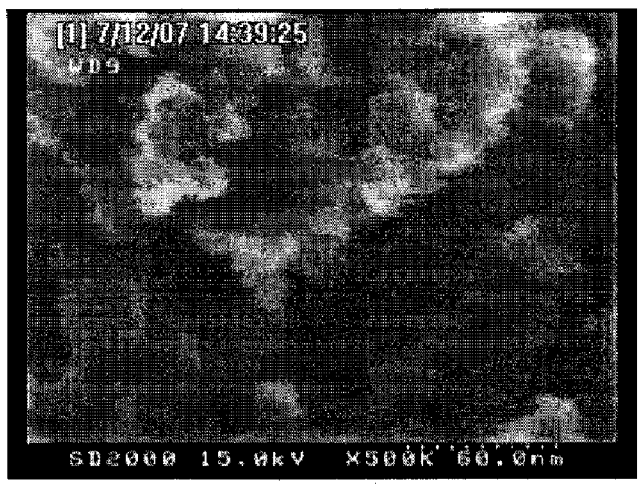

The SEM Images (15.0 kV×500 K 60 nm) of (a) carbon black with an average diameter of ~39.3±3 nm, (b) carboxy modified carbon black with an average diameter of ~31.1±3 nm, and (c) sulfonated carboxy modified carbon black with an average diameter of ~38.7±2 nm, are provided in FIG. 5. The sizes were determined by pixelizing the image and identifying boundaries using contrast. As shown in FIG. 5(a), there is no appreciable change in gross morphology of the base carbon black, as would be expected with any surface modification.

Example 22

TGA Analysis

Figure 6:
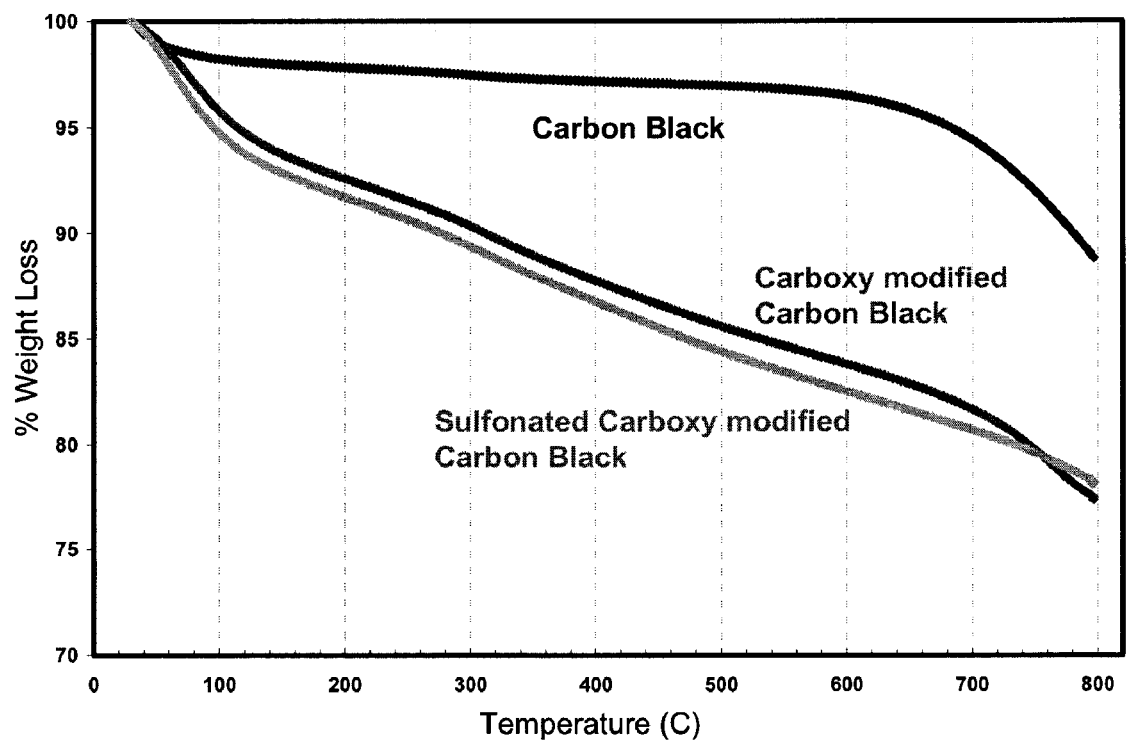
FIG. 6 is a graph of Temperature in ° C. (x-axis) versus Weight % (y-axis) obtained by Thermal Gravimetric Analysis (TGA) for carbon black, carboxy modified carbon black and sulfonated, carboxy modified carbon black, as set forth in Example 22.

TGA was performed on TA Instruments' TGA instrument under nitrogen atmosphere, heating from 30° C. to 800° C. at a rate of 10° C. per minute. As shown in FIG. 6, the base carbon black (Sample 1, Table 3) had a gradual weight loss until 550° C. and then a much rapid weight loss. In comparison, the carboxy modified carbon black (Sample 2, Table 3) and sulfonated, carboxy modified carbon black (Sample 4, Table 3) had more pronounced but gradual weight loss until about 700° C. A rapid weight loss at 780° C. for the carboxy modified carbon black as compared to the more pronounced weight loss at 700° C. for the sulfonated, carboxy modified carbon black differentiates the two types of surface modifications. There was a slight shift in the slope (rate of weight loss) at about 300° C. for both modified carbon blacks. The gradual weight loss in the range of 100-700° C. is attributable to loss of surface groups such as carboxyl and lactone. The marked weight loss above 700° C. as noted in the case of sulfonated carboxy modified carbon black is attributed to the loss of $SO_3$ surface group.

Figure 7:
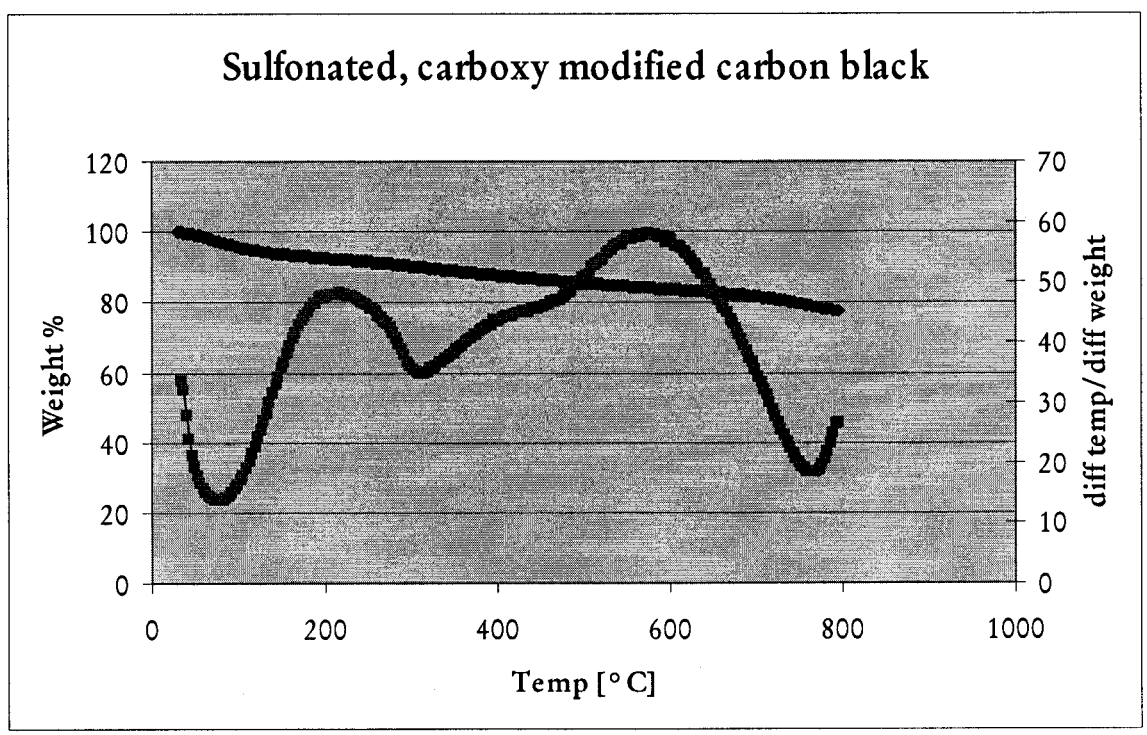
FIG. 7 is a graph of Temperature in ° C. (x-axis) versus Weight % (y-axis, left) and Differential Temperature/Differential Weight (y-axis, right) obtained by TGA for sulfonated, carboxy modified carbon black, as set forth in Example 22.

Each of the modified carbon blacks exhibit three distinct weight loss regions. It is possible to calculate the weight loss over these regions as equivalent to $CO_2$ gas released. As shown in FIG. 7 and as summarized in Table 7, the sulfonated, carboxy modified carbon black exhibits a weight loss equivalent to 1424 μMoles $CO_2$ per gram of pigment from 103-313° C., a weight loss equivalent to 806 μMoles $CO_2$ per gram of pigment from 313-463° C., and a weight loss equivalent from 1751 μMoles $CO_2$ per gram of pigment from 463-773° C.

TABLE 7

Weight loss analysis for sulfonated, carboxy modified carbon black in FIG. 7.

| Starting Weight = 41.891 | Weight Difference | Per Gram C | Moles $CO_2$ | μMoles $CO_2$ |
|---|---|---|---|---|
| Weight @ 103° C. = 39.865 | 0 | 0 | 0 | 0 |
| Weight @ 313° C. = 37.24 | 2.625 | 0.06266 | 0.001424 | 1424 |
| Weight @ 463° C. = 35.755 | 1.485 | 0.03545 | 0.000806 | 806 |
| Weight @ 773° C. = 32.527 | 3.228 | 0.07706 | 0.001751 | 1751 |

Figure 8:
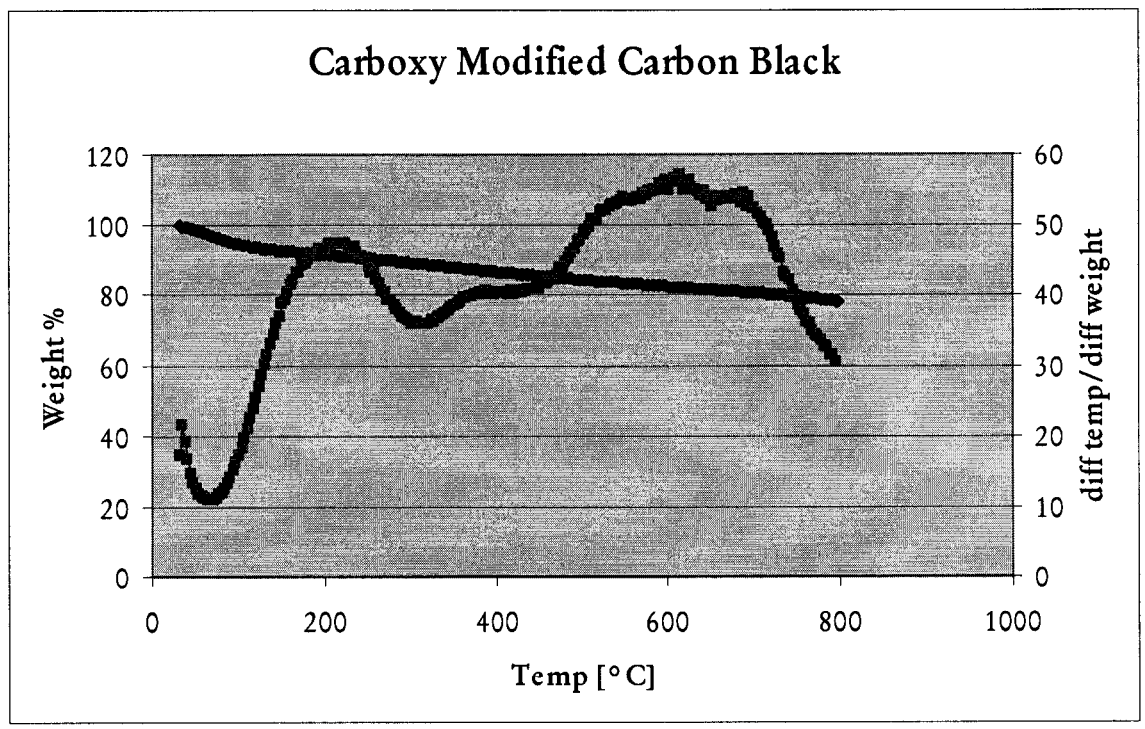
FIG. 8 is a graph of Temperature in ° C. (x-axis) versus Weight % (y-axis, left) and Differential Temperature/Differential Weight (y-axis, right) obtained by TGA for carboxy modified carbon black, as set forth in Example 22.

As shown in FIG. 8 and as summarized in Table 8, the carboxy modified carbon black exhibits a weight loss equivalent to 1239 μMoles $CO_2$ per gram of pigment from 101-308° C., a weight loss equivalent to 782 μMoles $CO_2$ per gram of pigment from 308-441° C., and a weight loss equivalent from 964 μMoles $CO_2$ per gram of pigment from 441-651° C.

TABLE 8

Weight loss analysis for carboxy modified carbon black in FIG. 8.

| Starting Weight = 19.443 | Weight Difference | Per Gram C | Moles $CO_2$ | μMoles $CO_2$ |
|---|---|---|---|---|
| Weight @ 101° C. = 18.99 | 0 | 0 | 0 | 0 |
| Weight @ 308° C. = 17.139 | 1.06 | 0.05452 | 0.001239 | 1239 |
| Weight @ 441° C. = 16.47 | 0.669 | 0.03441 | 0.000782 | 782 |
| Weight @ 651° C. = 15.645 | 0.825 | 0.04243 | 0.000964 | 964 |

Figure 9:
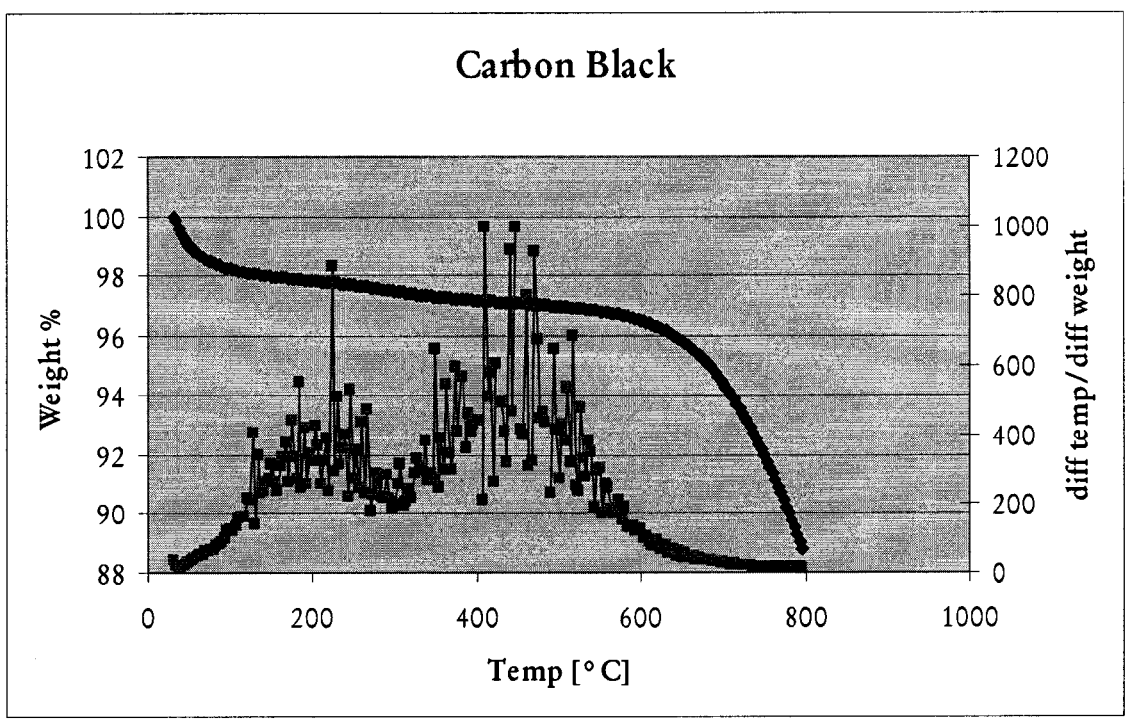
FIG. 9 is a graph of Temperature in ° C. (x-axis) versus Weight % (y-axis, left) and Differential Temperature/Differential Weight (y-axis, right) obtained by TGA for carbon black.

By comparison, as shown in FIG. 9 and as summarized in Table 9, carbon black exhibits a weight loss equivalent to 165 μMoles $CO_2$ per gram of pigment from 103-300° C. and a weight loss equivalent to 447 μMoles $CO_2$ per gram of pigment from 300-660° C.

TABLE 9

Weight loss analysis for carbon black in FIG. 9.

| Starting Weight = 2.0243 | Weight Difference | Per Gram C | Moles $CO_2$ | μMoles $CO_2$ |
|---|---|---|---|---|
| Weight @ 103° C. = 1.9952 | 0 | 0 | 0 | 0 |
| Weight @ 300° C. = 1.9805 | 0.0147 | 0.00726 | 0.000165 | 165 |
| Weight @ 660° C. = 1.9407 | 0.0398 | 0.01966 | 0.000447 | 447 |

Example 23

Surface Active Hydrogen Analysis

The samples (as aqueous dispersions) were titrated with undiluted 2.000 N HCl from a 50 ml burette calibrated to 0.1 ml. The samples and the titrant were not diluted so that the pH of 2.0 could be achieved using a reasonable quantity of titrant, and so that the volume change over the course of the titration would be less (ca. 10% increase in volume during the course of the titration). Data are summarized in Table 10 for the acid uptake over the pH interval 10.2 to 2.0 for the carbon dispersions and for deionized water. The first column shows the total uptake of HCl in mMoles over this pH interval, and the second column shows the uptake converted to mMoles/g based upon the % solids. As expected, the uptake per gram is largest for the product described in Example 7. Examples with oxidation and the carbon black raw material are included for comparison.

TABLE 10

Bulk acidity by pH titration.

| Sample | mMoles of HCl | (mMoles HCl)/ g Solid |
|---|---|---|
| Water Blank | 1.0 | NA |
| Carbon Black | 1.4 | 0.2 |
| Oxidized carbon black (Sensijet ® Black SDP 100 available from Sensient Colors Inc., St. Louis, MO) | 6.6 | 1.1 |
| Oxidized carbon black (Sensijet ® Black SDP 1000 available from Sensient Colors Inc., St. Louis, MO) | 10.2 | 1.5 |
| Example 1 | 9.9 | 1.4 |
| Example 7 | 12.3 | 1.7 |

Example 24

Elemental Analysis

The surface modified carbon black dispersion (sulfonated, carboxy modified carbon black) made according to Examples 2 and 8 were analyzed as a dry powder (dried in the oven at 70° C. to constant weight) by Schwarskopf Microanalytical Laboratory, Woodside, N.Y. and compared with the original carbon black powder and oven dried, thoroughly washed sulfonated acid cake. The surface modified pigment blue 15 (Example 16) and pigment red 122 (Example 13) were similarly analyzed as a dry powder. The results of the elemental analysis are summarized in Table 11.

TABLE 11

Elemental analysis (% C, H, N, & S).

| Sample | C | H | N | S | Na[1] |
|---|---|---|---|---|---|
| 1 Carbon black | 91.35 | 1.15 | 0.10 | 0.32 | — |
| 2 Sulfonated carbon black | 86.01 | 1.04 | <0.1 | 2.30 | — |
| 3 Sulfonated, carboxy modified carbon black (Example 8) | 75.70 | 0.80 | 0.27 | 1.53 | 3.47 |
| 4 Sulfonated, carboxy modified carbon black (Example 2) | 78.11 | 0.15 | 0.14 | 2.36 | 4.08 |
| 5 Sulfonated carboxy modified PB15 (Example 16) | 58.34 | 2.80 | 14.96 | 2.06 | 2.37 |
| 6 Sulfonated carboxy modified PR122 (Example 13) | 71.58 | 4.28 | 7.90 | 0.11 | 0.70 |

[1]The sodium was calculated @100% solids from ICP metal analysis of the original dispersion.

The results of the elemental analysis indicate that Example 8 yields a modified carbon black with 0.478 mMoles of S and 1.51 mMoles of active hydrogen per gram of carbon.

The results of the elemental analysis indicate that Example 2 yields a modified carbon black with 0.738 mMoles of S and 1.77 mMoles of active hydrogen per gram of carbon.

The results of the elemental analysis indicate that Example 16 yields a modified pigment blue 15 with 0.894 mMoles of S and 1.03 mMoles of active hydrogen per gram of pigment.

The results of the elemental analysis indicate that Example 13 yields a modified pigment red 122 with 0.034 mMoles of S and 0.304 mMoles of active hydrogen per gram of pigment.

Ink Examples

In the following examples, the print performance characteristics of the inks were analyzed according to the aforementioned water resistance procedure, highlighter resistance procedure, rub resistance procedure, ImageXpert instrument procedure (line width, edge acuity, intercolor bleed, mottle), optical density procedure, L*a*b* color space coordinates procedure, cartridge start-up procedure, and light resistance procedure.

Example 25

The following composition is an ink formulation incorporating the self-dispersing pigment made according to Example 7.

TABLE 12

Ink A formulation.

| Ingredients | % (by Weight) |
|---|---|
| Self-Dispersing Pigment (Dispersion) made according to Example 7 | 0.170-0.200 |
| 2-Pyrrolidone, 95% | 0.05 |
| Diethylene Glycol | 0.12 |
| Non-Ionic Surfactant (PEG 600) | 0.001-0.005 |
| Proxel GXL | 0.003 |
| IPA Anhydrous | 0.010-0.020 |
| Deionized Water | balance |

The ink composition was formulated using a two vessel method. A first vessel was used to make the ink base or diluent. A second vessel was used to slowly dilute the pigmented dispersion during a process commonly called a "letdown." The equipment used in the method of making the ink was glass.

First, the water was added to the first vessel. A mixing device was then placed inside the vessel to agitate the water and provide mixing while the other ingredients are added. Mixing was achieved using a magnetic stirring device. Next, 2-pyrrolidone, diethylene glycol, and IPA anhydrous were added to the vessel. These were allowed to dissolve. Then, PEG 600 and Proxel GXL were added and allowed to dissolve.

The second vessel was prepared by adding the pigment dispersion made according to Example 7 to the vessel. A magnetic stirring device was then placed into the vessel. After all of the ingredients in the diluent had dissolved, the dispersion and the diluent were mixed together. After the diluent and dispersion were combined, the ink was mixed for about 1 hour, or until it was homogenous. After mixing, the ink was filtered using a 1 micron glass filter (available from Whatman, Kent, England).

Print Performance Testing

The print performance of the above-identified ink was compared to inks comprising Sensijet® Black SDP 100 and 1000 available from Sensient Colors Inc. (St. Louis, Mo.). The comparison inks were prepared using Sensijet® Black SDP 100 and 1000 in the Ink A formulation. The carbon black inks were printed on three commonly used copy papers—Hewlett Packard Multipurpose Paper, Office Depot 104 paper, and Xerox 4200 multipurpose paper. In the highlighter test two highlighters were used—Sharpie Accent (H1) and Eberhard Faber 4009 (H2).

The analysis of the prints showed Ink A to be superior in all tests compared to the comparative inks containing Sensijet® Black SDP 100 and 1000.

TABLE 13

Water Resistance.

| | HP Multipurpose | Office Depot 104 | Xerox 4200 |
|---|---|---|---|
| Sensijet ® Black SDP 100 OD difference | 0.13 | 0.09 | 0.08 |
| Sensijet ® Black SDP 1000 OD difference | 0.14 | 0.06 | 0.12 |
| Ink A OD difference | 0.11 | 0.05 | 0.10 |

TABLE 14

Highlighter Resistance (H1 = Sharpie Accent, H2 = Eberhard Faber).

| | HP Multipurpose | Office Depot 104 | Xerox 4200 |
|---|---|---|---|
| Sensijet ® Black SDP 100 OD difference (H1) | 0.6 | 0.31 | 0.62 |
| Sensijet ® Black SDP 1000 OD difference (H1) | 0.42 | 0.19 | 0.52 |
| Ink A OD difference (H1) | 0.35 | 0.16 | 0.27 |
| Sensijet ® Black SDP 100 OD difference (H2) | 0.45 | 0.28 | 0.47 |
| Sensijet ® Black SDP 1000 OD difference (H2) | 0.42 | 0.21 | 0.47 |
| Ink A OD difference (H2) | 0.42 | 0.18 | 0.37 |

TABLE 15

Rub Resistance.

| | HP Multipurpose | Office Depot 104 | Xerox 4200 |
|---|---|---|---|
| Sensijet ® Black SDP 100 OD difference | 0.12 | 0.06 | 0.10 |
| Sensijet ® Black SDP 1000 OD difference | 0.12 | 0.04 | 0.08 |
| Ink A OD difference | 0.09 | 0.03 | 0.05 |

Example 26

The following are different salt forms of the black dispersion prepared according to Example 3, converted to a mixed salt containing <50% Na salt, and incorporated into the following ink formulations using the procedure described below.

TABLE 16

Inks B-H.

| | Ink B | Ink C | Ink D | Ink E | Ink F | Ink G | Ink H |
|---|---|---|---|---|---|---|---|
| Salt Form | MEA | $K^+$ | $NH_4^+$ | TMA | TEA | $Li^+$ | $Na^+$ |
| Water, deionized (%) | 50.6 | 50.6 | 50.6 | 50.9 | 52.2 | 49.6 | 51.7 |
| Bioban (%) | 0.1 | 0.1 | 0.1 | 0.1 | 0.1 | 0.1 | 0.1 |
| 2-pyrrolidone (%) | 5.0 | 5.0 | 5.0 | 5.0 | 5.0 | 5.0 | 5.0 |
| PEG 400 (%) | 13.0 | 13.0 | 13.0 | 13.0 | 13.0 | 13.0 | 13.0 |
| Cobratec Solution (%) (available from PMC Specialties Group, Cincinnati, OH) | 0.3 | 0.3 | 0.3 | 0.3 | 0.3 | 0.3 | 0.3 |
| 1,2-hexanediol (%) | 1.0 | 1.0 | 1.0 | 1.0 | 1.0 | 1.0 | 1.0 |
| Butyl oxitol glycol ether (%) | 2.0 | 2.0 | 2.0 | 2.0 | 2.0 | 2.0 | 2.0 |
| Triethanolamine (%) | 0.2 | 0.2 | 0.2 | 0.2 | 0.2 | 0.2 | 0.2 |
| Example 3 Dispersion (%) | 25.8 | 25.8 | 25.8 | 25.5 | 24.2 | 26.8 | 24.7 |
| IPA - Anhydrous (%) | 2.0 | 2.0 | 2.0 | 2.0 | 2.0 | 2.0 | 2.0 |

The ink compositions described in the table above were formulated using a two vessel method. A first vessel was used to make the ink base or diluent. A second vessel was used to slowly dilute the pigmented dispersion during a process commonly called a "letdown." The equipment used in the method of making the ink was glass.

First, the appropriate amount of water was added to the first vessel. A mixing device was then placed inside the vessel to agitate the water and provide mixing while the other ingredients are added. Mixing was achieved by using a magnetic stirring device. Next, the appropriate amounts of 2-pyrrolidone, PEG 400, 1,2-hexanediol, and butyl oxitol glycol ether were added to the vessel. These were allowed to dissolve. Then, the appropriate amount of triethanolamine was added and allowed to dissolve. Finally, the appropriate amounts of Cobratec solution and Bioban were added and allowed to dissolve.

The second vessel was prepared by adding the appropriate amount of the pigment dispersion made according to Example 3 to the vessel. A magnetic stirring device was then placed into the vessel. After all of the ingredients in the diluent had dissolved, the dispersion and the diluent were mixed together. After the diluent and dispersion were combined, the ink was mixed for about 1 hour, or until it was homogenous. After mixing, the ink was filtered using a 1 micron glass filter (available from Whatman, Kent, England).

The print performance characteristics of the above inks on Xerox 4200 paper are given below.

TABLE 17

Water Resistance.

| Ink # | Salt Form | Visual Optical Density Shift |
|---|---|---|
| B | MEA | 0.11 |
| C | $K^+$ | 0.12 |
| D | $NH_4^+$ | 0.12 |
| E | TMA | 0.10 |
| F | TEA | 0.08 |
| G | $Li^+$ | 0.13 |
| H | $Na^+$ | 0.14 |

TABLE 18

Highlighter Resistance.

| Ink # | Salt Form | Visual Optical Density Shift |
|---|---|---|
| B | MEA | 0.00 |
| C | $K^+$ | 0.01 |
| D | $NH_4^+$ | 0.01 |
| E | TMA | 0.00 |
| F | TEA | 0.00 |
| G | $Li^+$ | 0.00 |
| H | $Na^+$ | 0.00 |

TABLE 19

Rub Resistance.

| Ink # | Salt Form | Visual Optical Density Before | Visual Optical Density After |
|---|---|---|---|
| B | MEA | 1.22 | 1.19 |
| C | $K^+$ | 1.26 | 1.22 |
| D | $NH_4^+$ | 1.25 | 1.22 |
| E | TMA | 1.21 | 1.18 |
| F | TEA | 1.19 | 1.16 |
| G | $Li^+$ | 1.25 | 1.22 |
| H | $Na^+$ | 1.25 | 1.21 |

TABLE 20

ImageXpert Instrument Procedure 1.0 [Edge Acuity].

| Ink # | Salt Form | Edge Acuity (microns) |
|---|---|---|
| B | MEA | 20 |
| C | K+ | 19 |
| D | NH4+ | 17 |
| E | TMA | 18 |
| F | TEA | 16 |
| G | Li+ | 18 |
| H | Na+ | 17 |

Example 27

Ink formulations comprising the color pigment dispersions prepared according to Examples 13 (Ink I) and 16 (Ink J) are given below:

TABLE 21

Inks I and J formulations.

| | Ink I | Ink J |
|---|---|---|
| Water, deionized (%) | 41.3 | 41.3 |
| Glycerine | 14.0 | 14.0 |
| PEG 600 | 2.0 | 2.0 |
| Butyl carbitol | 3.0 | 3.0 |
| Triethanolamine | 0.1 | 0.1 |
| 33% Cobratec solution | 0.3 | 0.3 |
| Xbinx 19G | 0.3 | 0.3 |
| Ethanol | 2.0 | 2.0 |
| Butanol | 1.0 | 1.0 |
| Example 13 Dispersion | 36 | 0 |
| Example 16 Dispersion | 0 | 36 |

The ink compositions described in the table above were formulated using a two vessel method. A first vessel was used to make the ink base or diluent. A second vessel was used to slowly dilute the pigmented dispersion during a process commonly called a "letdown." The equipment used in the method of making the ink was glass.

First, water was added to the first vessel. A mixing device was then placed inside the vessel to agitate the water and provide mixing while the other ingredients are added. Mixing was achieved by using a magnetic stirring device. Next, glycerine, PEG 600, butyl carbitol, ethanol, and butanol were added to the vessel. These were allowed to dissolve. Then, triethanolamine was added and allowed to dissolve. Finally, Cobratec solution and Xbinx 19G were added and allowed to dissolve.

The second vessel was prepared by adding the pigment dispersion made according to Example 13 or Example 16 to the vessel. A magnetic stirring device was then placed into the vessel. After all of the ingredients in the diluent had dissolved, the dispersion and the diluent were mixed together. After the diluent and dispersion were combined, the ink was mixed for about 1 hour, or until it was homogenous. After mixing, the ink was filtered using a 1 micron glass filter (available from Whatman, Kent, England).

The print performance characteristics of these inks on HP Multipurpose paper are provided below.

TABLE 22

Water Resistance.

| Ink | Color | Visual Optical Density Shift |
|---|---|---|
| Ink I | Magenta | 0.11 |
| Ink J | Cyan | 0.12 |

TABLE 23

Highlighter Smear.

| Ink | Color | Visual Optical Density Shift |
|---|---|---|
| Ink I | Magenta | 0.00 |
| Ink J | Cyan | 0.01 |

TABLE 24

Rub Resistance.

| Ink | Color | Visual Optical Density Before | Visual Optical Density After |
|---|---|---|---|
| Ink I | Magenta | 1.22 | 1.19 |
| Ink J | Cyan | 1.26 | 1.22 |

TABLE 25

ImageXpert Instrument Procedure 1.0 [Edge Acuity].

| Ink | Color | Edge Acuity (microns) |
|---|---|---|
| Ink I | Magenta | 39 |
| Ink J | Cyan | 13 |

Example 28

The following ink formulation was made as described below and incorporated the self-dispersing pigment made according to Example 16.

TABLE 26

Ink K formulation.

| Ingredients | % by Weight |
|---|---|
| Water | 41.3 |
| Glycerine | 14 |
| PEG 600 | 2 |
| Butyl Carbitol | 3 |
| TEA | 0.1 |
| Cobratec | 0.3 |
| Xbinx 19G | 0.3 |
| Ethanol | 2 |
| Butanol | 1 |
| Example 16 Dispersion | 36 |

The ink composition described in the table above was formulated using a two vessel method. A first vessel was used to make the ink base or diluent. A second vessel was used to slowly dilute the pigmented dispersion during a process commonly called a "letdown." The equipment used in the method of making the ink was glass.

First, water was added to the first vessel. A mixing device was then placed inside the vessel to agitate the water and provide mixing while the other ingredients are added. Mixing was achieved by using a magnetic stirring device. Next, glycerine, PEG 600, butyl carbitol, ethanol, and butanol were added to the vessel. These were allowed to dissolve. Then, triethanolamine was added and allowed to dissolve. Finally, Cobratec solution and Xbinx 19G were added and allowed to dissolve.

The second vessel was prepared by adding the pigment dispersion made according to Example 16 to the vessel. A magnetic stirring device was then placed into the vessel. After all of the ingredients in the diluent had dissolved, the dispersion and the diluent were mixed together. After the diluent and dispersion were combined, the ink was mixed for about 1 hour, or until it was homogenous. After mixing, the ink was filtered using a 1 micron glass filter (available from Whatman, Kent, England).

The print performance characteristics of this ink on HP Multipurpose paper are identified below.

TABLE 27

Print Performance Characteristics of Ink K.

| | |
|---|---|
| L | 71.31 |
| a* | −18.82 |
| b* | −16.37 |
| Line Width | 236 microns |
| Edge Acuity | 13 microns |
| Uniformity | 3.4 |
| Horizontal Bleed | −4 microns |
| Vertical Bleed | −2 microns |

Example 29

The following ink formulation was made according to Example 28 and incorporated the self-dispersing pigment made according to Example 13.

TABLE 28

Ink L formulation.

| Ingredients | % by Weight |
|---|---|
| Water | 41.3 |
| Glycerine | 14 |
| PEG 600 | 2 |
| Butyl Carbitol | 3 |
| TEA | 0.1 |
| Cobratec | 0.3 |
| Xbinx 19G | 0.3 |
| Ethanol | 2 |
| Butanol | 1 |
| Example 13 Dispersion | 36 |

The print performance characteristics of this ink on HP Multipurpose paper are identified below.

TABLE 29

Print Performance Characteristics of Ink L.

| | |
|---|---|
| L | 68.88 |
| a* | 27.26 |
| b* | −11.96 |
| Line Width | 198 microns |
| Edge Acuity | 39 microns |
| Uniformity | 4.69 |
| Horizontal Bleed | 3 microns |
| Vertical Bleed | 1 microns |

Example 30

The following ink formulation was made according to the procedure described below and incorporated the self-dispersing pigment made according to Example 10.

TABLE 30

Ink M formulation.

| Ingredients | % by Weight |
|---|---|
| Water, deionized | 7.3 |
| Glycerine 99.7%, USP/EP, OPTIM | 14.0 |
| PEG600 Carb. Polyethlene Glycol | 2.0 |
| Glycol Ether DB | 3.0 |
| Triethanolamine 85 | 0.1 |
| Nipacide BIT 20 (available from Clariant, Coventry, RI) | 0.3 |
| Cobratec Solution | 0.3 |
| IPA-Anhydrous | 2.0 |
| N-Butanol Eastman | 1.0 |
| Example 10 Dispersion | 70.0 |

The ink composition described in the table above was formulated using a two vessel method. A first vessel was used to make the ink base or diluent. A second vessel was used to slowly dilute the pigmented dispersion during a process commonly called a "letdown." The equipment used in the method of making the ink was glass.

First, water was added to the first vessel. A mixing device was then placed inside the vessel to agitate the water and provide mixing while the other ingredients are added. Mixing was achieved by using a magnetic stirring device. Next, glycerine, PEG 600, glycol either DB, IPA anhydrous, and N-Butanol Eastman were added to the vessel. These were allowed to dissolve. Then, triethanolamine 85 was added and allowed to dissolve. Finally, Cobratec solution and Nipacide BIT 20 were added and allowed to dissolve.

The second vessel was prepared by adding the pigment dispersion made according to Example 10 to the vessel. A magnetic stirring device was then placed into the vessel. After all of the ingredients in the diluent had dissolved, the dispersion and the diluent were mixed together. After the diluent and dispersion were combined, the ink was mixed for about 1 hour, or until it was homogenous. After mixing, the ink was filtered using a 1 micron glass filter (available from Whatman, Kent, England).

The physical parameters of this ink are identified below.

TABLE 31

Physical Parameters of Ink M.

| | |
|---|---|
| Viscosity (cps) | 5.0 |
| pH | 8.4 |
| Conductivity (μOhms) | 910.0 |
| Surface Tension (dynes/cm) | 40.7 |

The print performance characteristics of this ink are identified below.

TABLE 32

Print Performance Characteristics of Ink M.

|  | Xerox 4200 | Epson Premium Photo Paper |
|---|---|---|
| L | 67.71 | 72.01 |
| a* | 25.90 | 24.46 |
| b* | −17.05 | −19.40 |
| ΔE | 22.4 | 29.9 |
| Optical Density | 0.52 | 0.45 |
| Rub Resistance (OD Difference) | 0.026 | 0.135 |
| Highlighter Resistance (OD Difference) | 0.008 | 0.045 |
| Water resistance (OD Difference) | 0.007 | 0.008 |
| Mottle | 6.1 | 2.1 |
| Edge Acuity | 47 microns | 8 microns |
| Inter-Color Bleed | −12 microns | 15 microns |
| Light resistance | 7.8 | 5.5 |

Example 31

The following ink formulation was made according to the procedure described below and incorporated the self-dispersing pigment made according to Example 7.

TABLE 33

Ink N formulation.

| Ingredients | % by Weight |
|---|---|
| Water, deionized | 58.4 |
| 2-Pyrrolidone water blend | 5.3 |
| PEG 600 Carb. Polyethylene Glycol | 13.0 |
| Nipacide BIT 20 | 0.3 |
| Triethanolamine 85 | 0.1 |
| IPA-Anhydrous | 2.0 |
| Example 7 Dispersion | 21.0 |

The ink composition described in the table above was formulated using a two vessel method. A first vessel was used to make the ink base or diluent. A second vessel was used to slowly dilute the pigmented dispersion during a process commonly called a "letdown." The equipment used in the method of making the ink was glass.

First, water was added to the first vessel. A mixing device was then placed inside the vessel to agitate the water and provide mixing while the other ingredients are added. Mixing was achieved by using a magnetic stirring device. Next, 2-pyrrolidone, PEG 600, and IPA anhydrous were added to the vessel. These were allowed to dissolve. Then, triethanolamine 85 was added and allowed to dissolve. Finally, Nipacide BIT 20 was added and allowed to dissolve.

The second vessel was prepared by adding the pigment dispersion made according to Example 7 to the vessel. A magnetic stirring device was then placed into the vessel. After all of the ingredients in the diluent had dissolved, the dispersion and the diluent were mixed together. After the diluent and dispersion were combined, the ink was mixed for about 1 hour, or until it was homogenous. After mixing, the ink was filtered using a 1 micron glass filter (available from Whatman, Kent, England).

The physical parameters of this ink are identified below.

TABLE 34

Physical Parameters of Ink N.

|  | Initial | 1 Week at 70° C. | | 23 Days at 70° C. | | Stress Cycles | |
|---|---|---|---|---|---|---|---|
|  |  | Value | Relative Change | Value | Relative Change | Value | Relative Change |
| Viscosity | 2.41 | 2.46 | 1.02 | 2.38 | 0.99 | 2.25 | 0.93 |
| pH | 8.26 | 7.26 | 0.88 | 7.12 | 0.86 | 7.72 | 0.93 |
| Conductivity (μS) | 303.00 | 500.00 | 1.65 | 640.00 | 2.11 | 413.00 | 1.36 |
| Surface Tension (dynes/cm) | 43.80 | 44.10 | 1.01 | 45.20 | 1.03 | 44.30 | 1.01 |
| Heat at 70° C. - Particle Count (# large particles >0.5 μm/mL E8) | 0.06 | 0.08 | 1.33 | 0.07 | 1.17 | | |
| 3 Freeze/Thaw/Heat Cycles - Freezer (8 H) to Countertop (8H) to Oven at 70° C. - Particle Count (# large particles > 0.5 0.5 μm/mL E8) | 0.06 | | | | | 0.04 | 0.67 |

The print performance characteristics of this ink are identified below.

TABLE 35

Print Performance Characteristics of Ink N.

|  | HP Multi-purpose ColorLok | Xerox 4200 | Office Depot 104 | Hammerill Great White |
|---|---|---|---|---|
| Optical Density | 1.55 | 1.47 | 1.21 | 1.37 |
| Rub Resistance | 0.17 | 0.13 | 0.08 | 0.10 |

TABLE 35-continued

Print Performance Characteristics of Ink N.

| | HP Multi-purpose ColorLok | Xerox 4200 | Office Depot 104 | Hammerill Great White |
|---|---|---|---|---|
| (OD Difference) | | | | |
| Highlighter Resistance (OD Difference) | 0.07 | 0.02 | 0.01 | 0.01 |
| Water resistance (OD Difference) | 0.11 | 0.10 | 0.05 | 0.06 |
| Cartridge Start-up | Pass | Pass | Pass | Pass |
| Line Width | 268 | 284 | 276 | 288 |
| Edge Acuity | 9 | 12 | 13 | 15 |
| Mottle | 0.690 | 0.980 | 1.500 | 1.560 |
| Black Yellow Bleed - Horizontal | 24 | 0 | 4 | 0 |
| Black Yellow Bleed - Vertical | 32 | 0 | 6 | 6 |

Example 32

The following ink formulation was made according to the procedure described below and incorporated the self-dispersing pigment made according to Example 7.

TABLE 36

Ink O formulation.

| Ingredients | % by Weight |
|---|---|
| Water, deionized | 58.6 |
| 2-Pyrrolidone water blend | 10.0 |
| 1,5-pentanediol | 5.0 |
| PEG 600 Carb. Polyethylene Glycol | 4.0 |
| Nipacide BIT 20 | 0.3 |
| Surfynol 104E solution | 0.1 |

TABLE 36-continued

Ink O formulation.

| Ingredients | % by Weight |
|---|---|
| 1,2-hexanediol | 1.0 |
| Example 7 Dispersion | 21.0 |

The ink composition described in the table above was formulated using a two vessel method. A first vessel was used to make the ink base or diluent. A second vessel was used to slowly dilute the pigmented dispersion during a process commonly called a "letdown." The equipment used in the method of making the ink was glass.

First, water was added to the first vessel. A mixing device was then placed inside the vessel to agitate the water and provide mixing while the other ingredients are added. Mixing was achieved by using a magnetic stirring device. Next, 2-pyrrolidone, 1,5-pentanediol, PEG 600, and 1,2-hexanediol were added to the vessel. These were allowed to dissolve. Then, Surfynol 104E solution and Nipacide BIT 20 were added and allowed to dissolve.

The second vessel was prepared by adding the pigment dispersion made according to Example 7 to the vessel. A magnetic stirring device was then placed into the vessel. After all of the ingredients in the diluent had dissolved, the dispersion and the diluent were mixed together. After the diluent and dispersion were combined, the ink was mixed for about 1 hour, or until it was homogenous. After mixing, the ink was filtered using a 1 micron glass filter (available from Whatman, Kent, England).

The physical parameters of this ink are identified below.

TABLE 37

Physical Parameters of Ink O.

| | Initial | 1 Week at 70° C. | | 23 Days at 70° C. | | Stress Cycles | |
|---|---|---|---|---|---|---|---|
| | | | Relative Change | | Relative Change | Value | Relative Change |
| Viscosity | 2.95 | 2.98 | 1.01 | 2.87 | 0.97 | 2.77 | 0.94 |
| pH | 8.58 | 7.84 | 0.91 | 7.43 | 0.87 | 8.11 | 0.95 |
| Conductivity (µS) | 356.00 | 560.00 | 1.57 | 730.00 | 2.05 | 477.00 | 1.34 |
| Surface Tension (dynes/cm) | 57.10 | 57.00 | 1.00 | 57.20 | 1.00 | 56.90 | 1.00 |
| Heat at 70° C. - Particle Count (# large particles > 0.5 µm/mL E8) | 0.06 | 0.07 | 1.17 | 0.10 | 1.67 | | |
| 3 Freeze/Thaw/Heat Cycles - Freezer (8 H) to Countertop (8H) to Oven at 70° C. - Particle Count (# large particles > 0.5 0.5 µm/mL E8) | 0.06 | | | | | 0.12 | 2.00 |

The print performance characteristics of this ink are identified below.

TABLE 38

Print Performance Characteristics of Ink O.

| | HP Multi-purpose ColorLok | Xerox 4200 | Office Depot 104 | Hammerill Great White |
|---|---|---|---|---|
| Optical Density | 1.59 | 1.57 | 1.42 | 1.54 |
| Rub Resistance | 0.21 | 0.19 | 0.12 | 0.19 |

TABLE 38-continued

Print Performance Characteristics of Ink O.

| | HP Multi-purpose ColorLok | Xerox 4200 | Office Depot 104 | Hammerill Great White |
|---|---|---|---|---|
| (OD Difference) | | | | |
| Highlighter Resistance (OD Difference) | 0.14 | 0.06 | 0.02 | 0.07 |
| Water resistance (OD Difference) | 0.15 | 0.19 | 0.07 | 0.14 |
| Cartridge Start-up | Pass | Pass | Pass | Pass |
| Line Width | 244 | 267 | 257 | 269 |
| Edge Acuity | 8 | 11 | 11 | 15 |
| Mottle | 0.680 | 0.670 | 1.410 | 0.840 |
| Black Yellow Bleed - Horizontal | 7 | 0 | 2 | 0 |
| Black Yellow Bleed - Vertical | 47 | 31 | 51 | 19 |

Thus, the invention provides, among other things, surface modified pigments and inks and methods of making and using the same. Various features and advantages of the invention are set forth in the following claims.

What is claimed is:

1. A method of making an ink composition comprising sulfonating a pigment;
subsequently oxidizing the pigment to produce a modified pigment; and
incorporating the modified pigment into an ink.

2. The method of claim 1, wherein the modified pigment comprises about 0.02 to about 1.0 mMoles of S and about 0.2 to about 2.0 mMoles of active hydrogen per gram of pigment.

3. The method of claim 1, wherein sulfonation is carried out with an acid comprising at least one of sulfuric acid, oleum, and a combination thereof.

4. The method of claim 1, wherein oxidation is carried out with a hypohalite salt.

5. The method of claim 1, wherein the ink has a water resistance value of about 0.00 to about 2.00.

6. The method of claim 1, wherein the ink has an edge acuity value of about 0 microns to about 50 microns.

7. The method of claim 1, wherein the ink is a black ink having a highlighter resistance of about 0 to about 2.00.

8. The method of claim 1, wherein the ink is a color ink having a highlighter resistance of about 0 to about 0.10.

9. The method of claim 1, wherein the ink has a rub resistance of about 0.00 to about 2.00.

10. The method of claim 1, wherein the ink has a bleed value of about 0 microns to about 100 microns.

11. The method of claim 1, wherein the ink has a line width of about 200 microns to about 350 microns.

12. The method of claim 1, wherein the ink has an optical density of about 1.00 to about 3.00.

13. The method of claim 1, wherein the ink is a black ink having a mottle of about 0 to about 3.00.

14. The method of claim 1, wherein the ink is a color ink having a mottle of about 0.00 to about 6.00.

15. The method of claim 1, wherein the pigment comprises at least one of carbon black, pigment red 122, pigment yellow 74, pigment yellow 97, pigment yellow 138, pigment yellow 155, pigment blue 15:1, pigment blue 15:3, solvent yellow 33, solvent blue 67, and combinations thereof.

16. The method of claim 1, wherein the pigment comprises carbon black.

17. The method of claim 1, wherein the ink comprises a water soluble organic solvent comprising at least one of glycerine, diethylene glycol, polyethylene glycol, glycol ether, isopropanol, n-butyl alcohol, diethylene glycol butyl ether, butyl oxitol glycol ether, ethanol, butanol, 2-pyrrolidone, 1,5-pentanediol, 1,2-hexanediol, and a combination thereof.

18. The method of claim 1, wherein the ink comprises about 1% to about 40% of a water-soluble organic solvent.

19. The method of claim 1, wherein the ink comprises a penetrant chosen from at least one of alkyl alcohols having 1 to 4 carbon atoms, ethanol, methanol, n-butanol, sec-butyl alcohol, propanol, isopropanol, n-pentanol, diacetone alcohol, diols, 1,2-alkyl diols, diethylene glycol butyl ether, butyl oxitol glycol, 1,5-pentanediol, 1,2-hexanediol, ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol-mono-t-butyl ether, diethylene glycol mono-t-butyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, formamide; acetamide; dimethylsulfoxide; sorbitol; sorbitan; acetin; diacetin; triacetin; and sulfolane.

20. The method of claim 1, wherein the ink comprises a pH modifier chosen from at least one of an alkali hydroxide, an alkali carbonate, an alkali bicarbonate, ammonium hydroxide, potassium hydrogenphthalate, potassium dihydrogenphosphate, sodium dihydrogenphosphate, sodium tetraborate, potassium hydrogentartrate, sodium hydrogencarbonate, tris(hydroxymethyl)aminomethane, tris(hydroxymethyl)aminomethane hydrochloride, triethylamine, dimethylethanolamine, triethanolamine, a mineral acid, hydrochloric acid, sulfuric acid, and a combination thereof.

21. The method of claim 1, wherein the ink comprises a biocide chosen from at least one of sodium benzoate, pentachlorophenol sodium, 2-pyridinethiol-1-oxide sodium, sodium sorbate, sodium dehydroacetate, benz-isothiazolin-one, 1,2-dibenzothiazolin-3-one, methyl-isothiazolin-one, chloro-methyl-isothiazolin-one, and a combination thereof.

22. The method of claim 1, wherein the ink comprises a nonionic surfactant.

23. The method of claim 22, wherein the surfactant comprises an ethoxylated acetylenic glycol surfactant.

24. The method of claim 1, wherein the ink comprises a corrosion inhibitor chosen from at least one of acidic sulfite, sodium thiosulfate, ammonium thioglycolate, diisopropyl ammonium nitrite, pentaerythritol tetranitrate, dicyclohexyl ammonium nitrite, benzotriazole, tolyltriazole, carboxybenzotriazole, sodium tolytriazole, and a combination thereof.

25. The method of claim 1, wherein the ink comprises at least one of an additional colorant, an antioxidant, an ultraviolet absorber, a chelating agent, an electric conductivity adjuster, a viscosity modifier, an oxygen absorber, an anti-kogation agent, an anti-curling agent, an anti-bleed agent, a defoamer, a buffer, and a combination thereof.

26. The method of claim 1, wherein the pigment comprises at least one of an azo pigment, a phthalocyanine pigment, an anthraquinone pigment, a quinacridone pigment, a thioindigo pigment, a triphenylmethane lake pigment, an oxazine pigment, and combinations thereof.

27. The method of claim 1, wherein the pigment does not comprise carbon black.

* * * * *

UNITED STATES PATENT AND TRADEMARK OFFICE
CERTIFICATE OF CORRECTION

PATENT NO. : 8,163,075 B2  Page 1 of 1
APPLICATION NO. : 11/933192
DATED : April 24, 2012
INVENTOR(S) : Jeff Kennedy et al.

It is certified that error appears in the above-identified patent and that said Letters Patent is hereby corrected as shown below:

On the title page under the subheading References Cited, Item 56, FOREIGN PATENT DOCUMENTS: add foreign reference --WO 2007/021731--

Signed and Sealed this
Fourteenth Day of August, 2012

David J. Kappos
*Director of the United States Patent and Trademark Office*